US007538694B2

(12) United States Patent
Geiger et al.

(10) Patent No.: US 7,538,694 B2
(45) Date of Patent: May 26, 2009

(54) NETWORK DEVICE WITH IMPROVED STORAGE DENSITY AND ACCESS SPEED USING COMPRESSION TECHNIQUES

(75) Inventors: Peter D. Geiger, Austin, TX (US); Manuel J. Alvarez, II, Austin, TX (US); Thomas A. Dye, Austin, TX (US)

(73) Assignee: Mossman Holdings LLC, Wilmington, DE (US)

( * ) Notice: Subject to any disclaimer, the term of this patent is extended or adjusted under 35 U.S.C. 154(b) by 725 days.

(21) Appl. No.: 10/205,590

(22) Filed: Jul. 25, 2002

(65) Prior Publication Data
US 2003/0058873 A1    Mar. 27, 2003

Related U.S. Application Data

(63) Continuation-in-part of application No. 09/491,343, filed on Jan. 26, 2000, now Pat. No. 6,822,589, and a continuation-in-part of application No. 09/239,659, filed on Jan. 29, 1999, now Pat. No. 7,190,284.

(60) Provisional application No. 60/307,964, filed on Jul. 26, 2001.

(51) Int. Cl.
*H03M 7/00* (2006.01)
(52) U.S. Cl. .......................... 341/51; 341/87
(58) Field of Classification Search ................. 341/51, 341/87, 106, 55; 710/68
See application file for complete search history.

(56) References Cited

U.S. PATENT DOCUMENTS

| 4,008,460 | A | * | 2/1977 | Bryant et al. ................ 711/136 |
| 4,558,302 | A |   | 12/1985 | Welch |
| 4,688,108 | A | * | 8/1987 | Cotton et al. ................ 358/442 |
| 4,876,541 | A | * | 10/1989 | Storer .......................... 341/51 |
| 4,881,075 | A | * | 11/1989 | Weng ........................... 341/87 |
| 5,003,307 | A | * | 3/1991 | Whiting et al. ............... 341/51 |
| 5,016,009 | A | * | 5/1991 | Whiting et al. ............... 341/67 |
| 5,109,226 | A |   | 4/1992 | MacLean, Jr. et al. |
| 5,126,739 | A | * | 6/1992 | Whiting et al. ............. 341/106 |
| 5,146,221 | A | * | 9/1992 | Whiting et al. ............... 341/67 |

(Continued)

FOREIGN PATENT DOCUMENTS

EP           0 702 457           3/1996

(Continued)

OTHER PUBLICATIONS

U.S. Appl. No. 09/239,659, filed Jan. 29, 1999, Dye et al.

(Continued)

*Primary Examiner*—Jean B Jeanglaude

(57) ABSTRACT

A network device, also referred to as the Compression Enhanced Network Processor (CENP), with embedded parallel (or fast serial) compression and/or decompression capability. The network device may be a network processor based multi-ported switch, bridge, router, hub, or other device. The CENP may provide improved data density, efficiency and bandwidth for each port of a multi-port network switch. In one embodiment, the CENP may comprise a network processor core, a memory management unit, a memory buffer (e.g., an SRAM memory buffer), and a system memory. The CENP may comprise a compression and decompression engine. In one embodiment, the memory management unit comprises the compression and decompression engine, and thus may be referred to as a Compression Enhanced Memory Controller Unit (CEMCU).

28 Claims, 27 Drawing Sheets

U.S. PATENT DOCUMENTS

| | | | |
|---|---|---|---|
| 5,150,430 A * | 9/1992 | Chu ..................... 382/246 |
| 5,155,484 A * | 10/1992 | Chambers, IV ............ 341/55 |
| 5,237,460 A * | 8/1993 | Miller et al. ................ 360/8 |
| 5,237,675 A | 8/1993 | Hannon, Jr. |
| 5,247,638 A * | 9/1993 | O'Brien et al. ............ 710/68 |
| 5,247,646 A | 9/1993 | Osterlund et al. |
| 5,337,275 A | 8/1994 | Garner |
| 5,341,339 A | 8/1994 | Wells |
| 5,353,024 A | 10/1994 | Graybill |
| 5,353,425 A | 10/1994 | Malamy et al. |
| 5,357,614 A | 10/1994 | Pattisam et al. |
| 5,371,499 A | 12/1994 | Graybill et al. |
| 5,379,036 A | 1/1995 | Storer |
| 5,389,922 A | 2/1995 | Seroussi et al. |
| 5,394,534 A | 2/1995 | Kulakowski |
| 5,396,343 A | 3/1995 | Hanselman |
| 5,406,278 A | 4/1995 | Graybill et al. |
| 5,406,279 A | 4/1995 | Anderson et al. |
| 5,412,429 A | 5/1995 | Glover |
| 5,414,425 A | 5/1995 | Whiting et al. |
| 5,414,850 A | 5/1995 | Whiting |
| 5,420,696 A | 5/1995 | Wegeng et al. |
| 5,424,733 A | 6/1995 | Fimoff et al. |
| 5,426,779 A * | 6/1995 | Chambers, IV ............... 707/6 |
| 5,448,577 A | 9/1995 | Wells et al. |
| 5,455,577 A | 10/1995 | Slivka et al. |
| 5,455,943 A | 10/1995 | Chambers, IV |
| 5,459,850 A | 10/1995 | Clay et al. |
| 5,463,390 A | 10/1995 | Whiting et al. |
| 5,465,338 A | 11/1995 | Clay |
| 5,467,087 A | 11/1995 | Chu |
| 5,471,206 A | 11/1995 | Allen et al. |
| 5,477,264 A | 12/1995 | Sarbadhikari et al. |
| 5,479,638 A | 12/1995 | Assar |
| 5,485,526 A | 1/1996 | Tobin |
| 5,504,842 A | 4/1996 | Gentile |
| 5,506,580 A | 4/1996 | Whiting et al. |
| 5,510,840 A | 4/1996 | Yonemitsu et al. |
| 5,526,363 A | 6/1996 | Weiss et al. |
| 5,532,693 A | 7/1996 | Winters et al. |
| 5,532,694 A | 7/1996 | Mayers et al. |
| 5,548,742 A | 8/1996 | Wang et al. |
| 5,553,261 A | 9/1996 | Hasbun |
| 5,559,978 A | 9/1996 | Spilo |
| 5,563,595 A * | 10/1996 | Strohacker ............... 341/106 |
| 5,568,423 A | 10/1996 | Jou et al. |
| 5,572,206 A | 11/1996 | Miller et al. |
| 5,577,248 A | 11/1996 | Chambers, IV |
| 5,584,008 A | 12/1996 | Shimada et al. |
| 5,606,428 A | 2/1997 | Hanselman |
| 5,608,396 A | 3/1997 | Cheng et al. |
| 5,621,403 A | 4/1997 | Reznik |
| 5,627,995 A | 5/1997 | Miller et al. |
| 5,640,529 A | 6/1997 | Hasbun |
| 5,696,912 A | 12/1997 | Bicevskis et al. |
| 5,729,228 A * | 3/1998 | Franaszek et al. .......... 341/106 |
| 5,798,718 A | 8/1998 | Hadady |
| 5,799,150 A * | 8/1998 | Hamilton et al. ............ 709/203 |
| 5,812,817 A | 9/1998 | Hovis et al. |
| 5,828,877 A | 10/1998 | Pearce et al. |
| 5,836,003 A | 11/1998 | Sadeh |
| 5,838,334 A | 11/1998 | Dye |
| 5,874,908 A | 2/1999 | Craft |
| 5,877,711 A | 3/1999 | Craft |
| 5,883,588 A | 3/1999 | Okamura |
| 5,933,104 A | 8/1999 | Kimura |
| 5,936,560 A | 8/1999 | Higuchi |
| 5,945,933 A | 8/1999 | Kalkstein |
| 5,956,372 A | 9/1999 | Vaman et al. |
| 5,973,630 A | 10/1999 | Heath |
| 6,002,411 A | 12/1999 | Dye |
| 6,008,743 A | 12/1999 | Jacquette |
| 6,145,069 A | 11/2000 | Dye |
| 6,163,824 A * | 12/2000 | Quackenbush et al. ...... 710/100 |
| 6,170,047 B1 | 1/2001 | Dye |
| 6,173,381 B1 | 1/2001 | Dye |
| 6,208,273 B1 | 3/2001 | Dye et al. |
| 6,282,195 B1 * | 8/2001 | Miller et al. ................. 370/392 |
| 6,304,197 B1 | 10/2001 | Freking et al. |
| 6,523,102 B1 | 2/2003 | Dye et al. |
| 2001/0031092 A1 | 10/2001 | Zeck et al. |

FOREIGN PATENT DOCUMENTS

| | | |
|---|---|---|
| WO | 92/17844 | 10/1992 |
| WO | 95/18997 | 7/1995 |
| WO | 95/19662 | 7/1995 |

OTHER PUBLICATIONS

U.S. Appl. No. 09/491,343, filed Jan. 26, 2000, Dye et al.
U.S. Appl. No. 09/818,283, filed Mar. 27, 2001, Dye et al.
U.S. Appl. No. 09/821,785, filed Mar. 28, 2001, Dye et al.
U.S. Appl. No. 09/915,751, filed Jul. 26, 2001, Dye et al.
U.S. Appl. No. 60/307,964, filed Jul. 26, 2001, Dye et al.
U.S. Appl. No. 60/250,177, filed Nov. 29, 2000, Dye et al.
U.S. Appl. No. 10/044,786, filed Jan. 11, 2002, Dye et al.
U.S. Appl. No. 10/044,785, filed Jan. 11, 2002, Dye et al.
Brenza, "Synonym Avoidance Cache," IBM Technical Disclosure Bulletin, vol. 34, No. 1, Jun. 1991, pp. 377-381.
Y. Yabe et al.; "Compression/Decompression DRAM for United Memory Systems: a 16Mb, 200MHz, 90% to 50% Graphics-Bandwidth Reduction Prototype"; Solid-State Circuits Conf., 1998; Digest of Technical Papers; 1998 IEEE Int'l; San Francisco, CA, USA; Feb. 5-7, 1998; NY, NY, USA; IEEE; US; Feb. 5, 1998; pp. 342-343; XP010278670; ISBN 0-7803-4344-1.
M. Kjelso et al.; "Performance evaluation of computer architectures with main memory data compression"; Journal of Systems Architecture; Elsevier Science Publishers Bv.; Amsterdam, NL; vol. 45, No. 8; Feb. 1999; pp. 571-590; XO004153056; ISSN: 1383-7621; p. 574, left-hand column, paragraph 4; p. 580, left-hand column, paragraph 2.

* cited by examiner

Network Switch

Network Hub

Network Bridge

Network Router

Compression-Enabled
Network Device

| Bytes Compressed | Flag | Index | Count | Data | Bits Used |
|---|---|---|---|---|---|
| 0 | 0 | - | - | 8b | 9 |
| 1 | 10 | 6b | - | - | 8 |
| 2 | 1100 | 6b | - | - | 10 |
| 3 | 1101 | 6b | - | - | 10 |
| 4 | 1110 | 6b | - | - | 10 |
| 5 | 1111000 | 6b | - | - | 13 |
| 6 | 1111001 | 6b | - | - | 13 |
| 7 | 1111010 | 6b | - | - | 13 |
| 8 | 1111011 | 6b | - | - | 13 |
| 9 | 1111100 | 6b | - | - | 13 |
| 10 | 1111101 | 6b | - | - | 13 |
| 11 | 1111110 | 6b | - | - | 13 |
| >11 | 1111111 | 6b | 12b | - | 25 |

Figure 7

| Previous Select | 10 | 08 | 04 | 02 | 01 | 00 |
|---|---|---|---|---|---|---|
| My ID=01 | 1F | 1F | 1F | 1F | 1F | 00 |
| My ID=02 | 1F | 1F | 1F | 1F | 1F | 00 |
| My ID=04 | 1F | 1F | 1F | 1F | 1F | 00 |
| My ID=08 | 1F | 1F | 1F | 1F | 1E | 00 |
| My ID=10 | 1E | 1E | 1F | 1F | 1E | 00 |
| My ID=20 | 1E | 1E | 1E | 1E | 00 | 00 |
| My ID=40 | 1E | 1E | 1E | 1C | 00 | 00 |
| My ID=80 | 08 | 00 | 00 | 00 | 00 | 00 |

Figure 11a

| Select | 10 | 08 | 04 | 02 | 01 | 00 |
|---|---|---|---|---|---|---|
| Data Byte | X | D1:D8 | X | X | X | X |
| Index | D2:D7 | X | D4:D9 | D7:D12 | D7:D12 | X |
| Count | PC+1 | PC+1 | D2:D3+PC | D4:D6+PC+5 | D13:D24+PC | X |

Figure 11b

Decompresion data flow 3-decoder embodiment 3 decoders, 4 output bytes

- example using 4 input bytes, 3 decoders, 4 output bytes

Decompresion flowchart

Decompression flowchart

Decompresion flowchart

Decompresion flowchart

Decompresion flowchart

Decompresion flowchart

Decompresion flowchart

Decompresion flowchart

Decompresion flowchart

Decompresion flowchart

Decompresion flowchart

NETWORK DEVICE WITH IMPROVED STORAGE DENSITY AND ACCESS SPEED USING COMPRESSION TECHNIQUES

PRIORITY CLAIM

This application claims benefit of priority of U.S. provisional application Ser. No. 60/307,964 titled "Network Device with Improved Storage Density and Access Speed using Compression Techniques" filed Jul. 26, 2001, whose inventors are Peter D. Geiger, Manuel J. Alvarez II and Thomas A. Dye.

This application is also a continuation-in-part of U.S. utility application Ser. No. 09/239,659 titled "Selective Lossless, Lossy, or No Compression of Data Based on Address Range, Data Type, and/or Requesting Agent," filed Jan. 29, 1999, whose inventors were Thomas A. Dye, Manuel J. Alvarez, II, and Peter Geiger, now U.S. Pat. No. 7,190,284.

This application is also a continuation-in-part of U.S. utility application Ser. No. 09/491,343 titled "System and Method for Performing Scalable Embedded Parallel Data Decompression," filed Jan. 26, 2000, whose inventors were Thomas A. Dye, Manuel J. Alvarez, II, and Peter Geiger, now U.S. Pat. No. 6,822,589.

FIELD OF THE INVENTION

The present invention relates to computer network system architectures, and more particularly to improving the storage density of each port on a network switch, without requiring additional DRAM, SRAM, Non-volatile "Flash" memory or embedded memory, which includes embedded data decompression and/or compression engines for increased effective memory density and improved bandwidth.

DESCRIPTION OF THE RELATED ART

Network processors are typically used in switches to process data for delivery between computer servers and client devices. They typically reside in multi-port configurations where a network processor and associated memory controls a single port of a multi-port switch. Network processors sit on the data path between the physical interface (wire) and the backplane. Each network processor handles multiple frames of Internet data and is responsible for disassembly and re-assembly of such frames based on protocol and frame header information.

Local memory storage is used to hold instructions and intermediate frame information in order to accomplish the following steps:

1) Segmentation Assembly and Reassembly (where frames are disassembled and processed and stored for later reassembly prior to forwarding.)

2) Protocol Recognition and Classification (where frames are identified based on information such as protocol type, port number, destination URL or other application or protocol-specific information.)

3) Queuing and Access Control (where identified frames are placed in appropriate queues for further processing such as prioritization or traffic shaping and comparison qualification to security access policies.)

4) Traffic Shaping and Engineering (where some protocols or applications require the specific traffic be shaped to the outgoing fiber or wire in order to meet jitter specifications for the medium.)

5) Quality of Service (where frames of higher priority are tagged for faster processing by downstream devices within the network.)

All of these protocol-processing steps utilize memory for temporary storage of frame data and header information, including the application and control code run by the network-processing unit. As network switches are required to run faster as seen in OC-48 and future OC-192 (10× Gigabit Ethernet) specifications, more memory storage per network processor node is required for intermediate frame information storage and retrieval. Thus, a technology that reduces the size and cost of such memory storage while maintaining the high bandwidth requirements of such storage is desired.

Therefore, a new system and method is desired to increase the effective read/write bandwidth, and memory storage capacity, while reducing the size and power requirements for embedded applications and operating system software in a multi-port network switch.

SUMMARY OF THE INVENTION

The present invention comprises various embodiments of a network device, also referred to as the Compression Enhanced Network Processor (CENP), with embedded parallel (or fast serial) compression and/or decompression capability. The network device may be a network processor based multi-ported switch, bridge, router, hub, or other device. The CENP may provide improved data density, efficiency and bandwidth for each port of a multi-port network switch.

In one embodiment, the CENP may comprise a network processor core, a memory management unit, a memory buffer (e.g., an SRAM memory buffer), and a system memory. The CENP may comprise a compression and decompression engine. In one embodiment, the memory management unit comprises the compression and decompression engine, and thus may be referred to as a Compression Enhanced Memory Controller Unit (CEMCU).

To enhance the performance of the CENP, in one embodiment the compression and decompression engine is coupled to the SRAM memory buffer. The SRAM memory buffer may optionally be configured as a data cache which feeds the internal network processor core. The compression and decompression engine also optionally couples to the system memory, which may comprise SRAM, SDRAM, DDR-SDRAM or other memory types used for frame and partial frame store protocol handling and manipulation as described in steps 1-5 above. As noted above, the memory controller portion of the CENP may optionally contain the compression and decompression logic which may also couple either directly, or through a temporary data latch, to all the Memory Arrays. The CENP Technology reduces the bandwidth requirements while increasing the memory efficiency for almost all data types within the computer system. Thus, conventional standard memory devices can achieve higher bandwidth, more effective density, with less system power and noise than when used in conventional systems without the CENP technology.

The Compression Enhanced Memory Controller Unit (CEMCU) transfers data between the larger memory banks and the network processor core. Therefore, the CEMCU technology may reside between the network processor and the main memory array. In an alternate embodiment, the compression and/or decompression engines may reside in the network processors memory control unit, thus all memory data including flash memory can make use of lower pin-out interconnect buses, more effective memory performance, and increased effective memory density for all types of memory coupled to each port of the multi-port network switch.

In addition, the CEMCU technology has a "scalable" architecture designed to function in a plurality of memory configurations or compression modes with a plurality of performance requirements as indicated in U.S. Pat. No. 6,208,273. Scalability allows for a non-symmetric compression rate as compared to the decompression rate. Write data can match the effective write speed of the network processor core, using fewer input symbols in parallel during compression, thus reducing gate count and size. Read data can be decompressed with a different number of input symbols per clock or access, thus allowing the read data to be decompressed at an alternate rate. Thus, the non-symmetric nature of the invention during reads and writes allows tuning of the memory access time vs. CEMCU gate count to greatly improve performance and cost.

When configured for an "execute in place" (XIP model), and after compressed data is written into the main memory by the CEMCU as required by the network processor, the CEMCU invention will decompresses the data as it is read by the network processor from the main system memory. Optionally, the decompressed data is stored in the network processor's SRAM or is cached in conventional cache architecture after it is decompressed by the CEMCU technology.

The CENP technology allows data to be stored in multiple compression formats and blocks sizes. Thus, data can be saved in either a normal or compressed format, retrieved from the main memory array for network processor execution in a normal or compressed format, or transmitted and stored on the backplane in a normal or compressed format.

To improve latency and reduce performance degradations normally associated with compression and decompression techniques the CEMCU encompasses multiple novel techniques such as: 1) Compiler directives for data types and block sizes for optimal compression and access speeds; 2) parallel lossless compression/decompression; selectable compression modes such as lossless, lossy or no compression; 3) data caching techniques; 4) unique address translation, attribute, and address directory structures.

The CEFMC Technology preferably includes novel parallel compression and decompression engines designed to process frame data at more than a single byte or symbol (character) at one time. These parallel compression and decompression engines modify the single stream dictionary based (or history table based) data compression method described by Lempel and Ziv to provide a scalable, high bandwidth compression and decompression operation. The parallel compression method examines a plurality of symbols in parallel, thus providing greatly increased compression performance. The CENP technology, in an alternate embodiment, reduces latency further by use of multiple compiler hooks to distinguish program data space from table look-up data. Thus, if indicated, a bypass of the decompression engine will send data directly to the output interface bus without delay. A priority scheme can be applied such that compression and decompression operations are suspended as higher priority non-compressed data is transferred. Thus, reduction of latency and improved efficiency can be achieved at the cost of additional parallel buffers and comparison logic. Compiler directives interpreted by the decompression controller, can be embedded within the compiled protocol application code for notification of compression/decompression bypass.

In summary, the integrated data compression and decompression capabilities removes system bottlenecks allowing a higher frequency network switch operation by decoupling the memory bandwidth requirements from switch transfer speed requirements. In addition, the present invention reduces the data storage size allowing more storage per processed frame and allows additional ports per network switch. The CENP invention lowers the cost and improves switch performance due to reduced data storage requirements and improved memory bandwidth. Thus the Compression Enhanced Memory Controller Unit located within or along side the Compression Enhanced Network Processor of the present invention is a significant advance over the operation of current memory controllers that are used within today's network processor based switches.

BRIEF DESCRIPTION OF THE DRAWINGS

A better understanding of the present invention can be obtained when the following detailed description of the preferred embodiment is considered in conjunction with the following drawings, in which:

FIG. 7 is a table illustrating the header information presented to the lossless decompression engine according to one embodiment of the invention;

FIG. 11a is a table indicating the check valid results table of the decode block according to one embodiment of the invention;

FIG. 11b is a table describing the Data Generate outputs based on the Data Input and the Byte Check Select logic according to one embodiment of the invention;

Figure 1A:
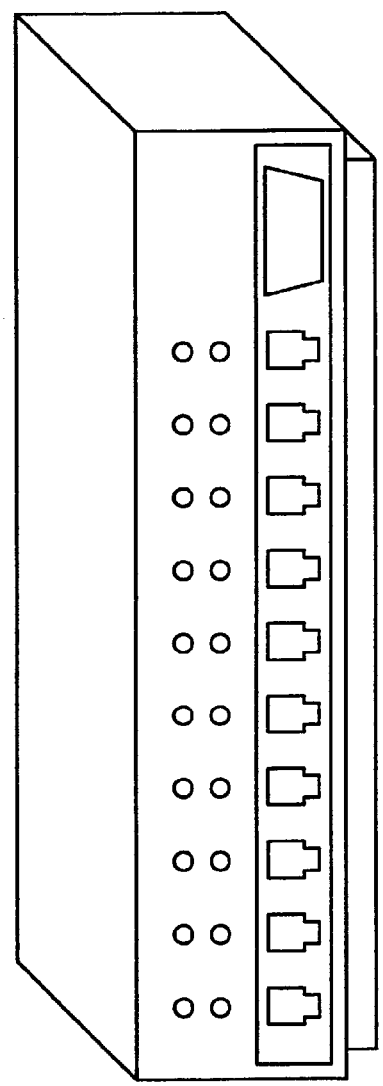
FIG. 1a illustrates a type of network device, referred to as a switch, which includes the MemoryF/X technology according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF THE EMBODIMENTS

Incorporation by Reference

U.S. Pat. No. 6,208,273 titled "System and Method for Performing Scalable Embedded Parallel Data Compression" and filed Oct. 20, 1999, whose inventors are Thomas A. Dye, Manuel J. Alvarez II, and Peter Geiger, is hereby incorporated by reference in its entirety as though fully and completely set forth herein.

U.S. patent application Ser. No. 09/491,343 titled "System and Method for Performing Scalable Embedded Parallel Data Decompression" and filed Jan. 26, 2000, whose inventors are Thomas A. Dye, Manuel J. Alvarez II, and Peter Geiger, is hereby incorporated by reference in its entirety as though fully and completely set forth herein.

U.S. Pat. No. 6,145,069 titled "Parallel Decompression And Compression System And Method For Improving Storage Density And Access Speed For Non-Volatile Memory And Embedded Memory Devices" is hereby incorporated by reference in its entirety as though fully and completely set forth herein.

U.S. patent application Ser. No. 09/239,659 titled "Bandwidth Reducing Memory Controller Including Scalable Embedded Parallel Data Compression and Decompression Engines" and filed Jan. 29, 1999, whose inventors are Thomas A. Dye, Manuel J. Alvarez II, and Peter Geiger, is hereby incorporated by reference in its entirety as though fully and completely set forth herein.

U.S. patent application Ser. No. 60/250,177 titled "System and Method For Managing Compression And Decompression Of System Memory In A Computer System" filed on Nov. 29, 2000, is hereby incorporated by reference in its entirety as though fully and completely set forth herein.

U.S. patent application Ser. No. 09/915,751 titled "System and Method For Managing Compression And Decompression Of System Memory In A Computer System" filed on Jul. 26, 2001 (even date herewith), is hereby incorporated by reference in its entirety as though fully and completely set forth herein.

U.S. patent application Ser. No. 09/550,380 titled "Parallel Compression System And Method For Implementation Of In-Memory Compressed Buffer Cache Improving Storage Density And Access Speed For Industry Standard Memory Subsystems And In-Line Memory Modules" filed on Apr. 4, 2000, is hereby incorporated by reference in its entirety as though fully and completely set forth herein.

Network Switch

FIG. 1A illustrates a network switch 130 which includes compression/decompression technology according to one embodiment of the invention. The network switch 130 may include part or all of the MemoryF/X Technology as described in U.S. Pat. No. 6,208,273. The network switch 130 may be operable to compress/decompress data as data is transferred to/received from a network, such as the Internet, a local area network (LAN) or another type of wide area network (WAN). The compression/decompression technology in the network switch may perform other operations, such as in-memory compressed network queuing and/or compressed network queuing within a crossbar switch.

In telecommunications, a switch is a network device that selects a path or circuit for sending a unit of data to its next destination. Most data today is sent, using digital signals, over networks that use packet-switching. Using packet-switching, all network users can share the same paths at the same time and the particular route a data unit travels can be varied as conditions change. In packet-switching, a message is divided into packets, which are units of a certain number of bytes. Each packet may comprise a payload of data and various header and control information. The network addresses of the sender and of the destination are added to the packet. Each network point may examine the packet to see where to send or route the packet. Packets in the same message may travel different routes and may not arrive in the same order that they were sent. At the destination, the packets in a message are collected and reassembled into the original message.

A switch may also include the function of a router, a device or program that can determine the route and specifically what adjacent network point the data should be sent to. In general, a switch is a simpler and faster mechanism than a router, which requires knowledge about the network and how to determine the route. On larger networks, the trip from one switch point to another in the network is called a hop. The time a switch takes to determine where to forward a data unit is called its latency. Switches are found at the backbone and gateway levels of a network where one network connects with another and at the sub-network level where data is being forwarded close to its destination or origin. The former are often known as core switches and the latter as desktop switches.

Relative to the layered Open Systems Interconnection (OSI) communication model, a switch is usually associated with layer 2, the Data-Link Layer. However, some newer switches also perform the routing functions of layer 3, the Network Layer. Layer 3 switches are also sometimes called IP switches.

Network Hub

Figure 1B:
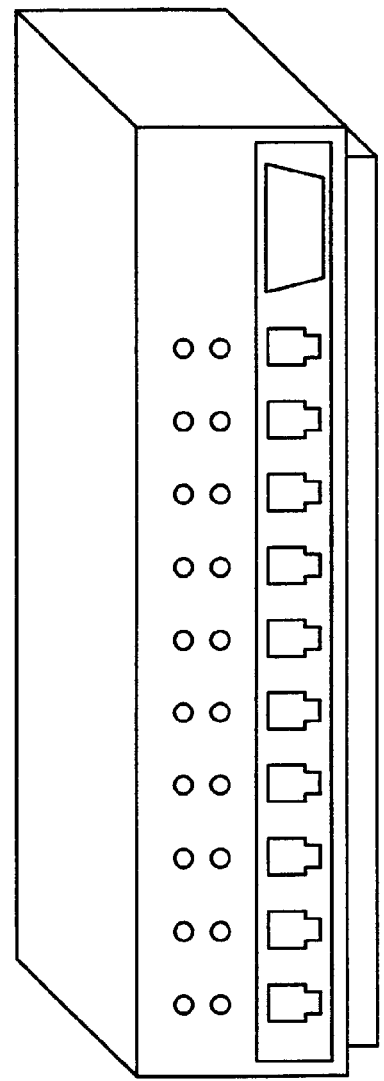
FIG. 1b illustrates a type of network device, referred to as a hub, which includes the MemoryF/X technology according to one embodiment.

FIG. 1B illustrates a network hub which includes compression/decompression technology according to one embodiment of the invention. The network switch 130 may include part or all of the MemoryF/X Technology as described in U.S. Pat. No. 6,208,273. In a similar manner to the network switch 130, the hub is operable to compress/decompress data as data is transferred to/received from a network, such as the Internet, a local area network (LAN) or another type of wide area network (WAN). The compression/decompression technology in the network hub may perform other operations, such as in-memory compressed network queuing and/or compressed network queuing within a crossbar switch.

In data communications, a hub may be defined as a place of convergence in a network where data arrives from one or more directions and is forwarded out in one or more other directions. A hub may include a switch of some kind. One distinction between a switch and a hub is that the hub is the place where data comes together and the switch is what determines how and where data is forwarded from the place where data comes together. Regarded in its switching aspects, a hub can also include a router. As a network product, a hub may include a group of modem cards for dial-in users, a gateway card for connections to a local area network (for example, an Ethernet or a token ring), and a connection to a line (the main line in this example).

A stackable hub is a hub designed to be connected and stacked or positioned on top of another hub, forming an expanding stack. Since a hub is basically a concentrator of device connections, a set of stackable hubs is just a bigger concentrator. Typically, devices with network interface cards (NICs) are connected to each hub with shielded twisted pair or unshielded twisted pair cable. The stackable hubs are typically interconnected with a very short "cascading" cable in the rear of the stack. A special port, such as an Ethernet Attachment Unit Interface port, may be provided to connect the set of stackable hubs to a backbone cable that connects to other sets of stackable hubs or other network devices.

Network Bridge

Figure 1C:
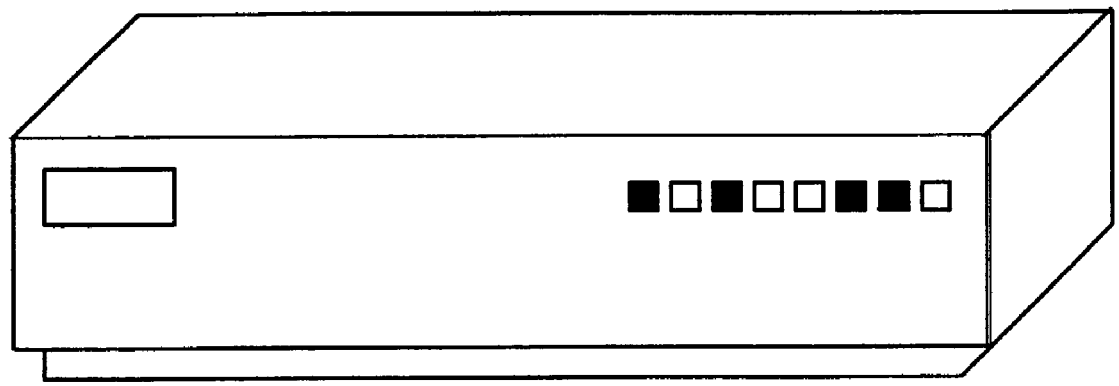
FIG. 1c illustrates a type of network device, referred to as a bridge, which includes the MemoryF/X technology according to one embodiment.

FIG. 1C illustrates a network bridge which includes compression/decompression technology according to one embodiment of the invention. The network bridge may include part or all of the MemoryF/X Technology as described in U.S. Pat. No. 6,208,273. In a similar manner to the network switch 130, the bridge is operable to compress/decompress data as data is transferred to/received from a network, such as the Internet, a local area network (LAN) or another type of wide area network (WAN). The compression/decompression technology in the network bridge may perform other operations, such as in-memory compressed network queuing and/or compressed network queuing within a crossbar switch.

In telecommunication networks, a bridge is a product that connects a local area network (LAN) to another local area network that uses the same protocol (for example, Ethernet or token ring). A bridge examines each message on a LAN, "passing" those known to be within the same LAN, and forwarding those known to be on the other interconnected LAN (or LANs). In bridging networks, computer or node addresses have no specific relationship to location. For this reason, messages are sent out to every address on the network and accepted only by the intended destination node. Bridges learn which addresses are on which network and develop a learning table so that subsequent messages can be forwarded to the right network. Bridging networks are generally interconnected local area networks since broadcasting every message to all possible destinations would flood a larger network with unnecessary traffic. For this reason, router networks such as the Internet use a scheme that assigns addresses to nodes so that a message or packet can be forwarded only in one general direction rather than forwarded in all directions. A bridge works at the data-link (physical network) level of a network, copying a data frame from one network to the next network along the communications path. A bridge is sometimes combined with a router in a product called a brouter.

Network Router

Figure 1D:
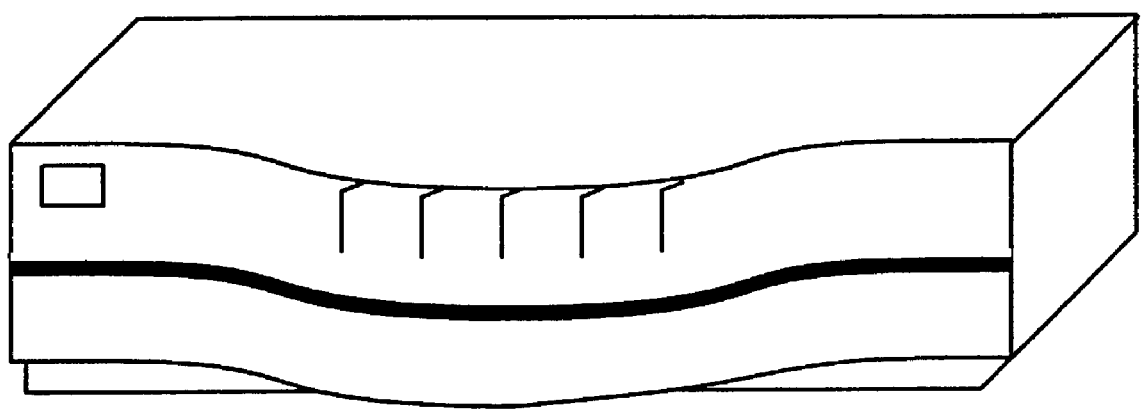
FIG. 1d illustrates a type of network device, referred to as a router, which includes the MemoryF/X technology according to one embodiment.

FIG. 1D illustrates a router which includes compression/decompression technology according to one embodiment of the invention. The network router may include part or all of the MemoryF/X Technology as described in U.S. Pat. No. 6,208,273. In a similar manner to the network switch 130, the router is operable to compress/decompress data as data is transferred to/received from a network, such as the Internet, a local area network (LAN) or another type of wide area network (WAN). The compression/decompression technology in the network router may perform other operations, such as in-memory compressed network queuing and/or compressed network queuing within a crossbar switch.

On a network, a router is a device that determines the next network point to which a packet should be forwarded toward its destination. The router is connected to at least two networks and decides which way to send each information packet based on its current understanding of the state of the networks it is connected to. A router is located at any gateway (where one network meets another), including each Internet point-of-presence. A router is often included as part of a network switch. A router may create or maintain a table of the available routes and their conditions and use this information along with distance and cost algorithms to determine the best route for a given packet. Typically, a packet may travel through a number of network points with routers before arriving at its destination. Routing is a function associated with the Network layer (layer 3) in the standard model of network programming, the Open Systems Interconnection (OSI) model. A layer-3 switch is a switch that can perform routing functions. An edge router is a router that interfaces with an asynchronous transfer mode (ATM) network. A brouter is a network bridge combined with a router.

The term "network device" is used herein to refer to a network switch, network hub, network bridge, network router, a network interface device, and other types of network devices or processors.

Figure 2:
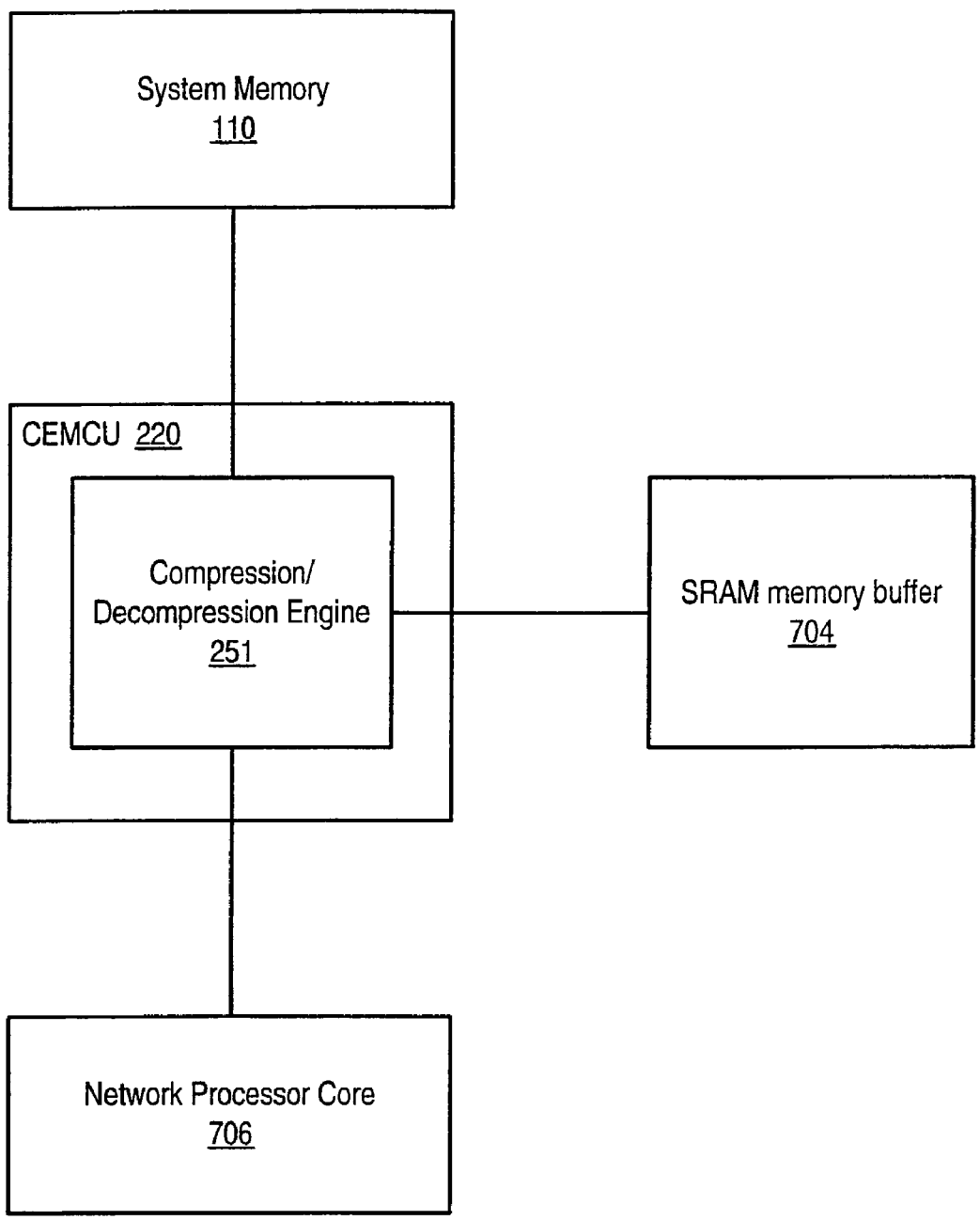
FIG. 2 is a block diagram of a network device e.g., a network switch, according to one embodiment of the invention.

FIG. 2—Block Diagram of a Network Switch

FIG. 2 is a block diagram of a network device, which may include or comprise a Compression Enabled Network Processor (CENP), according to one embodiment of the invention. As one example, the network device or CENP may be a network switch. Input signals to the network device may comprise data packets from one or more various ports. Output signals from the network device may comprise data packets on one or more various ports.

The network device may comprise a compression-enabled memory controller unit (CEMCU) 220. The CEMCU 220 may include one or more compression/decompression units or engines 251. Alternatively, the CEMCU 220 may couple to one or more compression/decompression engines 251 external to the CEMCU 220.

The network device may also comprise a network processor core 706. The network processor core 706 may perform any of various network processor functions. The network processor core 706 may itself include one or more compression/decompression engines 251 as described herein.

The CEMCU 220 may be coupled to an SRAM memory buffer 704. The SRAM memory buffer 704 may optionally be configured as a data cache which feeds the internal network processor core 706.

The CEMCU 220 also may couple to the system memory 110, which may comprise SRAM, SDRAM, DDR-SDRAM or other memory types used for frame and partial frame store protocol handling and manipulation In one embodiment, the system memory 110 may store both uncompressed data and compressed data. Thus certain data where compression is undesirable or not feasible may remain uncompressed, while other data is compressed. In one embodiment, payload data in a packet is compressed, while header and control data in the packet may not be compressed. In another embodiment, the system memory 110 stores only compressed data. For example, in one embodiment compression/decompression may be performed in-line with the system memory 110.

The CENP may comprise the CEMCU 220 and the network processor core 706, and may comprise other components. The CENP provides improved data density, efficiency and bandwidth for each port of a multi-port network switch. To enhance the performance of the CENP, one embodiment comprises a compression and decompression engine coupled to SRAM memory buffer 704. The SRAM memory buffer 704 may optionally be configured as a data cache which feeds the network processor core 706. The compression and decompression engine also optionally couples to the system memory 110, which may comprise SRAM, SDRAM, DDR-SDRAM or other memory types used for frame and partial frame store protocol handling and manipulation as described in steps 1-5 below.

The memory controller portion (the CEMCU 220) of the CENP may optionally contain the compression and decompression logic which may also couple either directly, or through a temporary data latch, to all the Memory Arrays, e.g., the system memory 110. The CENP is designed for the reduction of data bandwidth. The CENP Technology reduces the bandwidth requirements while increasing the memory efficiency for almost all data types within the computer system. Thus, conventional standard memory devices can achieve higher bandwidth, more effective density, with less system power and noise than when used in conventional systems without the CENP technology.

The Compression Enhanced Memory Controller Unit (CEMCU) 220 transfers data between the larger memory banks 220 and the network processor core 706. Therefore, the CEMCU technology of the present invention typically resides between the network processor and the main memory array. In an alternate embodiment, the compression and/or decompression engines may reside in the network processor's memory control unit, thus all memory data including flash memory can make use of lower pin-out interconnect buses, more effective memory performance, and increased effective memory density for all types of memory coupled to each port of the multi-port network switch.

In addition, the CEMCU technology has a "scalable" architecture designed to function in a plurality of memory configurations or compression modes with a plurality of performance requirements as indicated in U.S. Pat. No. 6,208,273 Titled "System and Method for Performing Scalable Embedded Parallel Data Compression" and in U.S. patent application Ser. No. 09/239,659 titled "Bandwidth Reducing Memory Controller Including Scalable Embedded Parallel Data Compression and Decompression Engines" and filed Jan. 29, 1999. Scalability allows for a non-symmetric compression rate as compared to the decompression rate. Write data can match the effective write speed of the network processor core 706, using fewer input symbols in parallel during compression, thus reducing gate count and size. Read data can be decompressed with a different number of input symbols per clock or access, thus allowing the read data to be decompressed at an alternate rate. Thus, the non-symmetric nature of this embodiment during reads and writes allows tuning of the memory access time vs. CEMCU gate count to greatly improve performance and cost.

When configured for "execute in place" (XIP model), and after compressed data is written into the main memory 110 by the CEMCU 220 as directed by the network processor 706, the CEMCU may operate to decompresses the data as it is read by the network processor 706 from the main system memory 110. Optionally, the decompressed data is stored in the network processor's SRAM or is cached in a conventional cache architecture after it is decompressed by the CEMCU technology.

The CENP technology allows data to be stored in multiple compression formats and blocks sizes, as indicated in U.S. Pat. No. 6,208,273 and in U.S. patent application Ser. No. 09/239,659, referenced above. Thus, data can be saved in either a normal or compressed format, retrieved from the main memory array for network processor execution in a normal or compressed format, or transmitted and stored on the backplane in a normal or compressed format.

To improve latency and reduce performance degradations normally associated with compression and decompression techniques the CEMCU encompasses multiple novel techniques such as: 1) Compiler directives for data types and block sizes for optimal compression and access speeds; 2) parallel lossless compression/decompression; selectable compression modes such as lossless, lossy or no compression; 3) data caching techniques; 4) unique address translation, attribute, and address directory structures, as illustrated in U.S. patent application Ser. No. 09/239,659, referenced above.

The CEFMC Technology preferably includes novel parallel compression and decompression engines designed to process frame data at more than a single byte or symbol (character) at one time. These parallel compression and decompression engines modify the single stream dictionary based (or history table based) data compression method described by Lempel and Ziv to provide a scalable, high bandwidth compression and decompression operation. The parallel compression method examines a plurality of symbols in parallel, thus providing greatly increased compression performance. The parallel compression and decompression methods are discussed in greater detail below.

The CENP technology, in an alternate embodiment, reduces latency further by use of multiple compiler hooks to distinguish program data space from table look-up data. Thus, if indicated, a bypass of the decompression engine will send data directly to the output interface bus without delay. A priority scheme can be applied such that compression and decompression operations are suspended as higher priority non-compressed data is transferred. Thus, reduction of latency and improved efficiency can be achieved at the cost of additional parallel buffers and comparison logic. Compiler directives interpreted by the decompression controller, can be embedded within the compiled protocol application code for notification of compression/decompression bypass.

In summary, the integrated data compression and decompression capabilities removes system bottlenecks, allowing a higher frequency network switch operation by decoupling the memory bandwidth requirements from switch transfer speed requirements. In addition, the present invention reduces the data storage size, allowing more storage per processed frame and allows additional ports per network switch. The CENP lowers the cost and improves switch performance due to reduced data storage requirements and improved memory bandwidth. Thus the Compression Enhanced Memory Controller Unit (CEMCE) 220 located within or along side the Compression Enhanced Network Processor (CENP) is a significant advance over the operation of current memory controllers that are used within today's network processor based switches.

Local memory storage, e.g., SRAM memory buffer 704, in the network switch 130 may be used to hold instructions and intermediate frame information in order to accomplish the following steps:

1) Segmentation Assembly and Reassembly (where frames are disassembled and processed and stored for later reassembly prior to forwarding.)

2) Protocol Recognition and Classification (where frames are identified based on information such as protocol type, port number, destination URL or other application or protocol-specific information.)

3) Queuing and Access Control (where identified frames are placed in appropriate queues for further processing such as prioritization or traffic shaping and comparison qualification to security access policies.)

4) Traffic Shaping and Engineering (where some protocols or applications require the specific traffic be shaped to the outgoing fiber or wire in order to meet jitter specifications for the medium.)

5) Quality of Service (where frames of higher priority are tagged for faster processing by downstream devices within the network.)

These protocol-processing steps utilize memory for temporary storage of frame data and header information, including the application and control code run by the network-processing unit. In one embodiment, the CEMCU and/or the CENP may be operable to compress/decompress data to/from the memory storage during performance of any one or more (or all) of the above steps.

Thus, the CEMCU and/or the CENP may be operable to compress/decompress data to/from the memory storage during segmentation assembly and reassembly of frames or packets, e.g., where frames are disassembled and processed and stored for later reassembly prior to forwarding. This may reduce the amount of storage and/or bandwidth required for this operation.

The CEMCU and/or the CENP may also be operable to compress/decompress data to/from the memory storage during protocol recognition and classification, e.g., where frames are identified based on information such as protocol type, port number, destination URL or other application or protocol-specific information. Again, this may reduce the amount of storage and/or bandwidth required for this operation.

The CEMCU and/or the CENP may also be operable to compress/decompress data to/from the memory storage during queuing and access control, e.g., where identified frames are placed in appropriate queues for further processing such as prioritization or traffic shaping and comparison qualification to security access policies. Again, this may reduce the amount of storage and/or bandwidth required for this operation.

The CEMCU and/or the CENP may also be operable to compress/decompress data to/from the memory storage during traffic shaping and engineering. Again, this may reduce the amount of storage and/or bandwidth required for this operation.

The CEMCU and/or the CENP may also be operable to compress/decompress data to/from the memory storage during quality of service operations, e.g., where frames of higher priority are tagged for faster processing by downstream devices within the network. Again, this may reduce the amount of storage and/or bandwidth required for this operation.

This allows for more memory storage per network processor node is required for intermediate frame information storage and retrieval. Thus this embodiment reduces the size and cost of such memory storage while maintaining the high bandwidth requirements of such storage.

Network devices such as routers may have several subsystems or "cards" that have a common bus interface, either a shared bus or a crossbar switch. The shared bus allows one network card to communicate with another network card at a time and may be used in a lower cost implementation. The crossbar switch may allow first and second cards to communicate and may allow third and fourth cards to communicate concurrently. The network device typically includes at least one input queue and at least one output queue on either side of the shared bus or crossbar switch. These queues facilitate the transfer of data within a network device, and reduce data traffic issues during burst situations.

In one embodiment, the compression/decompression engine and a compressed memory management unit (CMMU), e.g., a portion or all of the Memory F/X technology described in U.S. Pat. No. 6,208,273, operates to improve the bandwidth and throughput of the network queuing operation in both shared bus and crossbar switch architectures. Thus data, e.g., payload data, written to/from the queues in the network device may be compressed data, thus resulting in reduced traffic and improved bandwidth. An example CMMU is described in U.S. Application Ser. No. 60/250,177, referenced above.

Network devices typically include one or more network processors that are distributed in various network cards and/or subsystems. Network processors or other dedicated processors may also be used to manage queues and routing of information. In one embodiment, Memory F/X compression/decompression technology, including a CMMU, may be used to compress/decompress software instructions and data that is being accessed by a network processor. For example, data or data pages that are less frequently used may be stored in memory in a compressed format. More recently used pages may be stored in memory in an uncompressed format for faster access. L1, L2, and/or L3 caches may be used to cache uncompressed most recently used data to further improve bandwidth.

In one embodiment, memory comprised in a network device may store mostly compressed data, or may solely store compressed data. In one embodiment, a compression/decompression engine may be placed "in-line" with the network device memory. Thus, some or all data written to the network device memory may be compressed for storage in a compressed format in the network device memory, and requested data may be retrieved in a compressed format and decompressed "in-line" to produce uncompressed data to the requester.

Figure 3:
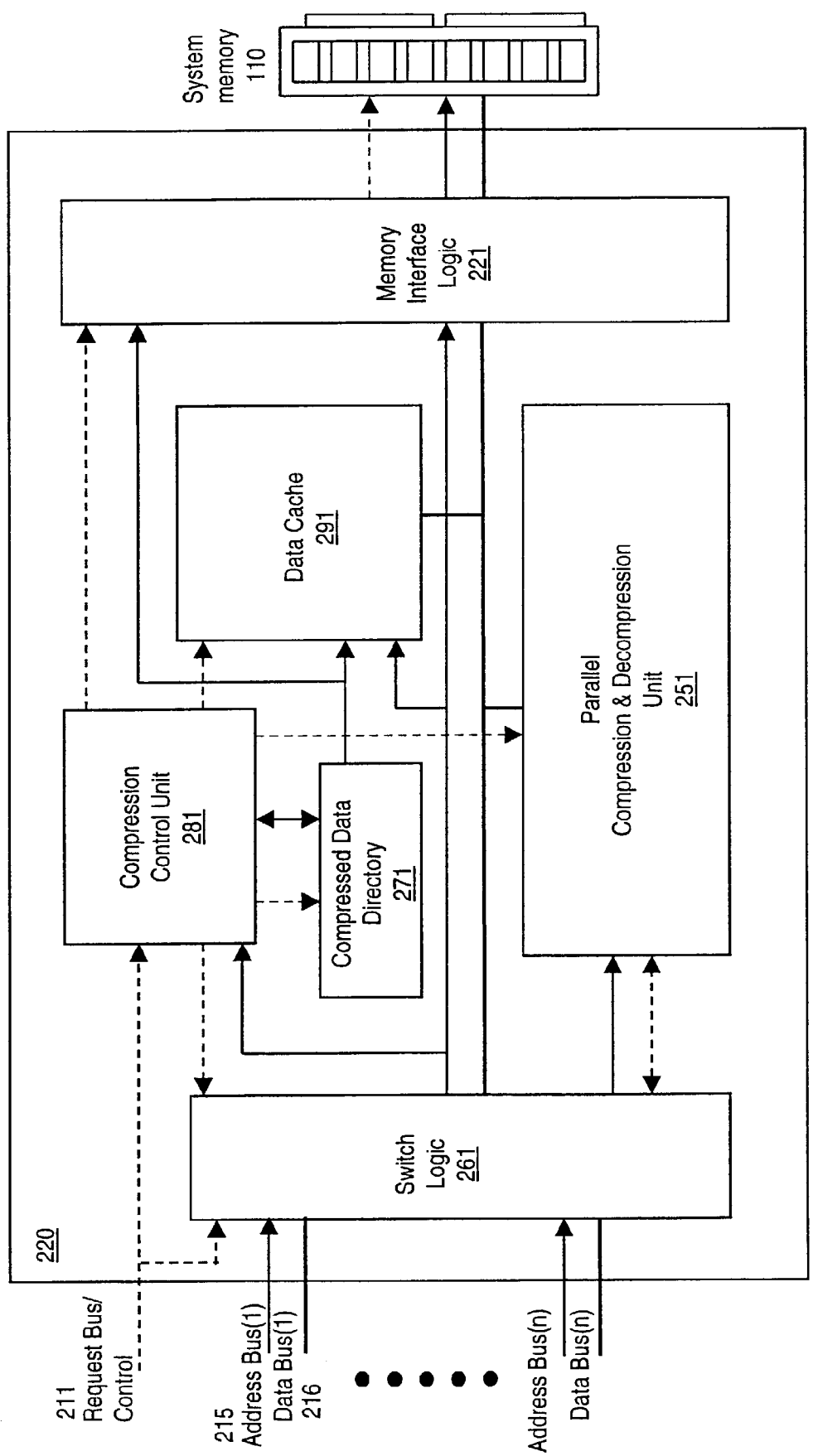
FIG. 3 is a block diagram illustrating the internal architecture of the Memory Controller unit of the IMC.

FIG. 3—Memory Controller Unit

FIG. 3 illustrates an exemplary memory controller block 220. In one embodiment the memory controller 220 includes a parallel compression and decompression engine 251. In an alternate embodiment the memory controller 220 includes a single or serial compression engine and a single or serial decompression engine. Also, the parallel compression and decompression unit 251 may include a separate lossy compression and decompression engine (discussed later in this disclosure) which also may be designed as separate or unified units. Additional alternate embodiments may apply individual compression and/or decompression units located in multiple areas of the network device for optimal efficiency of compression or decompression.

The memory controller block 220 may include one or more parallel or serial compression/decompression engines, including one or more parallel and/or serial lossless compression/decompression engines and/or one or more parallel and/or serial lossy compression/decompression engines. The term "compression/decompression engine" as used herein is intended to include all such combinations of one or more parallel, serial, lossless and/or lossy compression/decompression engines, whether they be integrated or separate blocks, and whether they be comprised in or external to the memory controller, or comprised in another unit. The Parallel compression and decompression unit 251 is described in detail in the following sections.

Support blocks for the memory controller 220 may include the switch logic 261, compression control unit 281, compressed data directory 271, data cache memory 291, and the memory interface logic 221. The data cache 291 may be standard memory (SRAM or Embedded DRAM) and may be configured other than as cache type memory.

Figure 4:
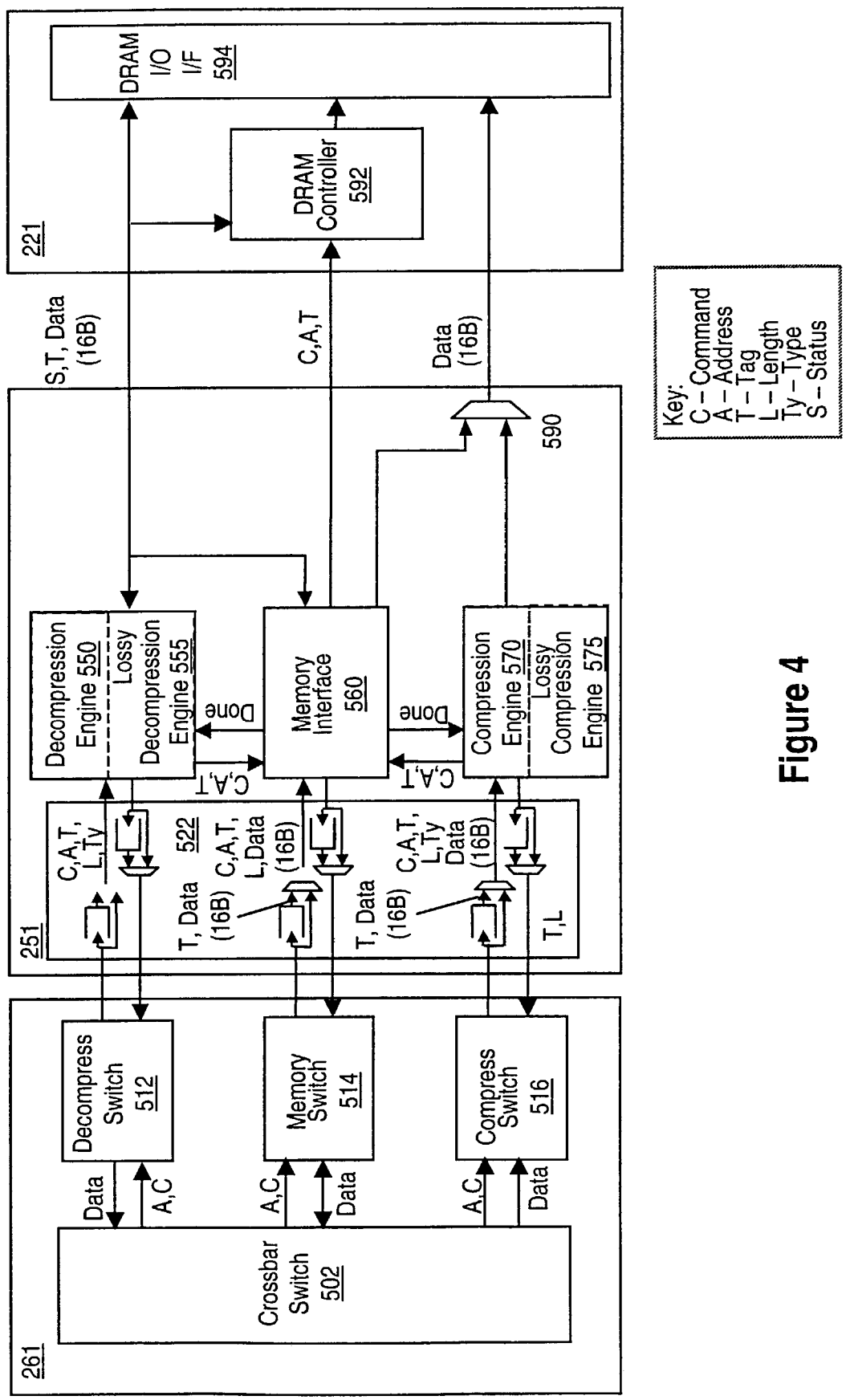
FIG. 4 is a more detailed block diagram illustrating the compression/decompression logic comprised in the IMC 140.

FIG. 4—Compression/Decompression Engine

As shown in FIG. 4, the parallel compression and decompression 251 block preferably includes compression engines 570/575 and decompression engines 550/555. As noted above, the parallel compression and decompression unit 251 may contain a single lossless parallel compression and decompression engine and/or a single lossy compression and decompression engine, or a combination of lossless and/or lossy engines. The parallel compression and decompression unit 251 may also comprise multiple parallel lossless parallel compression and decompression engines, i.e., multiple parallel compression and/or decompression engines which themselves operate in parallel.

The parallel compression and decompression unit 251 performs high speed parallel compression and decompression using a parallel symbol data stream, instead of a serial symbol data stream as in conventional implementations. The parallel operation of the compression and decompression unit 251 is optimized for bandwidth reduction and reduced latency. Thus the parallel compression and decompression engines allows a higher speed decompression and compression rate, which substantially increases bandwidth and reduces latency of that over prior art compression and decompression engines. The algorithm for the parallel compression invention is further described in detail below.

FIG. 4 also illustrates the internal diagram of the switch logic 261. The switch 261 may perform data format and address conversion as well as the arbitration of multiple requests from a plurality of other units. The switch logic 261 may include a crossbar switch 502 that performs the selection of the current memory transaction request. This selection is performed by one of a plurality of arbitration methods with the intention to deliver data first to units that must operate real time memory transactions. The priority order, block size, and request latency may be software programmable. Thus, the system performance and memory transaction efficiency and/or response can be adjusted dynamically by software control.

The switch logic 261 may contain specific data selection units separating normal uncompressed reads and writes from compressed reads and writes. Decompression switch 512 determines a block read operation by sending command, address, block tags, data type and length information to the decompression engine 550 and 555. In addition the decompression switch 512 receives decompressed data and transaction tag information from the decompression engine 550 and/or 555. The decompression switch 512 may be pipelined for a plurality of system memory read requests at the same time. The tag field allows multiple outstanding requests to be issued to the decompression engines 550 and/or 555 in parallel.

Similarly, the switch logic 261 may comprise a normal memory switch 514 for read and write transactions that require no compression or decompression operation. In one embodiment, some data address ranges or requests from specific request units may not need or want to have compression operations. Thus the memory switch 514 may generate block transfer, address generation, data tags, length and command information for interface to the memory interface unit 560.

The switch logic 261 may include compress switch 516 which performs command, address, tag, length and data type preparation for the compression engine 570 and/or 575. Data written to the memory controller 220 by a plurality of requesting units 211 are received by the compress switch 516 and will be either compressed and written to main memory 110 or, if in the valid address range of the data cache 291, will be written to the data cache 291 under control of the memory switch 514.

Thus, the compression cache control unit 281 along with the switch unit 261 may determine the transaction type, priority and control required to complete the transaction by either the data cache 291, the parallel compression and decompression unit 251 or the memory interface 560. As indicated in FIG. 4, one embodiment shows transaction sizes of 16 data bytes. In alternate embodiments the transaction sizes can be any number of data bytes.

As discussed above in FIG. 3, the data cache 291 may interact with the cache control unit 281. For transactions that have address ranges with associated data located within the data cache 291, the decompression engine 550, memory interface 560, and compression engine 570, may not be used, and data is read or written directly into the data cache 291. Thus, for L3 data cache hits, data bypasses the parallel compression and decompression unit 251 and may be read or written directly to/from the data cache 291 in a non-compressed format.

In addition, again referring to FIG. 4, the parallel compression and decompression unit 251 may includes data and command transfer multiplexers 522 and write data multiplexers 590. The command transfer multiplexers 522 perform data, command address, tag, length switching and interfacing to the decompression engine 550/555, memory interface 560, and compression engines 570/575. Alternate embodiments may include the transfer multiplexers 522 in the switch logic 261 in a single rather than multiple bus design. The write data multiplexers 590 perform the selection between normal (uncompressed) data writes and compressed data writes to the memory 110.

The memory interface unit 221 interfaces to the decompression engines 550 and/or 555 for status, tags and read data, interfaces to the memory interface 560 for both read, write control, address and tags, and interfaces to the compression engines 570 and/or 575 for write data. The memory interface unit 221 may include a DRAM controller 592 and a DRAM I/O interface 594. The DRAM controller 592 may perform the timing of the control signals and address to the DRAM I/O interface 594 to control the main memory bank 110. In one embodiment the control of RDRAM memory is controlled by the high speed analog RAC located within the DRAM I/O interface 594. In alternate embodiments other memory types such as SDRAM, DRDRAM, SLDRAM, or VMC require additional logic in the DRAM I/O interface 594. Thus, the memory interface logic 221 is internal to the memory controller 220 and interfaces to the compression control unit 281 for control signals, the switch logic 261 for address, tags, control and data signals, the parallel compression and decompression unit 251 for address, control and data transactions. In addition the memory interface logic 221 performs the memory interface and signal conditioning for interfacing to the memory 110.

Parallel Lossless Compression and Decompression

The parallel compression/decompression unit or engine 251, which performs parallel compression and decompression functions, is now discussed. The engine 251 is preferably a dedicated codec hardware engine, e.g., the engine is comprised of logic circuitry. In one embodiment, the codec engine 251 comprises a programmable DSP or CPU core, or programmable compression/decompression processor, with one or more ROMs or RAMs which store different sets of microcode for certain functions, such as compression, decompression, special types of graphical compression and decompression, and bit blit operations, as desired. In this embodiment, the codec engine 251 dynamically shifts between the different sets of microcode in the one or more memories, depending on the function being performed. The compression/decompression engine may also be implemented using reconfigurable or programmable logic, e.g., one or more FPGAs.

As shown in FIG. 4, in one embodiment, the engine 251 preferably includes an embedded lossless parallel data compression engine 570 and parallel decompression engine 550 designed to compress and decompress data as data is transferred to/from system memory 110. The compression engine 570 and decompression engine 550 may be constructed using any of the techniques described with reference to the engine 251, including hardware engines comprised of logic circuitry, programmable CPUs, DSPs, a dedicated compression/decompression processor, or reconfigurable or programmable logic, to perform the parallel compression and decompression method of the present invention. Various other implementations may be used to embed a compression/decompression within the memory controller according to the present invention. In one embodiment, the compression engine 570 and decompression engine 550 comprise hardware engines, or alternatively use pieces of the same engine for compression and decompression. In the following description, the parallel compression and decompression unit is described as having separate compression and decompression engines 570 and 550.

For a general overview of the benefits and methods for using compression and decompression engines in the main system memory controller, refer to U.S. Pat. Nos. 6,170,047 and 6,173,381.

The network device may include two data formats referred to as "compressed" data and "non-compressed" data. The compressed data format requires less storage and thus is less expensive. The compressed format also requires less system bandwidth to transfer data between system memory 110 and I/O subsystems. The decompression from compressed data format to normal data format may result in a small performance penalty. However, the compression of non-compressed data format to compressed data format may not have an associated penalty, although there may be an added latency which would normally be hidden. However, if the data doesn't compress well, and there is a long series of stores which need compressed, compression performance could suffer.

In one embodiment, the compression engine 570 and decompression engine 550 in the network device comprise one or more hardware engines that perform a novel parallel lossless compression method, preferably a "parallel" dictionary based compression and decompression algorithm. The parallel algorithm may be based on a serial dictionary based algorithm, such as the LZ77 (preferably LZSS) dictionary based compression and decompression algorithm. The parallel algorithm may be based on any variation of conventional serial LZ compression, including LZ77, LZ78, LZW and/or LZRW1, among others.

The parallel algorithm could also be based on Run Length Encoding, Predictive Encoding, Huffman, Arithmetic, or any other lossless compression algorithm. However, the parallelizing of these is less preferred due to their lower compression capabilities and/or higher hardware costs.

As a base technology, any of various lossless compression methods may be used as desired. As noted above, a parallel implementation of LZSS compression is preferably used, although other lossless compression methods may allow for fast parallel compression and decompression specifically designed for the purpose of improved memory bandwidth and efficiency.

For more information on a data compression and decompression system using serial LZ compression, please see U.S. Pat. No. 4,464,650 which is hereby incorporated by reference. The above patent presents implementations of the LZ77 data compression method described by Lempel and Ziv in "Compression of Individual Sequences Via Variable-Rate Coding," IEEE Transactions on Information Theory, IT-5, September 1977, pages 530-537, and "A Universal Algorithm for Sequential Data Compression," IEEE Transactions on Information Theory, Volume 23, No. 3 (IT-23-3), May 1977, pages 337-343, wherein the above two articles are both hereby incorporated by reference. U.S. Pat. No. 4,701,745, titled "Data Compression System," which issued Oct. 20, 1987, describes a variant of LZ77 called LZRW1, and this patent is hereby incorporated by reference in its entirety. A modified version of the LZ78 algorithm is referred to as LZW and is described in U.S. Pat. No. 4,558,302. Another variant of LZW compression is described in U.S. Pat. No. 4,814,746.

In an alternate embodiment, the data compression and decompression engines 570 and 550 utilize parallel data compression/decompression processor hardware based on the technology disclosed in U.S. Pat. No. 5,410,671, titled "Data Compression/Decompression Processor," which issued Apr. 25, 1995 and which is hereby incorporated by reference in its entirety.

The network device may also utilize parallel data compression/decompression techniques of the present invention based on the serial techniques described in U.S. Pat. No. 5,406,279 titled "General Purpose, Hash-Based Technique for Single Pass Lossless Data Compression,"; U.S. Pat. No. 5,406,278 titled "Method and Apparatus for Data Compression Having an Improved Matching Algorithm which Utilizes a Parallel Hashing Technique,"; and U.S. Pat. No. 5,396,595 titled "Method and System for Compression and Decompression of Data." In alternate embodiments, other types of parallel or serial data compression/decompression methods may be used.

The compression/decompression engine 251 of the present invention may include specialized compression/decompression engines 575/555 for image data. The preferred embodiment of the lossy compression/decompression engine is described in U.S. Pat. No. 6,208,273, which was previously incorporated by reference. A parallel decompression embodiment is described with reference to FIGS. 7-18.

Other embodiment may utilize various types of image compression and decompression techniques.

Figure 5:
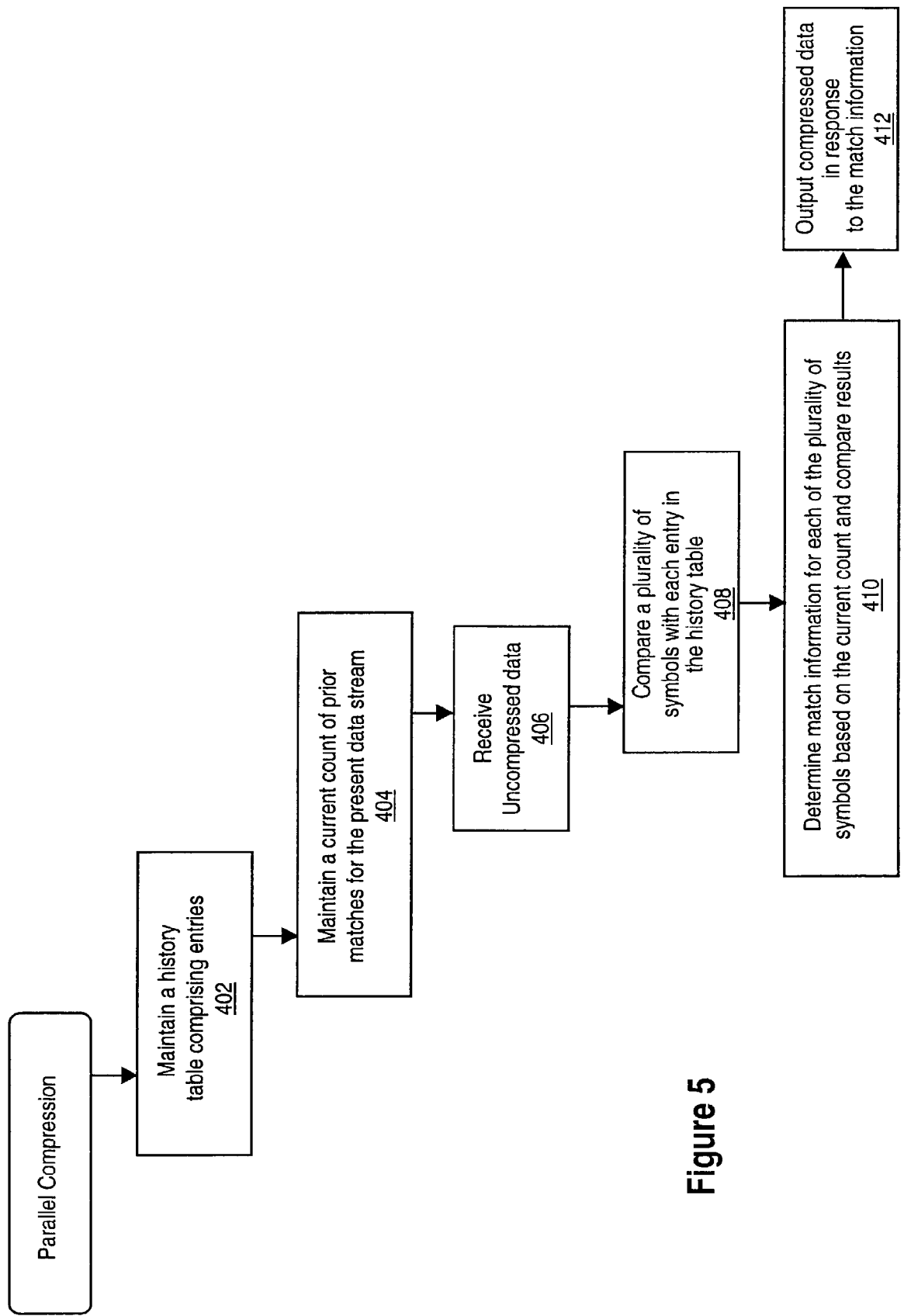
FIG. 5 is a high-level flowchart diagram illustrating operation of the parallel compression.

FIG. 5—High Level Flowchart of the Parallel Compression Algorithm

FIG. 5 is a high-level flowchart diagram illustrating operation of the parallel compression algorithm in the preferred embodiment. Steps in the flowchart may occur concurrently or in different orders.

In step 402 the method maintains a history table (also called a history window) comprising entries, wherein each entry may comprise one symbol. The history table is preferably a sliding window which stores the last n symbols of the data stream.

In step 404 the method maintains a current count of prior matches which occurred when previous symbols were compared with entries in the history table. A current count may be maintained for the present data stream, and each entry may maintain a Maximum Count Flag to indicate that this entry is the starting point of the match. In an alternate and less preferred embodiment, separate counts may be maintained for each entry in the history table. The currently preferred embodiment maintains a single current count and maintains separate count flags for each entry in the history table, since this requires less logic than maintaining a separate count for each entry in the history table.

In the present disclosure, the term "count information" is intended to include the count of prior matches and a count flag that is maintained for each entry in the history table. The term "count information" is also intended to include a plurality of current counts that are maintained for each entry in the history table.

It is noted that maintenance of the history table and the current count flags are performed throughout the algorithm based on previously received symbols, preferably starting when the first plurality of symbols are received for compression.

In step 406 the method receives uncompressed data, wherein the uncompressed data comprises a plurality of symbols. Thus the parallel compression algorithm operates on a plurality of symbols at a time. This is different than conventional prior art serial algorithms, which operate in a serial manner on only one symbol at a time. The plurality of symbols comprises 2 or more symbols, preferably a power of 2. In the preferred embodiment, the parallel compression algorithm operates on 4 symbols at a time. However, implementations using 8, 16, 32 or more symbols, as well as other non-power of 2 numbers, may be readily accomplished using the algorithm described herein.

In step 408 the method compares the plurality of symbols with each entry in the history table in a parallel fashion. This comparison produces compare results. Each entry in the history table preferably compares with each of the plurality of symbols concurrently, i.e., in a parallel fashion, for improved speed. In other words, each of the plurality of symbols is compared with each entry in the history table concurrently or simultaneously, or in the same clock cycle.

In step 410 the method determines match information for each of the plurality of symbols based on the current count flag, and the compare results. Step 410 of determining match information includes determining zero or more matches of the plurality of symbols with each entry in the history table. More specifically, step 410 may include determining a longest contiguous match based on the current count and the compare results, and then determining if the longest contiguous match has stopped matching. If the longest contiguous match has stopped matching, then the method updates the current count flags and maximum count.

In step 412 the method outputs compressed data information in response to the match information. Step 412 may involve outputting a plurality of sets of compressed data information in parallel, e.g., for different matches and/or for non-matching symbols. Step 412 includes outputting compressed data information corresponding to the longest contiguous match which stopped matching, if any. The contiguous match may involve a match from a prior plurality of symbols. Step 412 may also include outputting compressed data information solely from a prior match. Step 412 also includes, for non-matching symbols which do not match any entry in the history table, outputting the non-matching symbols in an uncompressed format.

For a contiguous match, the compressed data information includes a count value and an entry pointer. The entry pointer points to the entry in the history table which produced the contiguous match, and the count value indicates a number of matching symbols in the contiguous match. In one embodiment, an encoded value is output as the count value, wherein more often occurring counts are encoded with fewer bits than less often occurring counts.

Steps 402-412 are repeated one or more times until no more data is available. When no more data is available, then, if any current counts are non-zero, the method outputs compressed data for the longest remaining match in the history table.

Since the method performs parallel compression, operating on a plurality of symbols at a time, the method preferably accounts for symbol matches comprised entirely within a given plurality of symbols, referred to as the "special case". Here presume that the plurality of symbols includes a first symbol, a last symbol, and one or more middle symbols. Step 410 of determining match information includes detecting if at least one contiguous match occurs with one or more respective contiguous middle symbols, and the one or more respective contiguous middle symbols are not involved in a match with either the symbol before or after the respective contiguous middle symbols. If this condition is detected, then the method selects the one or more largest non-overlapping contiguous matches involving the middle symbols. In this instance, step 412 includes outputting compressed data for each of the selected matches involving the middle symbols.

Figure 6:
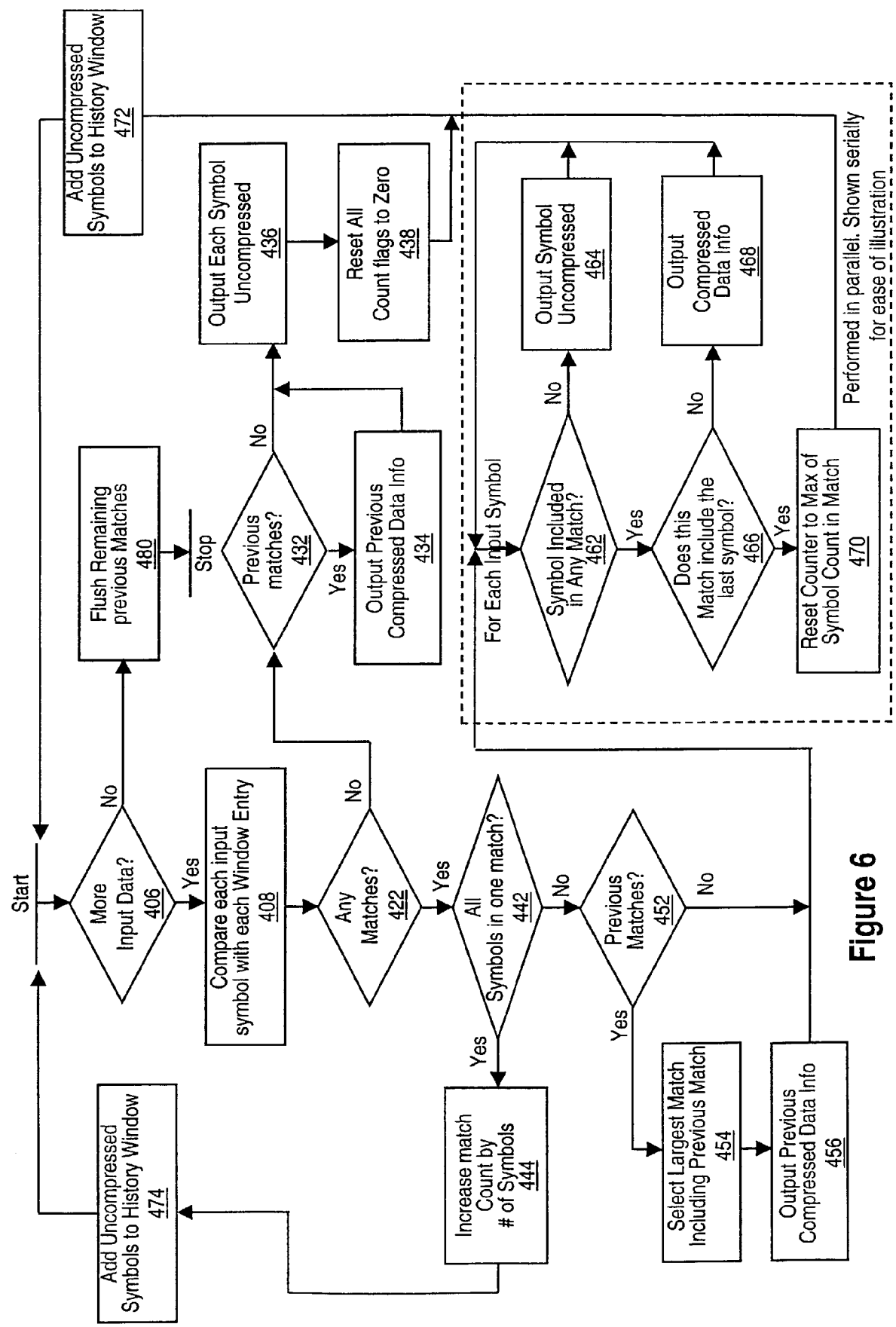
FIG. 6 is a more detailed flowchart diagram illustrating operation of the parallel compression.

FIG. 6—Detailed Flowchart of the Parallel Compression Algorithm

FIG. 6 is a more detailed flowchart diagram illustrating operation of the parallel compression algorithm in the preferred embodiment. Steps which are similar or identical to steps in FIG. 5 have the same reference numerals for convenience.

In the flowchart of FIG. 6, it is presumed that the method maintains a history table comprising entries, wherein each entry comprises one symbol. The history table is preferably a sliding window which stores the last n symbols of the data stream. It is also presumed that the method maintains a current count of prior matches which occurred when previous symbols were compared with entries in the history table. A count flag may be maintained for each entry in the history table. As noted above, the maintenance of the history table and the current count flags are performed throughout the algorithm, preferably starting when the first plurality of symbols are received for compression.

In step 406 the method receives uncompressed input data, wherein the uncompressed data comprises a plurality (or group) of symbols. Thus the parallel compression algorithm operates on a plurality of symbols at a time. This is different than conventional prior art algorithms, which operate in a serial manner on only one symbol at a time. The plurality of symbols comprises 2 or more symbols, preferably 4 symbols. As noted above, the parallel compression algorithm can operate on any number of symbols at a time. The input data may be the first group of symbols from a data stream or a group of symbols from the middle or end of the data stream.

In step 408 the method compares the plurality of symbols with each entry in the history table in a parallel fashion. This comparison produces compare results. Each entry in the history table preferably compares with each of the plurality of symbols concurrently, i.e., in a parallel fashion, for improved speed.

In step 422 the method determines zero or more matches of the plurality of symbols with each entry in the history table. In other words, in step 422 the method determines, for each entry, whether the entry matched any of the plurality of symbols. This determination is based on the compare results.

If no matches are detected for the plurality of symbols in step 422, then in step 432 the method determines if any previous matches existed. In other words, step 432 determines if one or more ending symbols from the prior group of symbols matched entries in the history table, and compressed information was not yet output for these symbols since the method was waiting for the new plurality of symbols to possibly determine a longer contiguous match. If one or more previous matches existed as determined in step 432, then in step 434 the method outputs the previous compressed data information. In this case, since the prior matches from the prior group of symbols are not contiguous with any symbols in the current group, the previous compressed data information is output. After step 434, operation proceeds to step 436.

If no previous matches existed as determined in step 432, or after step 434, then in step 436 the method outputs each symbol of the plurality of symbols as uncompressed symbols. Since each of the plurality of symbols does not match any entry in the history table, then each of the plurality of symbols are output in an uncompressed format. After step 436, in step 438 all count flags are reset to 0. In step 472 the uncompressed symbols are added to the history window, and operation returns to step 406 to receive more input data, i.e., more input symbols.

If one or more matches are detected for the plurality of symbols in step 422, then in step 442 the method determines if all of the plurality of symbols are comprised in one match. If so, then in step 444 the method increases the match count by the number of matching symbols, e.g., 4 symbols, and sets the maximum count flag for the respective entry. In step 474 the uncompressed symbols are added to the history window, and operation returns to step 406 to receive more input data, i.e., more input symbols. In this case, the method defers providing any output information in order to wait and determine if any symbols in the next group contiguously match with the current matching symbols.

If all of the plurality of symbols are not comprised in one match as determined in step 442, then in step 452 the method determines if any previous matches existed. The determination in step 452 is similar to the determination in step 432, and involves determining if one or more ending symbols from the prior group of symbols matched entries in the history table, and compressed information was not yet output for these symbols since the method was waiting for the new plurality of symbols to possibly determine a longer contiguous match.

If one or more previous matches existed as determined in step 452, then in step 454 the method selects the largest contiguous match including the previous match. In step 456 the method outputs compressed data information regarding the largest contiguous match. This compressed data information will include previous compressed data information, since it at least partly involves a previous match from the previous group of symbols. If the first symbol in the current plurality of symbols is not a contiguous match with the previous match, then the compressed data information will comprise only the previous compressed data information. After step 456, operation proceeds to step 462.

Steps 462-470 may be performed for each input symbol in a parallel fashion. In other words, steps 462-470 may be performed concurrently for each input symbol. Steps 462-470 are shown in a serial format for ease of illustration.

In step 462 the method determines if the respective symbol is included in any match. If not, then in step 464 the method outputs the uncompressed symbol. In this case, the respective symbol does not match any entry in the history table, and thus the symbol is output uncompressed.

If the respective symbol is included in a match as determined in step 462, then in step 466 the method determines if the match includes the last symbol. If not, then in step 468 the method outputs compressed data information for the match. It is noted that this may involve a "special case" involving a match comprising only one or more middle symbols.

If the match does include the last symbol as determined in step 466, then in step 470 the method resets the counter to the number of symbols not included in the match. In this case, compressed information is not output for these symbols since the method waits for the new plurality of symbols to possibly determine a longer contiguous match.

Once steps 462-470 are performed for each input symbol in parallel, then in step 472 the uncompressed symbols are added to the history window. Operation then returns to step 406 to receive more input data, i.e., a new plurality or group of input symbols. If no more input data is available or is received, then in step 480 the method flushes the remaining previous matches, i.e., provides compressed information for any remaining previous matches.

The method of FIG. 6 also accounts for matches within the middle symbols as described above.

For more information on the parallel compression technique according to one embodiment, please see U.S. Pat. No. 6,208,273, which is incorporated by reference.

Lossless Decompression

One embodiment of the parallel decompression engine 550 for the lossless decompression of compressed data is now disclosed. Data compression methods may include serial compression methods, where only one symbol from the uncompressed data is examined and compressed at a time, and the novel parallel compression methods described above, where a plurality of symbols from the uncompressed data may be examined and compressed at a time. In one embodiment, the parallel decompression engine 550 may be able to decompress data compressed by serial or parallel decompression methods. Likewise, decompression of compressed data using the parallel decompression technologies of the present invention produces the same uncompressed data stream as decompression of the same compressed data using prior art serial decompression techniques. The compressed data created using the parallel compression methods described above is designed to be identical to compressed data created using serial compression algorithms; therefore, decompressing data compressed with the parallel method described above by either serial or parallel decompression engines will result in the same uncompressed data. Preferably, decompression is performed as fast as the compression operation or faster. Also, in alternate embodiments, decompression engines 550/555 may be placed in a plurality of locations within the system or circuit. Multiple decompression engines allow for a custom operation of the decompression process and a custom bandwidth or throughput may be designed depending on the number of stages used in the decompression engine 550. Therefore, below is a parallel decompression algorithm for the parallel decompression engine 550 that yields higher bandwidth than prior art serial algorithms.

FIGS. 7-18—An Embodiment of a Parallel Decompression Engine

Figure 8:
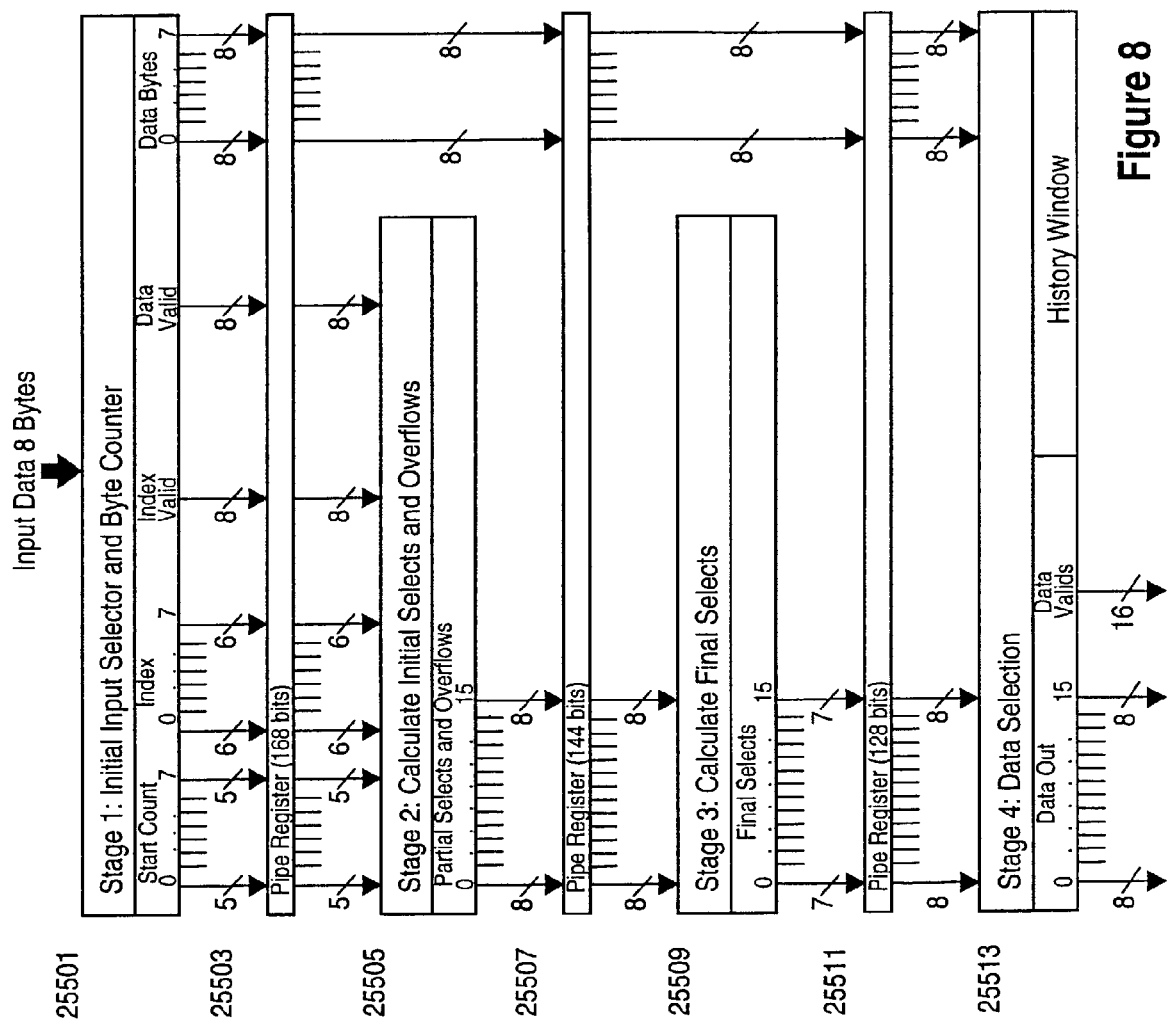
FIG. 8 illustrates four stages used for the parallel lossless decompression algorithm according to one embodiment of the invention.

The parallel decompression engine 550 may be divided into a series of stages, preferably pipelined stages. The stages of the decompression engine 550 are illustrated in FIG. 8. As shown, the decompression engine 550 may include a first stage 25501 comprising decoders, a second stage 25505 comprising preliminary (also called initial or primary) select generation logic, a third stage 25509 comprising final select generation logic, and a fourth stage 25513 comprising data selection and output logic. A pipe register 25503 may be coupled to the first stage 25501 and the second stage 25505. A pipe register 25507 may be coupled to the second stage 25505 and the third stage 25509. A pipe register 25511 may be coupled to the third stage 25509 and the fourth stage 25513. According to one embodiment, the pipelined design is expected to utilize four stages to run at 133 MHz using a 0.25µ CMOS technology. These stages are preferably divided up, or alternatively combined, as the silicon process technology requires. Only the last stage in this pipeline 25513 uses the history window, and that final stage contains minimum logic. Based on this, this function may be extended to more than four stages if a significantly faster clock is available. Thus, in alternate embodiments, as processing improves and clock rates increase, the stages of the decompression engine 550 may increase to raise the decompression rate with the same input compression stream. However, for the preferred embodiment the four stages shown are the logical divisions of the function. Other embodiments may include fewer than four stages. For example, a three-stage embodiment may combine the second and third stage into one stage.

In the preferred embodiment, the decompression engine 550 includes a pipelined, multi-stage design. The pipelined, multi-stage design of the decompression engine 550 enables the substantially simultaneous or concurrent processing of data in each stage. As used herein, the term "decompression cycle" includes operation of all stages of the pipeline on a set of data, from analysis of tokens in an input section of data in the first stage to production of output uncompressed data in the last stage. Thus, multiple "decompression cycles" may be executing substantially concurrently, i.e., different stages of multiple "decompression cycles" may be executing substantially concurrently.

For example, the first stage 25501 may receive a first plurality of codes (also called tokens), and load the first tokens into the decoders at the start of a first decompression cycle. The decoders may extract various first decoded information from the first tokens, and this first decoded information may be latched into pipe register 25503. The first decoded information may then be loaded into the preliminary select logic of the second stage 25505. While the preliminary select logic of the second stage 25505 is operating on the first decoded information, a next plurality of tokens (second tokens) may be received by the first stage 25501 and loaded into and processed by the decoders at the start of a second decompression cycle, substantially simultaneously, to produce second decoded information. When stage two has completed generating preliminary selects from the first decoded information in the first decompression cycle, the preliminary selects are latched into pipe register 25507 in the second decompression cycle. Similarly, when stage one has completed generating the second decoded information in the second decompression cycle, this second decoded information may be latched into pipe register 25503. The preliminary selects may then be loaded into the third stage 25509 for resolution into final selects, while the second decoded information generated in the first stage 25501 for the second decompression cycle is loaded into the second stage 25505, and a next (third) plurality of tokens is received by the first stage 25501 and loaded into the decoders to begin a third decompression cycle. Thus, in the four-stage embodiment of decompression engine 550, four decompression cycles may be active in the decompression engine 550 substantially simultaneously.

As used herein, in the context of the first stage examining a plurality of tokens from the compressed data in parallel in a current decompression cycle, the term "in parallel" includes the notion that a plurality of tokens may be operated on by the logic during a single pipeline stage of the decompression engine 550. The term "in parallel" also may include the notion that a plurality of decoders operate on a plurality of tokens during a single pipeline stage of the decompression engine 550. The plurality of tokens may actually be extracted from the input data section serially or consecutively. The plurality of tokens may then be assigned to available decoders as they are extracted from the input data section. Once tokens have been assigned to available decoders, portions of the processing of the tokens by the decoders may be performed in parallel. In addition, the term "in parallel" may also include the notion that a plurality of decoders output decoded information in parallel to the next stage of the pipeline.

As used herein, in the context of generating a plurality of selects in parallel, the term "in parallel" includes the notion that the select logic (stages 2 and/or 3) may concurrently process decoded information corresponding to a plurality of tokens substantially concurrently and/or the select logic may operate to generate selects for a plurality of output uncompressed symbols substantially concurrently. As described below, the select logic shares information regarding the selects that are being generated in parallel for different output uncompressed symbols.

Therefore, in general, information for decompressing more than one token may be loaded into a stage, operations of the stage performed on the tokens, and the results for all the tokens may then be latched out of the stage into a pipe register for processing in the next stage. In each stage, there may be copies of the logic for performing substantially simultaneous operations "in parallel" on a plurality of inputs.

For example, in the first stage 25501, an extracted token is assigned to one decoder. In the second, third, and fourth stages, there may be one copy of the logic for performing the operations of the stage for each potential output byte. Note that some operations in some stages may have dependencies that may utilize sequential processing. For example, loading a second token in a second decoder of the first stage 25501 may utilize count and other information generated by the loading of a first token in a first decoder.

To understand this novel decompression, the table of FIG. 7 illustrates the compression mask and index-coding algorithm for a sample code. In alternate embodiments, other codes may alter the design of the decompression unit. One embodiment may include all the codes included in FIG. 7 except the code for compressing one byte that uses 8 bits. In compressed input data, a code may also be referred to as a "token."

Figure 9:
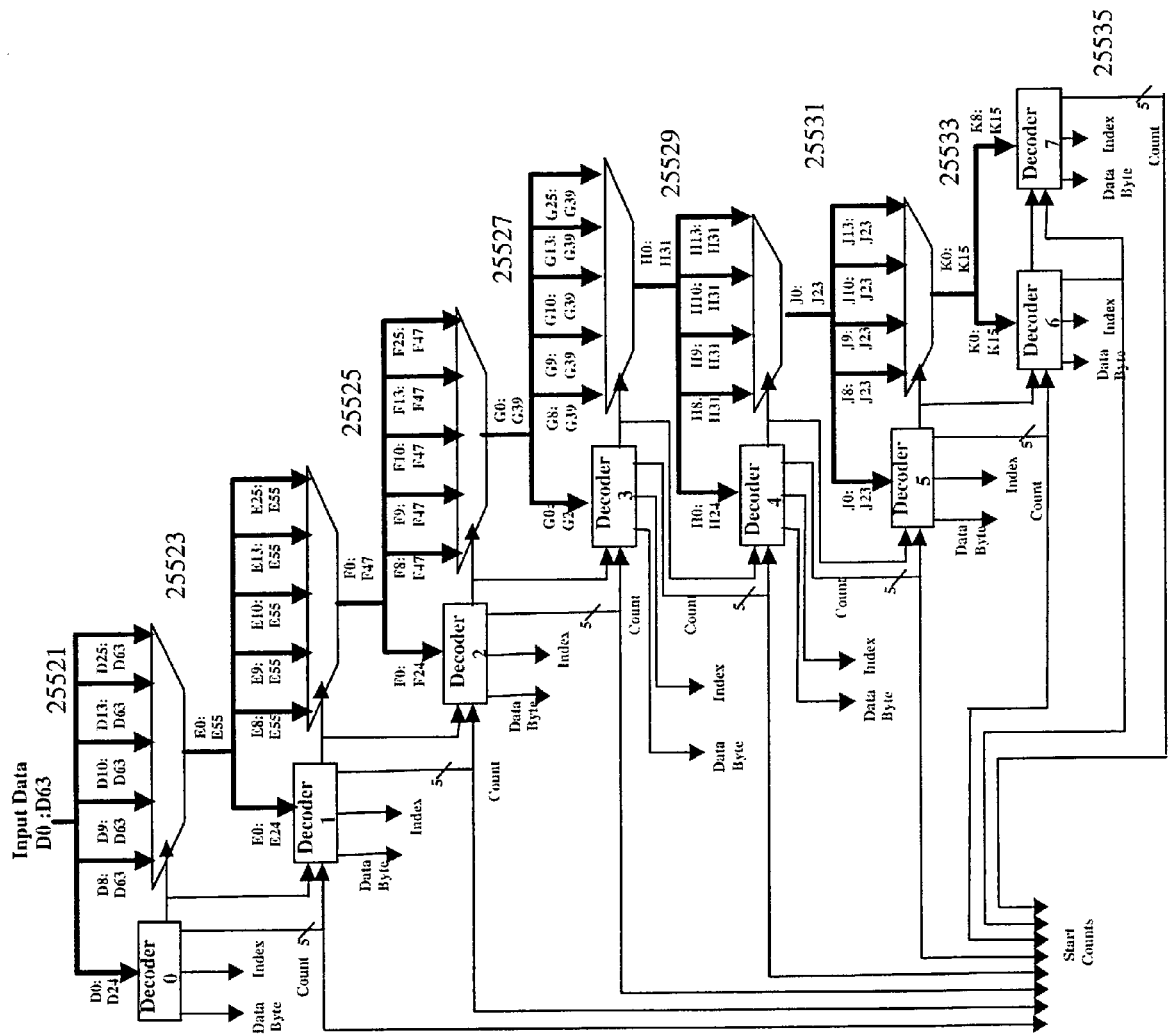
FIG. 9 illustrates the eight decoder stages required to generate the start counts used for the parallel decompression process according to one embodiment of the invention.

With the codes shown in the table of FIG. 7, the decompression tree in FIG. 9 allows decoding of at most 8 bytes of the input in one cycle. In this example, at most 8 bytes (64 bits) are extracted from the compressed data as input data to the decompression engine of FIG. 8 for each decompression cycle. The smallest encoded data is 8 bits, so the minimum number of decoders (25521-25535), indicated in FIG. 9, for 8 bytes is 8 (64 bits/8 bits). Each of these decoders could see one of many data inputs depending on the prior compressed data.

FIG. 9 illustrates the decoder stage 25501, which is the first stage of the decompression engine of FIG. 8. The decompression tree, shown in FIG. 9, utilizes very fast decoding at each stage to determine the proper data for the next stage. The Window Index, Start Count and Data Byte output (FIG. 7) are preferably latched for the next stage of the decode pipeline of FIG. 8. This decode pipeline requires the assembly of the output data. More detail of the preferred Decode block can be seen in FIG. 10.

Figure 10:
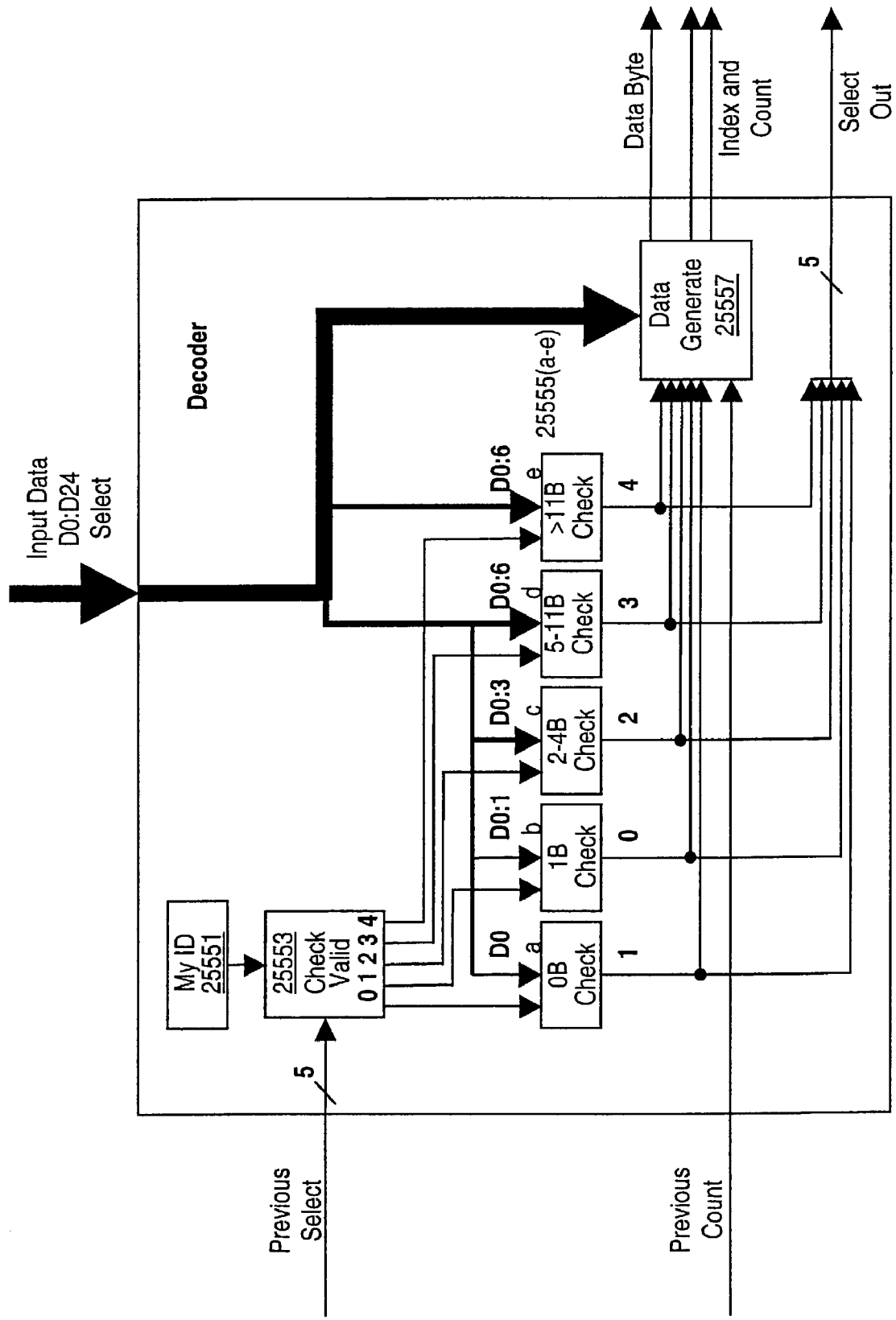
FIG. 10 illustrates a single decoder block used by the stage one input selector and byte counter of FIG. 8 according to one embodiment of the invention.

FIG. 10 illustrates the logic of one of the first stage decoders of FIG. 9. In FIG. 10, the Check Valid block 25553 verifies that enough bits are available for the checker 25555(*a-e*). After extracting one or more codes from the input data to be decoded by one or more decoders, there may not be enough bits in the input data to construct a complete token. For example, in the decompression engine described above that accepts 8 bytes (64 bits) of input data in a cycle, if six 10-bit codes are loaded into the first six decoders, four bits would be left in the input data, not enough to construct a complete token. In another example using 64-bit input data, if four 10-bit codes and one 13-bit code are loaded into the first five decoders, 11 bits are left in the input data. The Check Valid block 25553 may then check the flag information in the 11 bits to determine if there is a complete code in the 11 bits (an 8, 9 or 10 bit code). If there is a complete code, then the code is loaded in the next decoder. If the flag information indicates that the 11 bits are an incomplete code longer than 11 bits (a 13 or 25 bit code), then the bits are not loaded and examined until a later decode cycle. The tables for the Check Valid blocks are illustrated in the tables of FIGS. 11*a* and 11*b*. In the preferred embodiment, the longest path through Check Valid 25553 should be three gates, and the Byte Check 25555(*a-e*) will only add one gate because the check is an output enable. The outputs from the Check Valid logic 25553, and the Byte Check logic 25555 in FIG. 10 show 0 as the most significant bit, and 6 as the least significant bit.

The data generate logic 25557 is a multiplex of the input data based on the check select 25555 input. At most, one Byte Check 25555 should be active for valid data. An alternate embodiment may include a checker that is added to this decoder to verify that one byte check is active for valid data. The table of FIG. 11*b* describes the Data Generate outputs based on the Data Input and the Byte Check Select for codes similar to those illustrated in FIG. 7.

Referring again to FIG. 8, the second stage 25505 of the decompression engine 550 begins calculating pointers (also called "selects") to the appropriate bytes from the history window for compressed data that have been latched in the 168-bit pipe register 25503. For each decoder, stage two receives an index, a start count, an index valid bit, a data byte and a data byte valid bit. In the embodiment of FIG. 8, stage two would receive eight indexes, eight start counts, eight index valid bits, eight data bytes, and eight data byte valid bits, one from each of the eight decoders in stage one. In one embodiment, the data byte is passed through without being used by stage two. In one embodiment, the indexes, start counts, index valid bits, and data byte valid bits from each of the decoders are duplicated to the preliminary select logic for each of the output bytes of stage two. Thus, in the embodiment of FIG. 8, the preliminary select logic for each of the 16 output bytes receives the index, start count, index valid bit, and data byte valid bit from each of the eight decoders in stage one.

With minimal logic, a preliminary select may be calculated for each of the 16 output bytes of stage four 25513. The preliminary selects are latched in the 144-bit pipe register 25507. Each select latched into 25507 is a 7 bit encode (for a 64-entry window) with a single bit overflow. These signals are latched 25507 and used by the next unit 25509 in stage three. In one embodiment, the selects will have the values of 0-63 if a window value is to be used for this output byte, 64-71 if one of the eight data bytes is to be used for this output byte, and an overflow if the data for this output byte is a result of one or more of the other parallel decodes occurring with this data. The third stage 25509 checks each of the overflows from the previous stage 25505. If inactive, the 7 bit select is passed on unchanged. If active, the select from the correct stage two decoder 25505 is replicated on the select lines for this output byte.

The final stage of the decompression, stage four 25513 as illustrated in FIG. 8, selects the data from the history window or the data bytes passed from the first stage to build the output data. The output bytes that are assembled are then added to the history window for the next decode cycle.

In one embodiment, the first stage may consider the number of output bytes when decoding codes from the input data in a cycle. For example, the maximum output of the embodiment of FIG. 8 is 16 bytes per cycle. If a first code being decoded in a first decoder represents more than 16 output bytes, then the first stage 25501 may leave the first code loaded in the first decoder for as many cycles as it take to decompress all of the output bytes represented by the first code. Other codes that may be loaded in the other decoders are not decoded until there are available output data bytes to serve as destinations for the uncompressed symbols to be generated from the tokens. For example, if the first code loaded in the first decoder represents 24 output bytes, then 16 of the 24 output bytes may be decoded in a first cycle, and the remaining 8 in a second cycle. This leaves 8 output bytes for the other codes in the other decoders. Additionally, the last stage 25513 may include data valid bits so that the proper output data assembly can occur if fewer than 16 bytes can be decoded for any one cycle.

Figure 12:
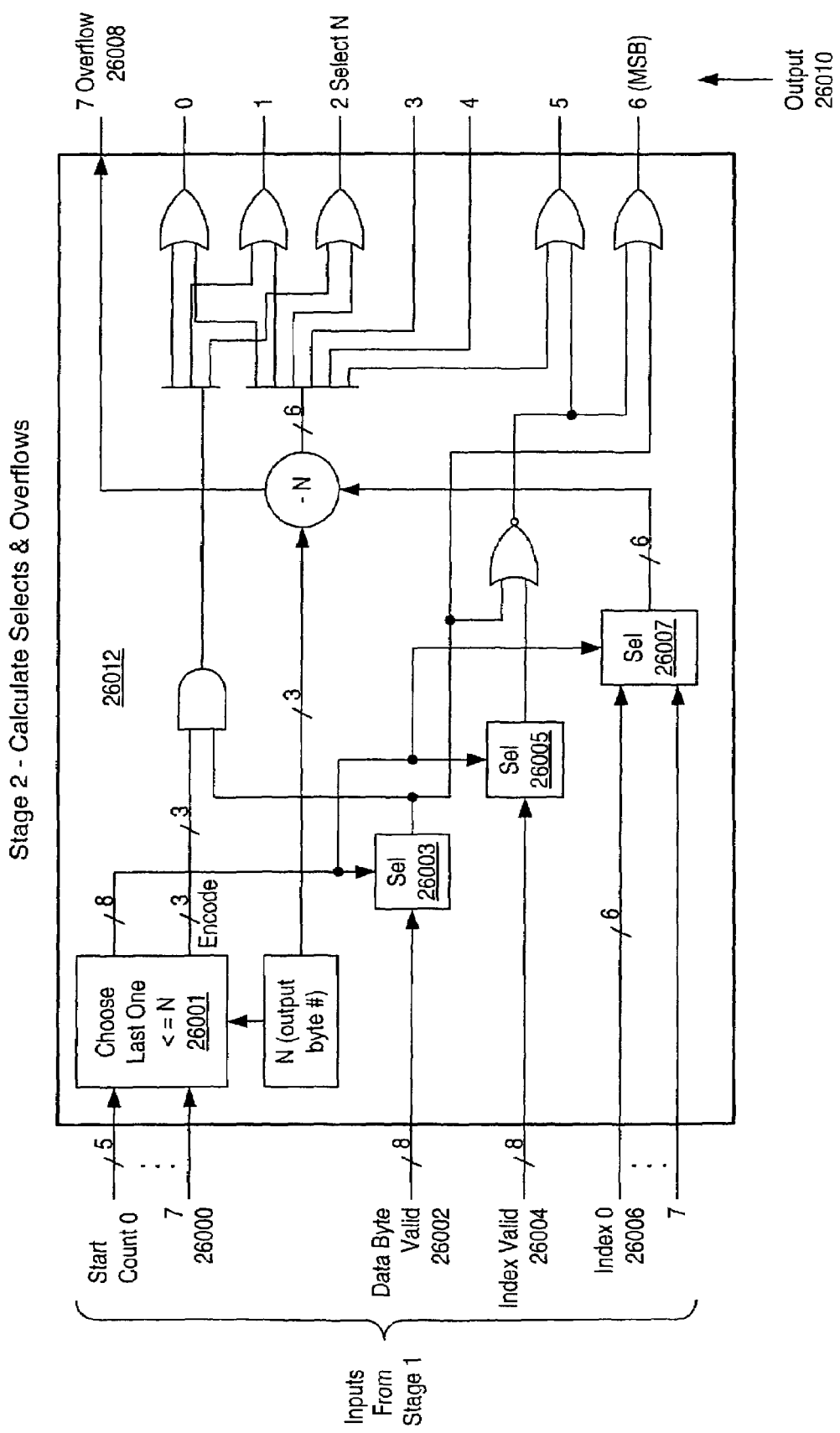
FIG. 12 illustrates a portion of the second of the four stages illustrated in FIG. 8 for calculating selects and overflows according to one embodiment of the invention.

FIG. 12—Calculating Initial Selects and Overflows According to One Embodiment of the Invention FIG. 12 illustrates logic 26012 for calculating initial selects and overflows according to one embodiment of the invention. In one embodiment, this logic is included in the second stage 25505 of the decompression engine as illustrated in FIG. 8. In one embodiment, there is one logic 26012 in the second stage for each output byte in the decompression engine 550. For example, in the decompression engine illustrated in FIG. 8, there would be 16 of the logic 26012 in stage two, one for each output byte. Logic 26012 begins the calculation of pointers to the appropriate bytes from the history window for compressed data which have been latched in the 168-bit pipe register 25503 from the first stage in FIG. 8. In the embodiment shown in FIG. 12, each logic 26012 in stage two receives a copy of the Index 26006 and Count 26000 from each decoder in stage one. Each logic 26012 in stage two also receives a Data Byte Valid bit 26002 and an Index Valid bit 26004 from each decoder.

With minimal logic, a preliminary select 26010 may be calculated in stage two for each of the output bytes, and the preliminary selects 26010 may then be latched in the 144-bit pipe register 25507 of FIG. 8. For example, each preliminary select may be a 7 bit encode (for a 64-entry window, plus eight data bytes) with a single bit overflow 26008. Embodiments with other sizes of history windows and/or other numbers of data bytes may require a different number of bits and a different numbering scheme for the preliminary selects. The preliminary selects 26010 are latched into 25507 and used by the next unit 25509 in stage three as shown in FIG. 8. The selects may have the values of 0-63 if a window value is to be used for this output byte or the values of 64-71 if one of the eight data bytes is to be used for this output byte. The overflow bit 26008 may be set if the data for the preliminary select 26010 is a result of one or more of the other parallel decodes occurring with this data. In this case, the index may be used in stage three to resolve the preliminary select by copying the appropriate select from another output byte to the select for this output byte.

Other embodiments may use history windows of various sizes, for example, from 32 entries to 4096 (or greater) entries. The size of the history window may be determined by the number of gates available for the design, the timing of stage four, and the compression ratio desired. More history window entries may typically yield a better compression ratio. As the history window size changes, the size of the index, preliminary and final selects may also change. For example, a history window with 2048 entries would require an 11-bit index, 13-bit preliminary select (11 bits for the index, one bit to indicate data byte, one bit to indicate overflow), and 12-bit final select (11 bits for the index, one bit to indicate data byte).

In one example of a decode where an overflow bit may be set, a first decoder may decode a first token and output a pointer to a first data byte, and a second decoder may decode a second token and output a pointer to a second data byte. A third decoder may decode a third token that represents a compressed string including the first and second data bytes from the first and second tokens. As these data bytes are not in the history window yet, the overflow bit 26008 is set to signify that the data for the third decoder's output byte is defined by one of the prior decoders in the current decode. The preliminary select output of the second stage for the third decoder is resolved into a final select in the third stage. In this example, two preliminary selects may be generated for the third token; the first pointing to the first decoder's output byte, and the second pointing to the second decoder's output byte.

In FIG. 12, if the preliminary select is for a data byte, the overflow bit 26008 will not be set, the most significant bit (bit 6) will be set, and bits 0-2 may be used to specify which of the eight data bytes the output byte refers to. If the preliminary select is for a window byte, the overflow bit 26008 will not be set, the most significant bit (bit 6) will not be set, and bits 0-5 may be used to specify which of the 64 window bytes the output byte refers to. If the overflow bit is set for the preliminary select, then bits 0-6 may specify which of the preliminary selects prior to this preliminary select is to be used to locate the data for this preliminary select.

In FIG. 12, N is the output byte number for the logic 26012. In this example, there are 16 output bytes, so N is an integer between 0 and 15. In this example, there are eight decoders in the first stage. One start count 26000, one index 26006, and one data byte valid bit and one index valid bit are input from each decoder. The start count for a decoder is calculated in stage one by adding the number of output bytes to be generated on this decoder to the input number of output bytes to be generated on all previous decoders (i.e. the start count for the previous decoder). For example, suppose there are four decoders (0-3), and decoder 0 is loaded with a code to decode 1 output byte, decoder 1 is loaded with a code to decode 3 output bytes, decoder 2 is loaded with a code to decode 4 output bytes, and decoder 3 is loaded with a code to decode 2 output bytes. The start count for decoder 0 is (0+1)=1. The start count for decoder 1 is (1+3)=4. The start count for decoder 2 is (4+4)=8. The start count for decoder 3 is (8+2)=10.

Block 26001 of FIG. 12 compares the input start counts for the decoders with N (the output byte number for this logic 26012). Block 26001 chooses the last decoder with a start count<=N. For example, if the eight start counts 26000 in FIG. 12 from decoders 0-7 are (1, 3, 6, 7, 11, 14, 15, 20), and N=9 (this is the $10^{th}$ output byte), then decoder 4 (start count=11) would be chosen. This serves to choose the decoder from which this output byte is to be generated.

In this example, block 26001 outputs a 3-bit encoded decoder number and an 8-bit decoded version of the decoder number. The 8-bit decoded version is output to selects 26003, 26005, and 26007, where it is used to select the data byte valid bit 26002, index valid bit 26004, and index 26006 for the decoder generating this output byte.

If the data byte valid bit 26002 for the selected decoder is set and the index valid bit 26004 for the selected decoder is clear, then the encoded 3-bit decoder number is output on bits 0-2 of the preliminary select 26010 (the least significant bits), and bit 6 (the most significant bit) is set to indicate that the preliminary select is for a data byte. Note that for the 64-entry history window and eight data byte embodiment previously described, the data byte select value is in the range 64-71 to select one of the eight data bytes.

If the index valid bit 26004 for the selected decoder is set and the data byte valid bit 26002 for the decoder is clear, then bit 6 (the MSB) of the preliminary select 26010 is cleared. The output byte number N is subtracted from the index 26006 from the selected decoder, and the resulting adjusted index is output on bits 0-5 of preliminary select 26010. By way of example, consider a decompression engine with eight input bytes, eight decoders (0-7), sixteen output bytes (0-15), and a 64-entry history window (0-63). If decoder 0 is decoding a code generating four output bytes, then logic 26012 for output byte 0 will generate the preliminary select for the first byte of the four output bytes being generated from the code on decoder 0. If the index 26006 from decoder 0 is 16, then 16−0=16. This means that the first byte of output from the code being decoded on decoder 0 is to come from entry 16 in the history window, where entry 0 is the most recent entry and entry 63 is the oldest entry. Logic 26012 for output byte 1 will generate the preliminary select for the second byte of the four output bytes being generated from the code on decoder 0. The second byte's preliminary select is 16−1=15. The second byte of output from the code being decoded on decoder 0 is to come from entry 15 in the history window. Continuing, the preliminary selects for the third and fourth output bytes, being generated on logic 26012 for output bytes 2 and 3, are 14 and 13, respectively.

It is possible for a preliminary select being generated in a logic 26012 to be for data being generated in the current decompression cycle, and thus the data for the output byte will not yet be in the history window. In this case, subtracting the output byte number N from the index will produce a negative result, and overflow bit 26008 will be set for the preliminary select. For example, if decoder 3 is decoding a code generating three output bytes, output byte 5 is the next available output byte, and the index for decoder 3 is 1, then logic 26012 for output byte 5 will generate a preliminary select of 1−0=1, logic 26012 for output byte 6 will generate a preliminary select of 1−1=0, and logic 26012 for output byte 7 will generate a preliminary select of 1−2=−1. The −1 preliminary select indicates that the data for the output byte is to come from the first output byte of the current decompression cycle. The overflow bit for output byte 7 will be set to indicate that this preliminary select is for data that is not yet in the history window. The preliminary select outputs on bits 0-5 will indicate which of the preliminary selects in the current decompression cycle points to the data for this preliminary select.

In one embodiment of logic 26012, data byte valid bit 26002 and index valid bit 26004 are NOR'd, and the output of the NOR is OR'd to bits 5 and 6 of the preliminary select. If both valid bits are 0 for a decoder, then bits 5 and 6 will be set for the preliminary select. Note that in the embodiment with 64 history window entries and eight data bytes, values above 71 are not valid selects. Thus, in this embodiment, a preliminary select for an output byte with bits 5 and 6 set may be used to indicate that no data is being generated for the output byte in this decompression cycle. Other embodiments with different history window sizes, number of data bytes, and/or number of output bytes may use other invalid select values to indicate that no data is being generated for an output byte in a decompression cycle.

Figure 13:
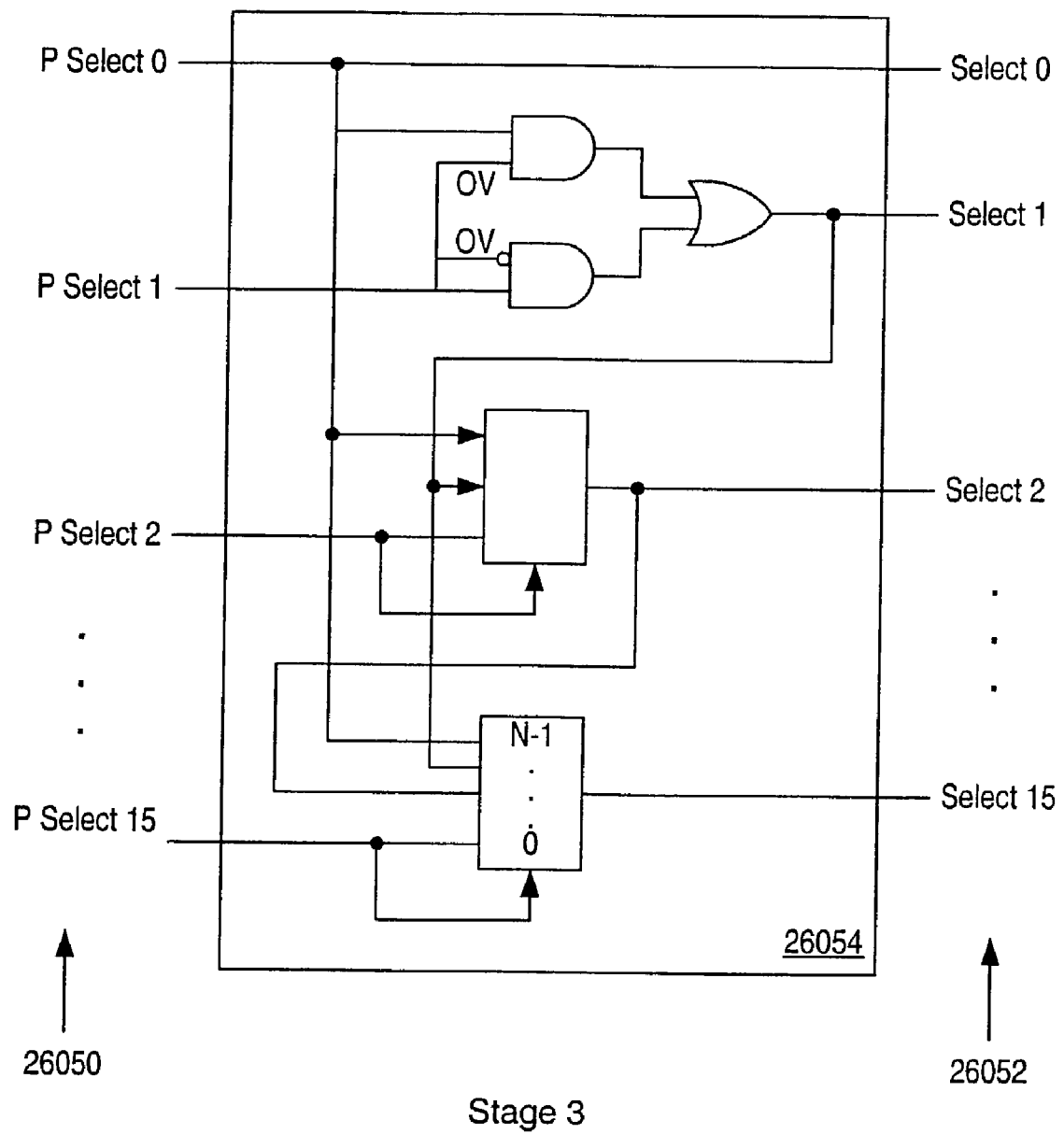
FIG. 13 illustrates a portion of the third of the four stages illustrated in FIG. 8 for converting preliminary selects generated in stage two into final selects according to one embodiment of the invention.

FIG. 13—Converting Preliminary Selects into Final Selects

FIG. 13 depicts one embodiment of a third stage of a decompression engine 550 such as stage three 25509 of FIG. 8. The third stage checks the preliminary selects 26050 for the output bytes from the previous stage. If the overflow bit (26008 of FIG. 12) of a preliminary select is not set, the 7-bit select for the output byte (bits 0-6 of preliminary select 26010 of FIG. 12) is passed to the next stage unchanged. If the overflow bit is set, this indicates that the data for this output byte is being generated in the current decompression cycle.

The data for the preliminary select will be pointed to by one of the previous output byte selects in the current decompression cycle. The select for the previous output byte is replicated on the select lines for this output byte. Note that the overflow bit for the first select (preliminary select 0) will not be set, because there are no "prior" selects in the current decode for the select to refer to. Thus, preliminary select 0 passes through stage three unchanged as final select 0. Final select 0 is input into the logic for resolving each of the preliminary selects subsequent to select 0 (preliminary selects 1 through N−1). Final select 0 and preliminary select 1 are input into the logic for resolving preliminary select 1. If the overflow bit for preliminary select 1 is not set, then preliminary select 1 is passed through unchanged as final select 1. If the overflow bit is set, then the final select 0 is passed through as the final select for select 1. Final selects 0 and 1 and preliminary select 2 are input into the logic for resolving preliminary select 2. If the overflow bit for preliminary select 2 is not set, then preliminary select 2 is passed through as final select 2. If the overflow bit is set, then preliminary select 2 is used to determine which of the input final selects (0 and 1) is to be output as final select 2. In general, this procedure is followed for all of the N input preliminary selects. Thus, the input to the logic for resolving preliminary select N−1 includes the final selects for selects 0 through N−2, and preliminary select N−1. If the overflow bit is not set for preliminary select N−1, then preliminary select N−1 is passed through unchanged as final select N−1. If the overflow bit is set, then the contents of preliminary select N−1 are used to determine which of the input final selects is to be used as the value for final select N−1.

Figure 14:
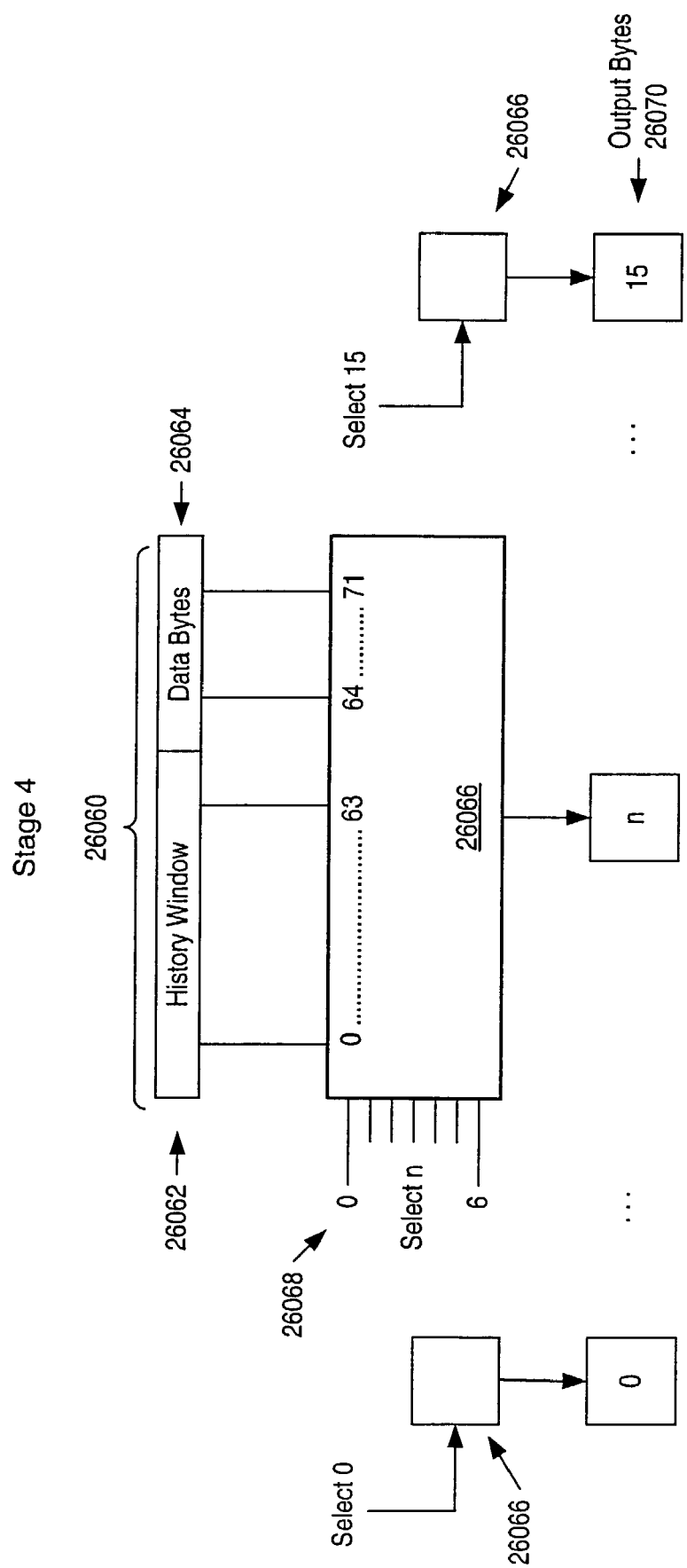
FIG. 14 illustrates a portion of the fourth of the four stages illustrated in FIG. 8 for generating uncompressed output bytes from selects generated in the first three stages according to one embodiment of the invention.

FIG. 14—Generating Uncompressed Output Bytes from Generated Selects

FIG. 14 depicts one embodiment of a fourth stage of a decompression engine 550 such as stage four 25513 of FIG. 8. In stage four, the final selects 26068 output from the third stage as depicted in FIG. 13 are used to assemble the output bytes 26070 by selecting bytes from the history window 26062 or the data bytes 26064 passed from the first stage. In this embodiment, each output byte selector 26066 may select from one of 64 bytes (0-63) in history window 26062 or from one of eight bytes (64-71) in data bytes 26064. In one embodiment history window 26062 and data bytes 26064 may be combined in a combined history window 26060. In other embodiments, the data bytes and history window may be maintained separately. The final selects 26068 are indexes into either the history window 26062 or the data bytes 26064 passed from stage one. The output bytes 26070 that are assembled may be sent to the output data stream (appended to the end of the output bytes from any previous decompression cycles) and may be inserted in the history window for the next decode cycle. Stage four may also include a data valid bit (not shown) for each of the output bytes 26070 so that the proper output data assembly may occur if fewer than the maximum number of bytes (16 in this embodiment) are to be decoded in a decode cycle. In one embodiment, an invalid index value in a final select for an output byte may clear the data bit to indicate that the output byte does not contain valid data in this decompression cycle. Output bytes that are not valid may not be sent to the output data or written in the history window.

Figure 15:
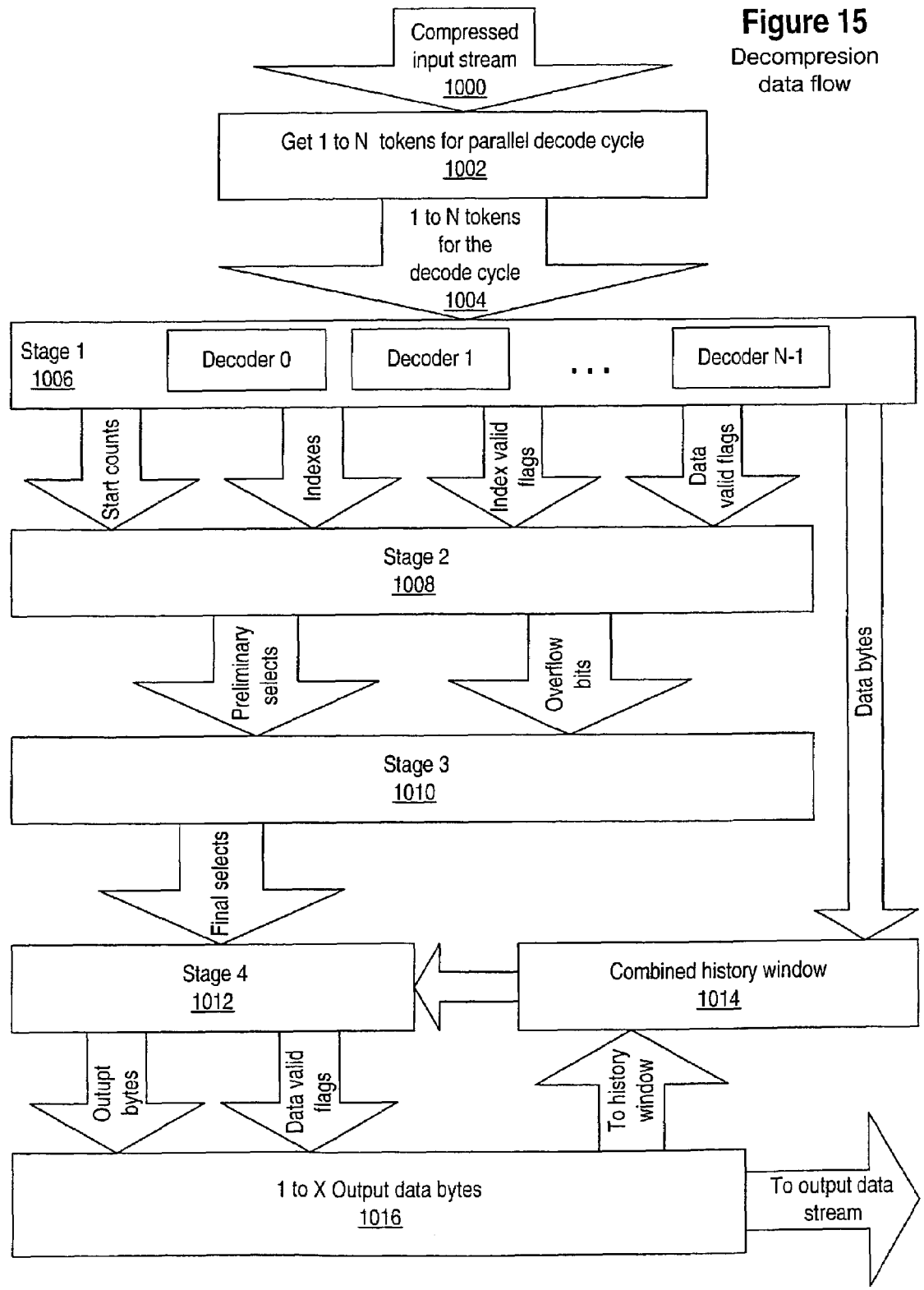
FIG. 15 illustrates the data flow through the parallel lossless decompression engine according to one embodiment of the invention.

FIG. 15—Data Flow Through a Decompression Engine

FIG. 15 illustrates data flow through one embodiment of a decompression engine 550. The decompression engine 550 receives a compressed input stream 1000. The compressed input stream 1000 is then decompressed in one or more decode (or decompression) cycles, resulting in a decompressed output stream.

As a first step 1002 of a decompression cycle, from 1 to N tokens from the compressed data stream 1000 may be selected for the decompression cycle and loaded in the decompression engine 550, where N is the maximum number of decoders in stage one. The tokens are selected serially from the first token in the data stream 1000. In one embodiment, a section may be extracted from the compressed data stream 1000 to serve as input data for a decompression cycle, and the tokens may be extracted from the extracted section. For example, in one embodiment, a section of four bytes (32 bits) may be taken, and in another embodiment, a section of eight bytes (64 bits) may be taken. In one embodiment, steps 910 through 920 as illustrated in FIG. 18*d* may be followed to select the 1 to N tokens for the decompression cycle. In one embodiment, a token may be selected from the input data stream 1000 for the decompression cycle if 1) there is a decoder available (i.e., one or more decoders haven't been assigned a token to decode in the decompression cycle); and 2) the remaining bits in an input section of the compressed data comprise a complete token (after extracting one or more tokens from the input data, the remaining bits in the input data may not comprise a complete token). If any of the above conditions fails, then the decompression cycle continues, and the last token being examined (the one that failed one of the conditions) is the first token to be loaded in the next decompression cycle. Preferably, no correctly formatted token is ever totally rejected; i.e., any token presented to the decompression cycle as a first token considered for the decompression cycle will meet all the conditional requirements. In other words, 1) a decoder will always be available at the start of a decompression cycle; and 2) the input data size in bits is at least as big as the largest token size in bits.

Figure 16:
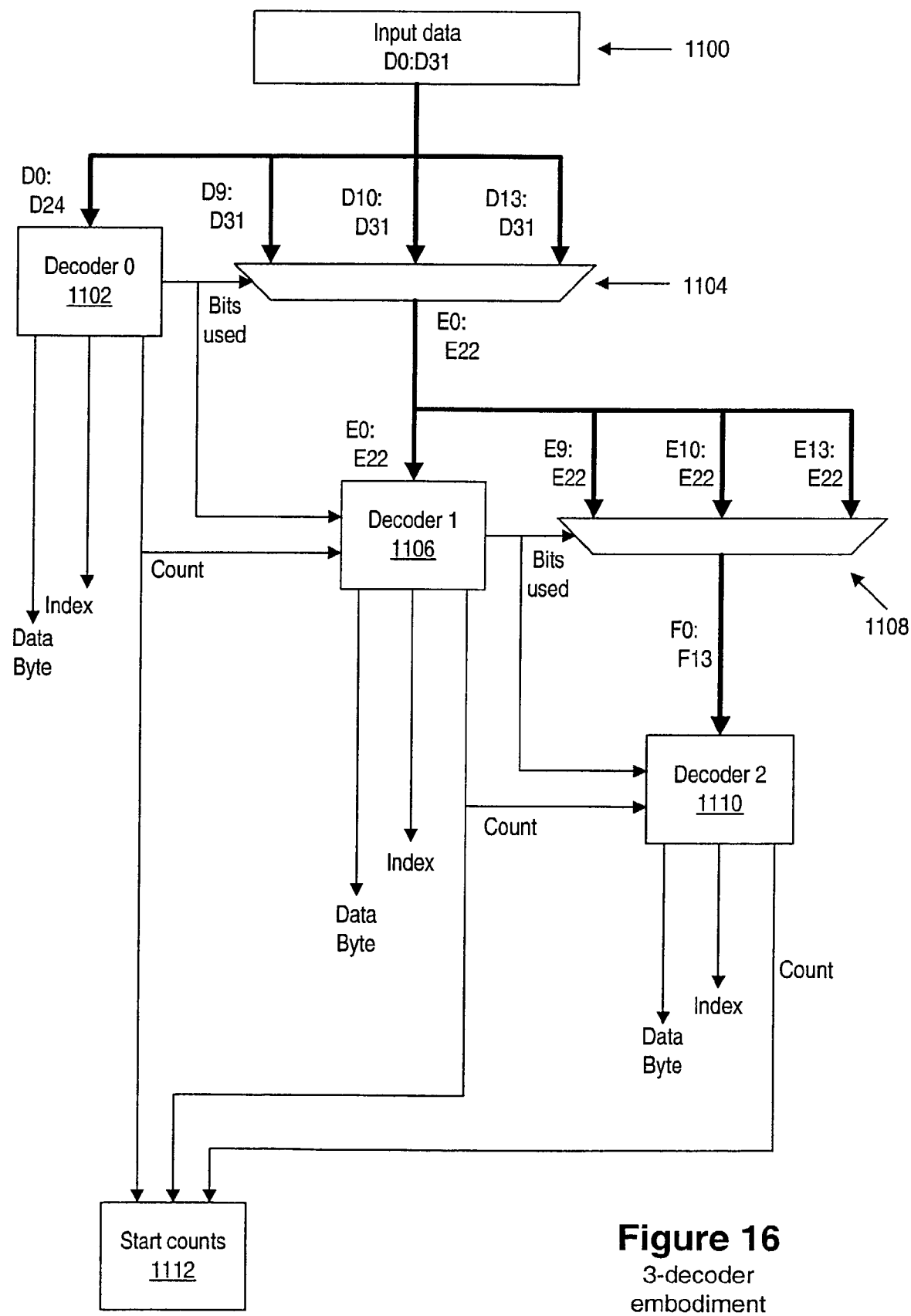
FIG. 16 illustrates an embodiment with three decoder stages to accept 32 bits of input data and generate the information used for the parallel decompression process.

Once the 1 to N tokens for the decompression cycle are selected in the first step 1002, the 1 to N tokens are passed into stage one 1006 for decoding. In one embodiment, step 1002 may be performed as part of stage one of the decompression engine 550. In one embodiment, one token is assigned to one decoder, and one decoder may process one token in a decompression cycle. Stage one may include N decoders. There are preferably at least enough decoders to accept a maximum number of tokens that may be in the input data. For example, if the input data is 32 bits, and the minimum token size is 9 bits, then there are preferably at least three decoders. Preferably, the number of decoders equals the maximum number of tokens in the input data. FIG. 9 illustrates an embodiment of decompression engine 550 with eight decoders. FIGS. 16-17 illustrate an embodiment of decompression engine 550 with three decoders. FIG. 10 illustrates an embodiment of a decoder. The decoders of stage one 1006 decode the input tokens into start counts, indexes, index valid flags, and data valid flags, with one copy of each from each decoder being passed to stage two 1008 for each of the X output bytes to be generated in the decompression cycle. The 1 to N original input data bytes are passed from stage one to the combined history window 1014. A data byte is valid only if the token being decoded on the decoder represents a byte that was stored in the token in uncompressed format by the compression engine that created the compressed data. In this case, the uncompressed byte is passed in the data byte for the decoder, the data byte valid bit for the decoder is set, and the index valid bit for the decoder is cleared.

Stage two 1008 takes the inputs from stage one 1006 and generates preliminary selects for 1 to X output bytes, where X is a maximum number of output bytes that may be decoded in one decompression cycle. Stage two 1008 also generates an overflow bit for each preliminary select. Stage two then passes the preliminary selects and overflow bits to stage three 1010. Stage three 1010 inspects the overflow bit for each of the preliminary selects. If the overflow bit of a preliminary select is not set, then the contents of the preliminary select point to one of the entries in the history window 1014 if the index valid bit is set for the output byte, or to one of the data bytes passed from stage one 1006 to the combined history window if the data byte valid bit is set for the output byte. Preliminary selects whose overflow bits are not set are passed to stage four 1012 as final selects without modification. If the overflow bit is set, then the contents of the preliminary select are examined to determine which of the other preliminary selects is generating data this preliminary select refers to. The contents of the correct preliminary select are then replicated on this preliminary select, and the modified preliminary select is passed to stage four 1012 as a final select. In one embodiment, a preliminary select with overflow bit set may only refer to prior preliminary selects in this decompression cycle. For example, if the overflow bit for the preliminary select for output byte 3 is set, then the preliminary select may refer to data being generated by one of preliminary selects 0 through 2, and not to preliminary selects 4 through (N−1). In one embodiment, stages two and three may be combined into one stage.

Stage four 1012 uses the final selects it receives from stage three 1010 to extract byte entries from the combined history window 1014. The final selects may point to either history window bytes or data bytes passed from stage one 1006. The number of bits in a final select are determined by the number of entries in the history window plus the number of data bytes. For example, a 64-byte history window plus eight data bytes totals 72 possible entries in the combined history window, requiring seven bits per final select. Other history window sizes and/or number of data bytes may require different final select sizes. Stage four 1012 extracts the data from the combined history window and constructs an output of between 1 and X uncompressed output data bytes 1016. Stage four 1012 may use a data valid flag for each of the X output data bytes to signal if a data byte is being output for this output data byte in this decompression cycle. The data valid flags are necessary because it may not always be possible to decompress the maximum amount of output bytes (X) in a decompression cycle. The output bytes 1016 may then be appended to the output data stream and written into the history window 1014. In one embodiment, if the history window is full, the oldest entries may be shifted out of the history window to make room for the new output bytes 1016, or alternatively the history window may be stored in a ring buffer, and the new entries may overwrite the oldest entries. The decompression cycle may be repeated until all of the tokens in the input stream 1000 are decompressed.

FIG. 16—Three Decoder Stages to Accept 32 Bits of Input Data

FIG. 16 illustrates an embodiment of a stage one with three decoders. The embodiment is similar to the embodiment with eight decoders shown in FIG. 9. For the embodiment shown in FIG. 16, the input data 1100 will comprise four bytes (32 bits). The compressed data will be encoded with codes similar to those shown in FIG. 7, but the 8-bit code for compressing one byte is not allowed. Thus, the minimum token, or code, size is 9 bits, for a token representing one uncompressed byte. The input data 1100 of FIG. 16 may include at most three complete tokens (32/9=3, with 5 bits remaining). Thus, this embodiment requires three decoders to accept the maximum number of tokens that can be extracted from the input data for a decompression cycle.

In this embodiment, bits D0:D24 are passed to decoder 0 1102. Decoder 0 1102 examines the flag field of the token starting at D0 to determine the bit size of the token. Decoder 0 1102 then passes the bit size to 1104, which passes bits E0:E22 (23 bits, the number of bits in the input data 1100, 32, minus the smallest token size, 9) to decoder 1 1106. The 23 bits may include bits D9:D31 if decoder 0 1102 is decoding a 9-bit token, bits D10:D31 if decoder 0 1102 is decoding a 10-bit token, or bits D13:D31 if decoder 0 1102 is decoding a 13-bit token. If decoder 0 1102 is decoding a 25-bit token, then the remaining seven bits do not contain a complete token, so no bits are passed to decoder 1 1106 from 1104 in this decode cycle, and the number of bits passed to decoder 1 1106 from decoder 0 1102 (25) indicates to decoder 1 1106 that it is not to be used in this decode cycle. If decoder 1 1106 receives bits from 1104, decoder 1 1106 examines the flag field of the first token in the bits. If the flag field of the token indicates that the token is a 25-bit token, then the token is not complete, and decoder 1 1106 and decoder 2 1110 are not used in this decompression cycle. If the flag field of the token indicates that this is a 9, 10 or 13-bit token, then the token is loaded in decoder 1 1106, and the total number of bits used is passed to 1108 and to decoder 2 1110. 1108 passes bits F0:F13 (14 bits, the number of bits in the input data 1100, 32, minus two times the smallest token size, 9) to decoder 2 1110). The 14 bits may include bits E9:E22 if decoder 1 1106 is decoding a 9-bit token, bits E10:E22 if decoder 1 1106 is decoding a 10-bit token, or bits E13:E22 if decoder 1 1106 is decoding a 13-bit token. Decoder 2 1110 may then examine the flag field of the token starting at F0 to determine the token size. Decoder 2 1110 may then compare the token bit size with the remaining number of bits (determined from the input bits used by the first two decoders) to determine if the token is complete. If the token is complete, then the token is loaded in decoder 2 1110 for decoding in this decompression cycle. If the token is not complete, then decoder 2 1110 is not used in this decompression cycle.

A few examples of loading tokens are given to illustrate the loading process. If input data 1100 includes a 25-bit token starting at bit 0 (D0), then only seven bits are left in input data 1100 after decoder 0 is loaded with the 25-bit token. In this case, decoders 1 and 2 are not loaded with tokens in this decompression cycle. If decoder 0 is loaded with a 9, 10 or 13-bit token, and the remaining bits in input data 1100 are an incomplete 25-bit token (as determined from the flag field in the incomplete token), then decoders 1 and 2 are not loaded in this decompression cycle. Other combinations of tokens in input data 1100 may result in decoders 1 and 2 being loaded or in all three decoders being loaded for a decompression cycle.

Figure 17A:
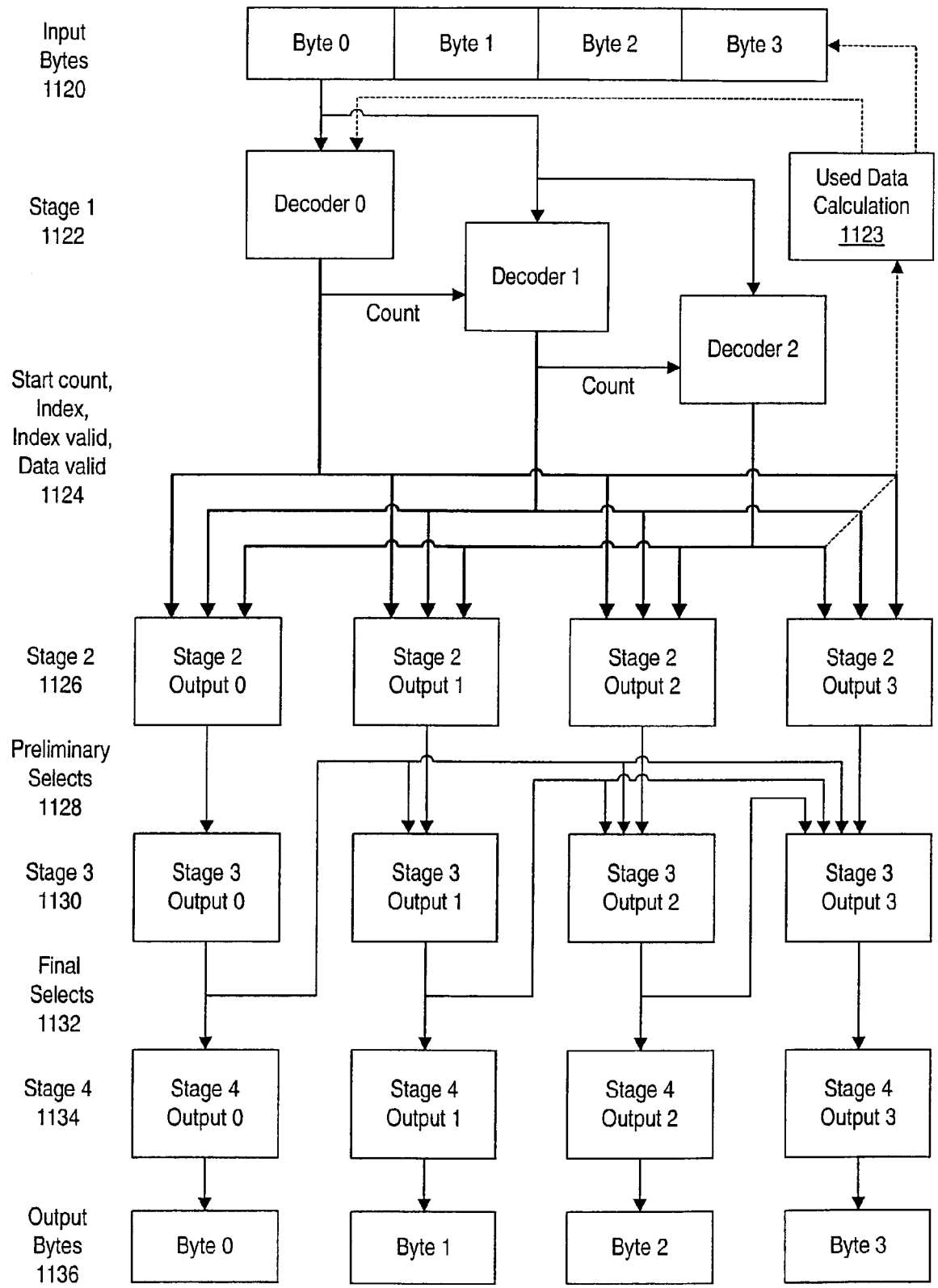
FIG. 17a illustrates a decompression engine with four input bytes, three decoders, and four output bytes according to one embodiment of the invention.

FIG. 17a—A Decompression Engine with Four Input Bytes, Three Decoders, and Four Output Bytes FIG. 17a illustrates an embodiment of decompression engine 550 with four input bytes 1120 comprising 32 bits, three decoders in stage one 1122, and four output bytes 1136. This embodiment is suitable for decoding codes (tokens) similar to those depicted in FIG. 7, excluding the 8-bit code used to encode one compressed byte. FIG. 17a illustrates that in stage two 1126, stage three 1130, and stage four 1134, there is parallel logic for generating each of the output bytes (in this embodiment, four output bytes).

One or more tokens are extracted from input bytes 1120 and loaded into decoders in stage one 1122. The tokens are decoded by the decoders, and start count, index, index valid and data valid information 1124 is passed to stage two 1126. Data byte information (not shown) may also be produced for the decoders and passed through for use in stage four 1134. The information 1124 from each decoder is copied to the stage two logic for each output byte. Stage two 1126 generates preliminary selects 1128 from the information 1124 passed in from stage one 1122. Stage two 1126 passes the preliminary selects to stage three 1130. Stage three 1130 generates final selects 1132 from the preliminary selects 1128 passed from stage two 1126. As shown, the final select 1132 generated on a stage three logic 1130 for an output byte is passed to the stage three logic for all subsequent output bytes. This allows a preliminary select 1128 with overflow bit set indicating that the data for the output byte is being generated in the current decompression cycle to be resolved by copying the final select for the correct output byte to be used as the final select for this output byte. The final selects 1132 are passed to stage four 1134. Stage four 1134 uses index information in the final selects 1132 to select entries from the history window (not shown) or the data bytes passed from the decoders in stage one 1122 and copies the selected data into output bytes 1136. The output bytes 1136 may then be written to the output data (not shown), and may also be written into the history window as the latest history window entries.

Used Data Calculation logic 1123 in stage one may be used to maintain a count of output bytes being generated in the current decompression, and also to maintain a count of the number of tokens being decoded and decompressed in the current decompression cycle. This information is used in stage one for shifting the compressed data prior to extracting the input bytes 1120 in a later decompression cycle. Used Data Calculation logic 1123 is further explained by the example decompression cycles described in FIG. 17b.

Figure 17B:
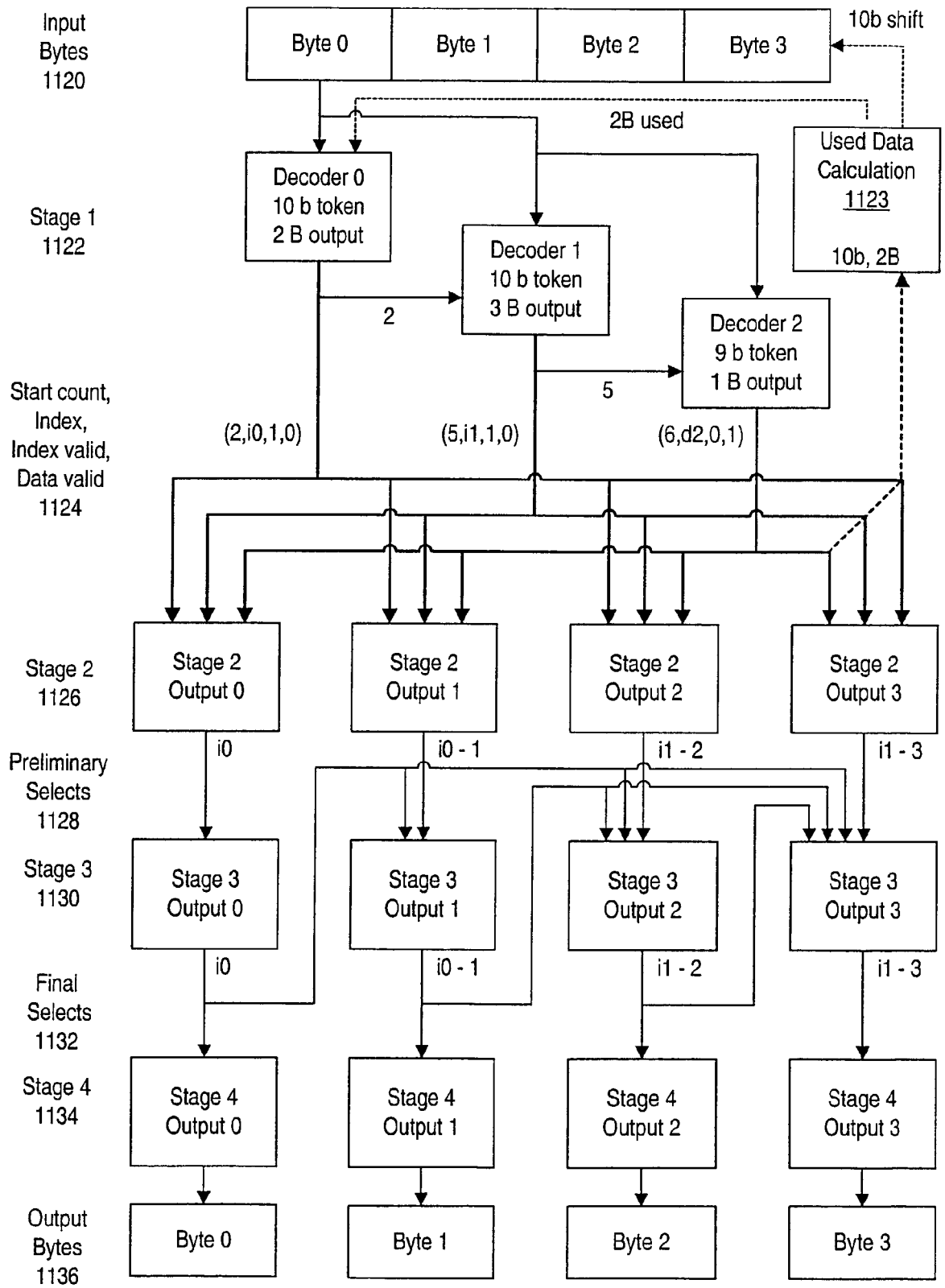
FIG. 17b illustrates an example decompression of an input to the decompression engine illustrated in FIG. 17a according to one embodiment of the invention.

FIG. 17b—An Example Decompression

FIG. 17b is used to illustrate an example decompression of an input to an embodiment of decompression engine 550 as illustrated in FIG. 17a. In this example, three tokens have been extracted from input bytes 1120. The first token, a 10-bit token representing two compressed bytes, is loaded in decoder 0. The second token, a 10-bit token representing three compressed bytes, is loaded in decoder 1. The third token, a 9-bit token representing one uncompressed byte, is loaded in decoder 2. Decoder 0 generates the information (start count=2, index=i0, index valid=1 (true), data valid=0 (false)) for the first token. The start count (2) is passed to decoder 1. Decoder 1 generates the information (start count=5, index=i1, index valid=1, data valid=0) for the second token. The start count is the sum of the output byte counts for decoder 0 and decoder 1 (2+3=5). The start count (5) is passed to decoder 2. Decoder 2 generates the information (start count=6, index=d2, index valid=0, data valid=1) for the third token. In this example indexes starting with (i) are to entries in the history window, and indexes starting with (d) are in the data bytes.

Stage two 1126 uses the information 1124 generated from the decoders in stage one 1122 to generate preliminary selects for the four output bytes. Two output bytes are being generated from the first token in decoder 0. The stage two logic for output byte 0 examines the information 1124 and determines that it is to generate a preliminary select 1126 for the first byte compressed in the first token. The preliminary select output 1128 for output byte 0 is index=i0. The stage two logic for output byte 1 examines the information 1124 and determines that it is to generate a preliminary select 1126 for the second byte compressed in the first token. The preliminary select output 1128 for output byte 0 is index=(i0−1). The output byte number is subtracted from the original index to generate the actual index number for this output byte. Thus, preliminary selects for all output bytes to be produced from the first token are generated for the first two output bytes. The stage two logic for output byte 2 examines the information 1124 and determines that it is to generate a preliminary select 1126 for the first byte compressed in the second token. The preliminary select output 1128 for output byte 2 is index=(i1−2). The stage two logic for output byte 3 examines the information 1124 and determines that it is to generate a preliminary select 1126 for the second byte compressed in the second token. The preliminary select output 1128 for output byte 3 is index=(i1−3).

In this decompression cycle, all output bytes have been used to generate preliminary selects. However, some of the data represented by the second token and all of the data represented by the third token are not decompressed in this compression cycle. Decompression of these tokens will be completed in one or more subsequent decompression cycles.

In this example, the preliminary selects 1128 are examined by stage three 1130, and final selects 1132 are output to stage four 1134. If a preliminary select 1128 for an output byte has an overflow bit set, then the preliminary select is resolved by copying the final select from a previous output byte to the output byte to be used as the final select for the output byte. If the overflow bit for a preliminary select 1128 is not set, then the preliminary select 1128 is passed through stage three 1134 as the final select 1132 for the output byte.

In stage one, count and token size information for the tokens loaded in the decompression cycle may be examined in Used Data Calculation logic 1123. If one or more tokens have been completely decompressed, then the total number of bits of the tokens is used to shift the compressed data to align the next input bytes 1120 for the next decompression cycle. A count of the number of output bytes generated from a partially processed token may be used in stage one 1122 in the next decompression cycle to determine which byte represented in the partially processed token is the first byte not decompressed in the previous decompression cycle. In the example shown in FIG. 17*b*, the first token was completely decompressed in the decompression cycle. The size of the first token is 10 bits, so the compressed data may be shifted 10 bits to align the input bytes 1120 for the next cycle. Two of the three bytes represented by the second token were decompressed in the decompression cycle, so a byte count of 2 is used in the next decompression cycle to continue decompression of the second token.

When the next decompression cycle starts, tokens are extracted from the newly aligned input bytes 1120 and loaded in the decoders for the cycle. In this example, the second token, loaded in decoder 1 in the first decompression cycle, is loaded in decoder 0 in the new decompression cycle. The third token, loaded in decoder 2 in the first decompression cycle, is loaded in decoder 1 in the new decompression cycle. If the next token in input bytes 1120 is a complete token, it will be loaded in decoder 2 for the new decompression cycle. In the new decompression cycle, a preliminary select 1128 will be generated for output byte 0 for the third byte compressed in the second token. A preliminary select 1128 will be generated for output byte 1 for the data byte in the third token. If there is a token being decompressed in decoder 2, then a preliminary select 1128 will be generated for output byte 2 for the first byte compressed in the token. If the token being decompressed in decoder 2 represents more than one compressed bytes, then a preliminary select 1128 will be generated for output byte 3 for the second byte compressed in the token.

If a token being decoded in decoder 0 represents N uncompressed bytes, and the decompression engine can decompress at most M output bytes in a cycle, then the token can be fully decompressed in N/M decompression cycles, wherein N/M is rounded up to the next highest integer if N is not evenly divisible by M. In the embodiment illustrated in FIG. 17*b*, M=4. A 25-bit token, as illustrated in FIG. 7, can represent up to 4096 symbols. In the embodiment illustrated in FIG. 17*b*, it will take 4096/4=1024 cycles to fully decompress the token. If a token representing N uncompressed bytes is partially decompressed in a decompression cycle, then in some cases it may take N/M+1 cycles to decompress. For example, in the embodiment of decompression engine 550 illustrated in FIG. 8, there are 8 input bytes (64 bits), 8 decoders, and 16 output bytes. If the 25-bit token representing 4096 symbols is initially loaded in decoder 0, it will take 4096/16=256 cycles to fully decompress the token. If the token is initially loaded in decoder 1, and a token loaded in decoder 0 represents less than 16 symbols (for example, 8), then the first 8 symbols from the token in decoder 1 will be decompressed in a first cycle. The token will be loaded in decoder 0 in the second cycle. The remaining 4088 symbols represented by the token will be decompressed in 4088/16=256 cycles (the fraction is rounded up). Thus, it will take 257 cycles to fully decompress the token.

In one embodiment, as a token is being decompressed over multiple cycles, the remaining output symbols to be generated may be output to the other decoders in stage one and to Used Data Calculation 1123. This may prevent the other decoders from decoding tokens until there are output bytes available, and may also prevent the input data from being shifted until the token is completely decompressed. In some embodiments, any number larger than the maximum number of output bytes may be output by a decoder to signal that the token will not complete decompression in this cycle to save output bits. For example, in the embodiment illustrated in FIG. 17*b*, a 5 might be output by decoder 0 to indicate that the token loaded in decoder 0 will not be completely decompressed in the current decompression cycle. Outputting a 5 takes 3 bits, while outputting a 4096 would take 12 bits.

FIGS. 18*a*-18*k*—Flowcharts Describing a Parallel Decompression Engine

FIGS. 18*a*-18*k* illustrate flowcharts describing embodiments of parallel decompression processing in embodiments of decompression engine 550.

Figure 18A:
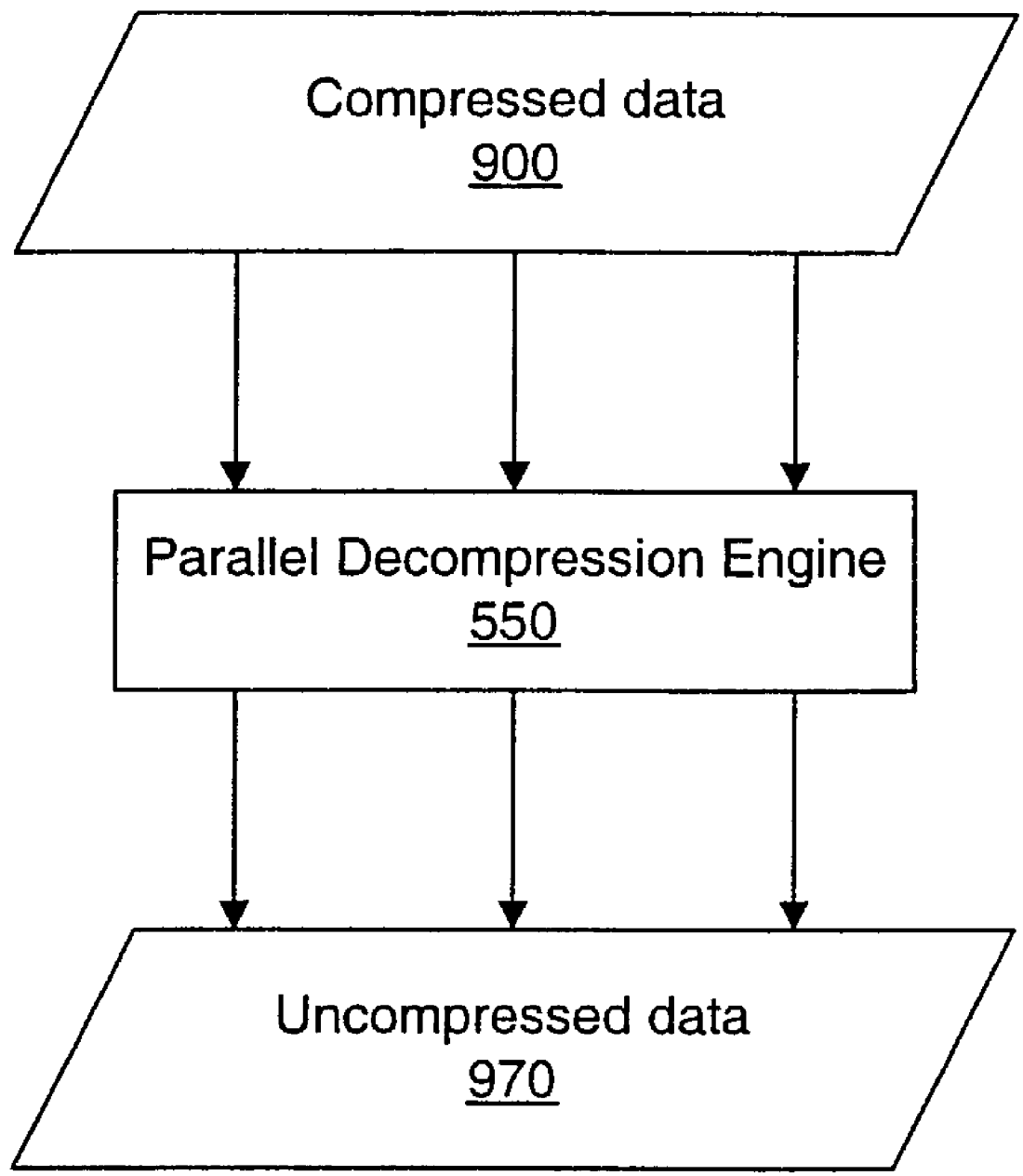
FIG. 18a is a high-level flowchart of the operation of a parallel decompression engine.

FIG. 18*a*—The Operation of a Parallel Decompression Engine

FIG. 18*a* is a high-level flowchart illustrating an embodiment of decompression processing in an embodiment of parallel decompression engine 550. Parallel decompression engine 550 receives compressed data 900 to be decompressed, and outputs uncompressed data 970. Compressed data 900 is a compressed representation of uncompressed data 970. Compressed data 900 may comprise one or more tokens. Each token in compressed data 900 may be an encoded description of one or more uncompressed symbols in uncompressed data 970. Compressed data 900 may have been compressed by any of a variety of compression methods, including, but not limited to parallel and serial compression methods. FIGS. 18*b*-18*k* illustrate the flowchart of FIG. 18*a* in greater detail

Figure 18B:
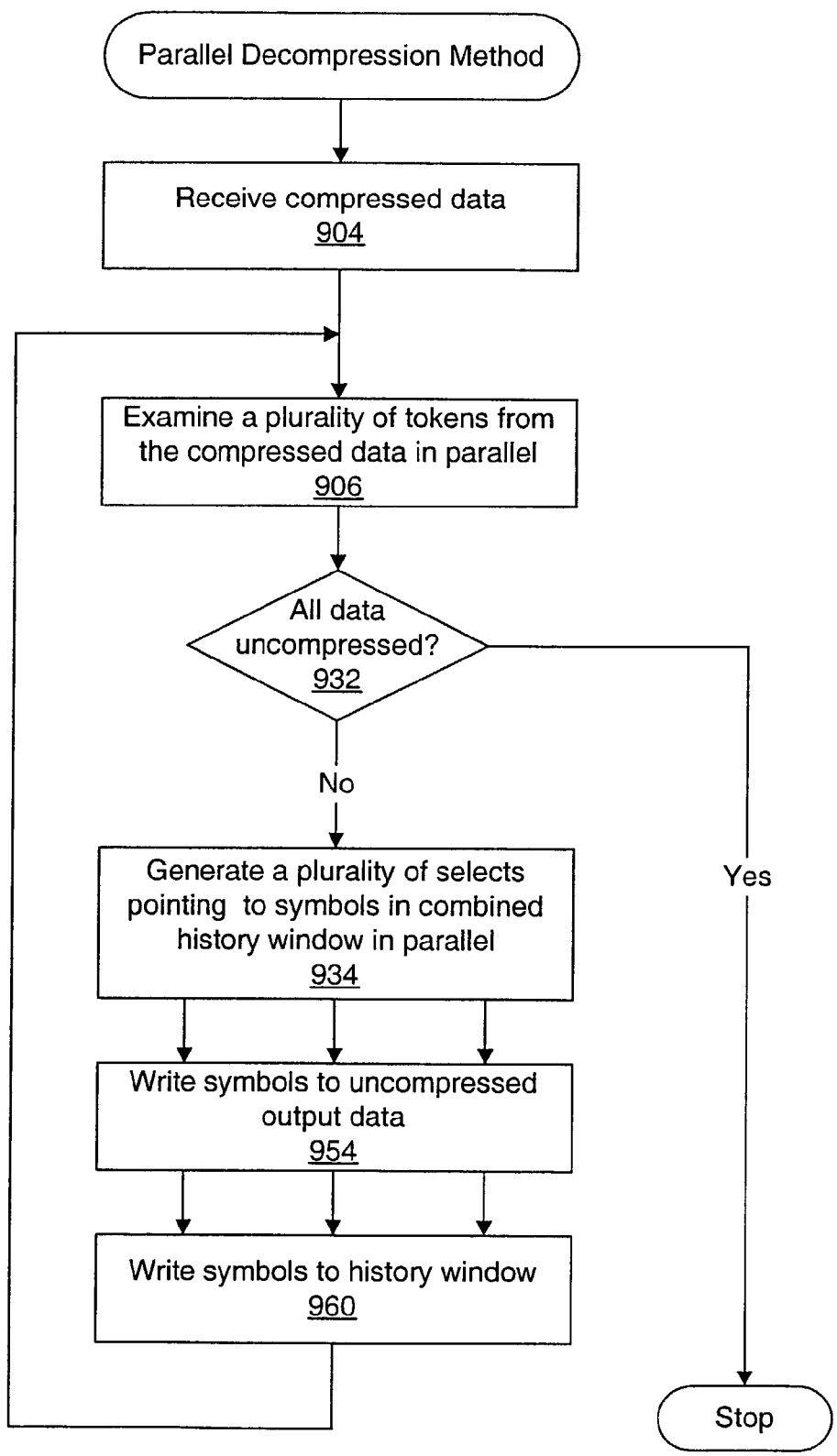
FIG. 18b is a flowchart illustrating a parallel decompression method according to one embodiment of the invention.

FIG. 18b—A Parallel Decompression Method

FIG. 18b illustrates an embodiment of a parallel decompression method performed in one embodiment of the parallel decompression engine 550 of FIG. 18a. FIG. 18b illustrates that compressed data may be decompressed in a series of cycles, with one or more tokens from the compressed data examined and decompressed in parallel in each cycle. In block 906, the parallel decompression engine may examine a plurality of tokens from the decompressed data. The plurality of tokens may be examined in parallel, i.e., more than one token may be examined at a time. If it is determined in block 906 that all tokens in the compressed data have been decompressed by the decompression engine, then in block 932 the decompression process may stop. If it is determined in block 906 that there are tokens to be examined and decompressed, then the tokens are examined, and information extracted from the tokens in block 906 may be passed to block 934. In one embodiment, the information extracted from the tokens is passed to block 934 in parallel.

In block 934, the information extracted from the tokens in block 906 may be used to generate a plurality of selects, or pointers, that point to symbols in a combined history window. The combined history window may include uncompressed symbols from previous cycles of the decompression engine. The portion of the combined history window comprising uncompressed symbols from previous decompression cycles may be referred to as the history window or history table. The combined history window may also include uncompressed symbols from the current decompression cycle. The uncompressed symbols from the current decompression cycle may be referred to as "data bytes." During compression, one or more uncompressed symbols may not be compressed, and may be stored in a token in uncompressed form. The decompression engine recognizes tokens comprising uncompressed symbols, extracts the uncompressed symbols from the tokens, and passes the uncompressed symbol to the combined history window unchanged. Thus, selects generated in block 934 may point to either uncompressed symbols from previous decompression cycles or uncompressed symbols from the tokens being decompressed in the current cycle.

In block 954, the decompression engine uses the selects generated in block 934 to extract the one or more uncompressed symbols pointed to by the selects from the history window, and copies the extracted uncompressed symbols to uncompressed output data 970. The uncompressed symbols may be appended to the end of output data 970. Output data may be an output data stream, i.e., the data may be streamed out to a requesting process as it is decompressed, or alternatively the output data 970 may be an uncompressed output file that is not released until the entire compressed data 900 is decompressed.

In block 960, the uncompressed symbols from the current decompression cycle may be written to the history window. If the history window is full, one or more of the oldest symbols from previous decompression cycles may be moved out of the history window prior to writing the uncompressed symbols from this decompression cycle. The oldest symbols may be shifted out of the history window, or alternatively the history window may be a "ring buffer," and the oldest symbols may be overwritten by the new symbols. FIGS. 18c-18k illustrate the flowchart of FIG. 18b in greater detail

Figure 18C:
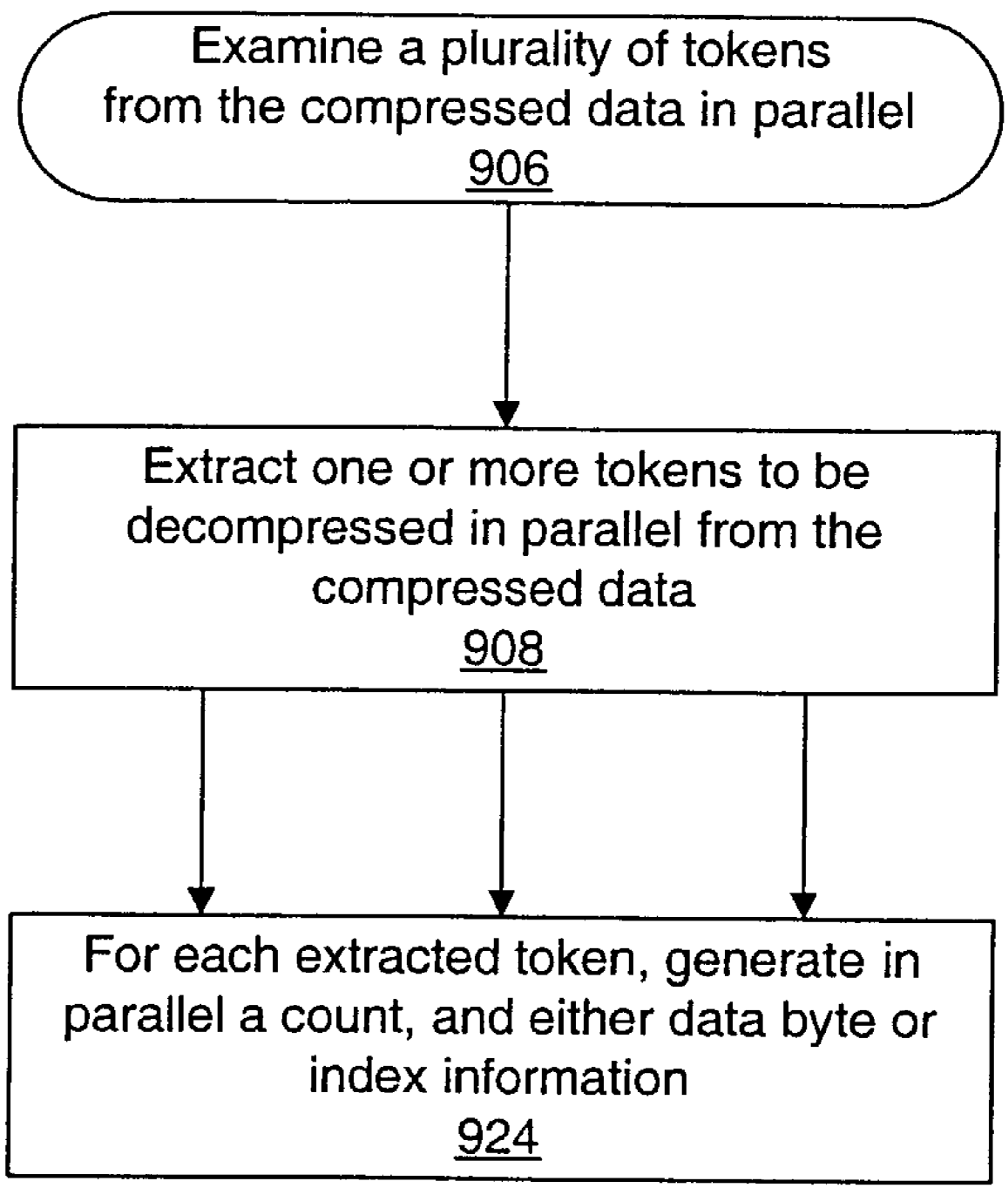
FIG. 18c is a flowchart illustrating a process for examining a plurality of tokens from the compressed data in parallel according to one embodiment of the invention.
Figure 18D:
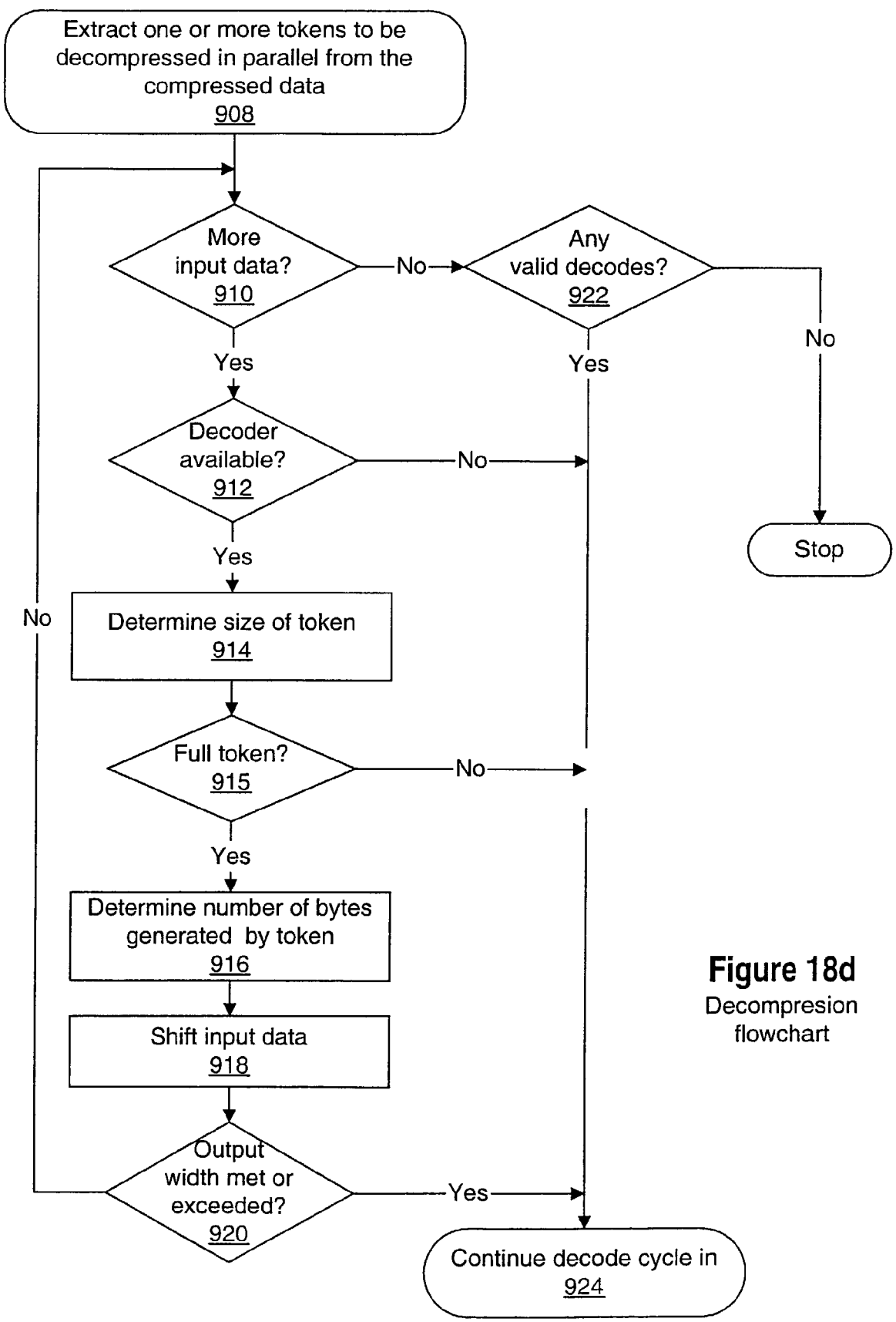
FIG. 18d is a flowchart illustrating a process for extracting one or more tokens to be decompressed in parallel according to one embodiment of the invention.

FIG. 18c—Examining a Plurality of Tokens in Parallel

FIG. 18c expands on block 906 of FIG. 18b, illustrating one embodiment of a method for examining a plurality of tokens from the compressed data 900 in parallel. In block 908, one or more tokens to be decompressed in parallel in the current decompression cycle may be extracted from the compressed data 900. The tokens may be extracted from the compressed data beginning at the first token compressed by the compression engine that compressed the data, and ending at the last token compressed by the compression engine. A maximum number of tokens may be decompressed in one cycle. As an example, the decompression logic illustrated in FIG. 8 accepts a maximum of eight tokens in a decompression cycle. Preferably, a decompression engine may accept less than the maximum number of tokens in a decompression cycle. Thus, the decompression logic illustrated in FIG. 8 accepts a minimum of one token in a decompression cycle, for example, in a last decompression cycle when only one token is left to decompress. If a token represents more uncompressed output symbols than can be compressed in a decompression cycle, then it will take more than one decompression cycle to fully decompress the token. Information in the token may be used in extracting the token. For example, the size of the token and the number of symbols to be decompressed by the token may be used in extracting the token. In one embodiment, the size of a token may be the size in bits of the token. FIG. 18d illustrates one embodiment of a process for extracting tokens in greater detail.

Figure 18E:
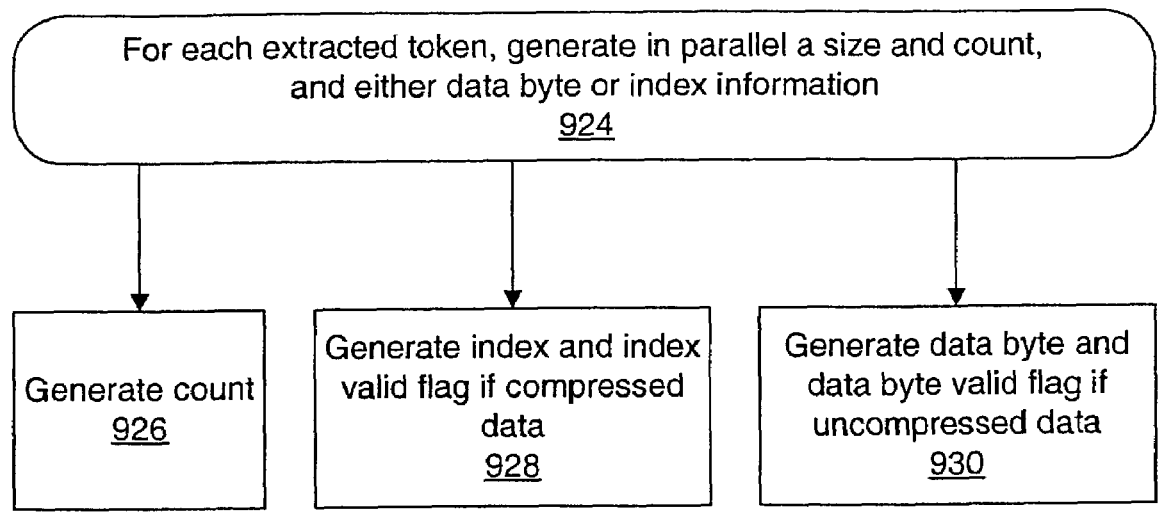
FIG. 18e is a flowchart illustrating a process for generating count and index or data byte information in parallel according to one embodiment of the invention.

In block 924, the tokens extracted for this decompression cycle may be examined in parallel, and information about the tokens may be generated for use in the decompression cycle. Examples of information that may be extracted from a token include, but are not limited to: a count representing the number of uncompressed symbols this token represents; data byte information; and index information. Data byte information may include an uncompressed symbol if this token represents a symbol that was not compressed by the compression engine. Data byte information may also include a data byte valid flag indicating that the data byte for this token is valid. In one embodiment, the data byte valid flag may be a bit that is set (1) if the data byte is valid, and not set (0) if the data byte is not valid. Index information may include an index. In one embodiment, the index may represent an offset from the position in the uncompressed data 970 to receive first uncompressed symbol to be decompressed from the information in this in this token to the first uncompressed symbol previously decompressed and stored in the uncompressed data 970 to be copied into the position. In one embodiment, the previously decompressed symbols from one or more decompression cycles may be in a history window, and the maximum value for the index may be related to the length of the history window. In one embodiment, the index valid flag may be a bit that is set (1) if the index is valid, and not set (0) if the index is not valid. FIG. 18e illustrates one embodiment of a process for generating information from tokens in parallel in greater detail.

FIG. 18d—Extracting One or More Tokens to be Decompressed in Parallel

FIG. 18d expands on block 908 of FIG. 18c, and illustrates one embodiment of a method for extracting one or more tokens to be decompressed in parallel from compressed data 900. In block 910 of FIG. 18d, the method determines if there is more input data, i.e., if more tokens remain in the compressed data 900 to be decompressed. If so, then in block 912 the method determines if a decoder is available. If a decoder is not available, then all decoders have been assigned tokens to be decompressed, and the decompression cycle continues in block 924 of FIG. 18c.

If a decoder is determined to be available in block 912, then the method may proceed to blocks 914 through 920. Blocks 914 through 920 may determine how much of the compressed data 900 to use in the current decode, and also may determine how many decoders to use in the current decode. In one embodiment, blocks 914 through 920 may be performed in stage one of the decompression engine illustrated in FIG. 8. In block 914, the method may determine the size of a token representing compressed data. In block 915, the method may examine the token to see if it is a complete token. If the tokens are being loaded in the decoders from a section of the compressed data, for example a 32-bit section, then, after extracting at least one token, the remaining bits in the input data may not comprise an entire token. The size of the token determined in block 914 may be compared to the number of bits left in the input data to determine if there is a complete token. If the token is not complete, then the method may continue to block 924 of FIG. 18*c*.

In block 916, the method may determine the number of symbols that will be generated by the decompression of this token. In block 918, the method may shift the input data by the size of the token to make the next compressed token in the compressed data 900 available to be extracted by this process. The shifting of the input data may not occur until the decompression cycle determines how many tokens will be fully decompressed in this cycle, and the data may be shifted by the total size in bits of all tokens fully decompressed in this cycle. The shifting may prepare the input data for the next decompression cycle. In block 920, the method may determine if more symbols will be decompressed by the tokens to be decompressed in this decompression cycle (counting the current token being examined) than the maximum output width for one decompression cycle. The maximum number of uncompressed symbols that may be decompressed in one cycle minus the number of uncompressed symbols to be produced by the decompression of tokens already extracted for this decompression cycle yields the maximum number of symbols that may be decompressed from the token currently being examined. If the output width has been met or exceeded, then the decompression cycle may continue without the current token being examined being assigned to a decoder. In one embodiment, a token may be partially compressed in a decompression cycle to insure that a maximum number of symbols are decompressed in the cycle. The first token not fully decompressed will be the first token extracted in the next decompression cycle. If the output width has not been met or exceeded as determined in block 920, then the method returns to block 910, and blocks 910-920 may be repeated until there is no more data, or until the output width is met or exceeded.

In block 922, if there is no more input data as determined in block 910, but one or more tokens have been assigned to decoders for decoding, then the decompression cycle continues with block 924 of FIG. 18*c*. This covers the case when there are no more tokens in the compressed data 900, but one or more tokens have been assigned to decoders in blocks 910-920. In block 922, if there is no more input data as determined in block 910, and no tokens have been assigned to decoders, the decompression of the compressed data is complete, and decompression stops.

FIG. 18*e*—Generating Count and Index or Data Byte Information in Parallel

FIG. 18*e* expands on block 924 of FIG. 18*c*, and illustrates one embodiment of a process for generating information from a plurality of tokens in parallel. Illustrated are several items that may be extracted from one or more tokens being decoded in parallel in the current decompression cycle by decoder logic similar to that illustrated in FIG. 9.

In block 926 of FIG. 18*e*, a count may be generated for each token being decoded in the current decompression cycle. The count for a token may represent the number of uncompressed symbols the decompression of the token will produce. The count for a token may be between one and the maximum number of symbols that can be represented by a token. For example, in the table of FIG. 7, a 25-bit token can represent up to 4096 uncompressed symbols. The count for a token representing an uncompressed symbol will be 1.

In block 928, index information may be generated for each token being decoded in the current decompression cycle. The index information may include an index for one or more tokens being decompressed and an index valid flag for each token being decompressed. A valid index may be generated for a token if the token represents one or more compressed symbols. In one embodiment, the index may represent a distance in symbols from the destination position in the uncompressed data 970 for the first uncompressed symbol to be decompressed from this token to a first uncompressed symbol previously decompressed and stored in the uncompressed data 970. In one embodiment, the previously decompressed symbols from one or more decompression cycles may be stored in a history window, and the index may be an offset to a previously uncompressed symbol in the history window. In one embodiment, the index valid flag may be a bit that is set (1) if the index is valid, and not set (0) if the index is not valid. The index valid flag may be set for tokens for which an index is generated. In one embodiment, the index valid flag may be a bit that is set (1) if the index is valid, and not set (0) if the index is not valid.

In block 930, data byte information may be generated for one or more tokens being decoded in the current decompression cycle. Data byte information for a token may include an uncompressed symbol (data byte) if this token represents a symbol that was not compressed by the compression engine. Data byte information may also include a data byte valid flag indicating that the data byte for this token is valid. In one embodiment, the data byte valid flag may be a bit that is set (1) if the data byte is valid, and not set (0) if the data byte is not valid.

Figure 18F:
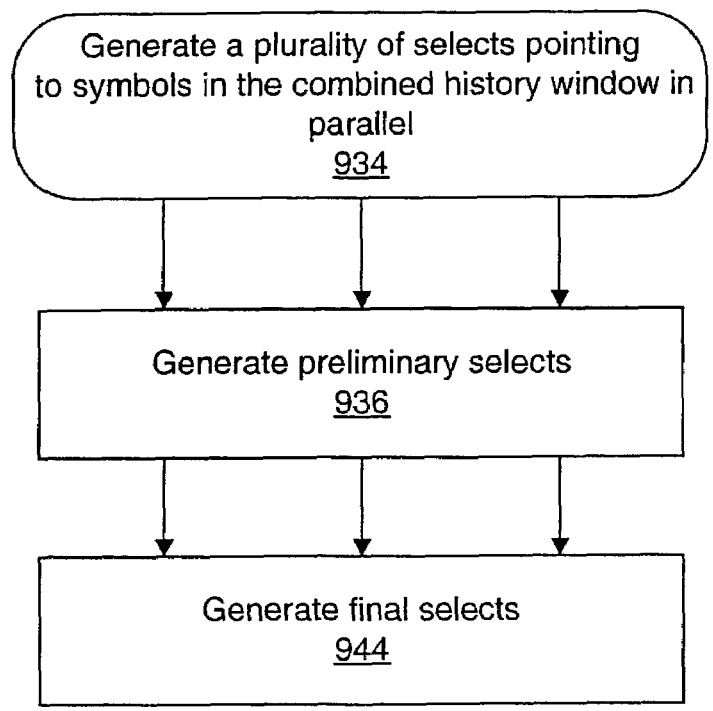
FIG. 18f is a flowchart illustrating a process for generating a plurality of selects to symbols in a combined history window according to one embodiment of the invention.

FIG. 18*f*—Generating a Plurality of Selects to Symbols in a Combined History Window FIG. 18*f* expands on block 934 of FIG. 18*b*, and illustrates one embodiment of a process for generating in parallel a plurality of selects to symbols in a combined history window. In block 936, one or more preliminary selects may be generated using the information generated in block 924 for this decompression cycle. A preliminary select may be generated for each of the symbols being decompressed in the current decompression cycle. In one embodiment, a preliminary select is an adjusted index with a single bit overflow. The index is adjusted by an offset from a starting index of a string of symbols in previous uncompressed symbols. The size of the preliminary select is determined by the combined size of the history window, the maximum number of data bytes (determined by the number of decoders), and the overflow bit. For example, for a 64-entry history window, plus eight data bytes, plus a single overflow bit, a preliminary select may be a minimum of eight bits. In this example, the selects may have the values of 0-63 if a window value is to be used for this output symbol or the values of 64-71 if one of the eight data bytes is to be used for this output symbol. The overflow output bit may be set if the data for the output symbol is being generated by one or more of the other tokens being decoded in this decompression cycle. Other combinations of bits may be used to signal to the later stages that no data is being generated for this output symbol in this decompression cycle.

In one example of a decode where an overflow bit may be set, a first decoder may decode a first token and output a pointer to a first data byte, and a second decoder may decode a second token and output a pointer to a second data byte. A third decoder may decode a third token that represents a compressed string including the first and second data bytes generated from the first and second tokens. As these data bytes are not in the history window yet, the overflow bit 26008 is set to signify that the data for the third decoder's output byte is defined by one of the prior decoders in the current decode. The preliminary select output of the second stage for the third decoder is resolved into a final select in the third stage. In this example, two final selects may be generated for the third token; the first pointing to the first decoder's data byte, and the second pointing to the second decoder's data byte.

Figure 18G:
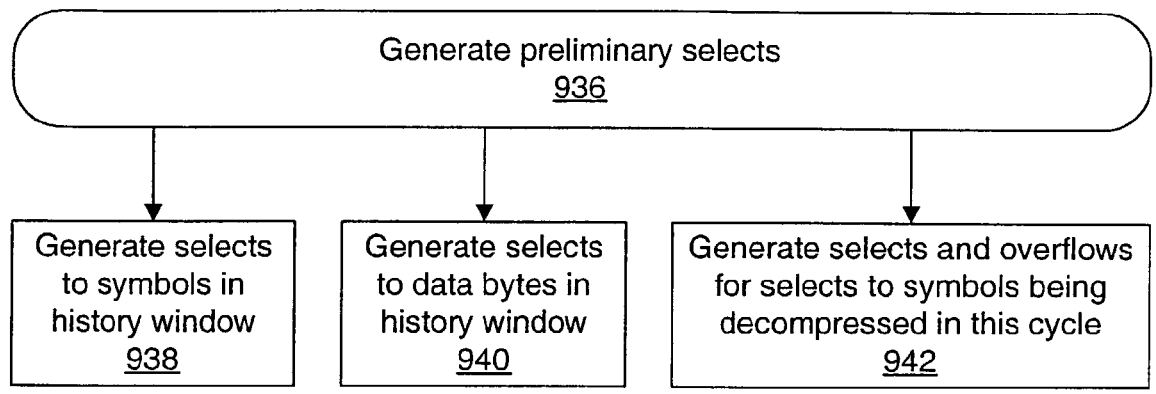
FIG. 18g is a flowchart illustrating a process for generating preliminary selects according to one embodiment of the invention.

FIG. 18g—Generating Preliminary Selects

FIG. 18g expands on block 936 of FIG. 18f, and illustrates one embodiment of a process for generating preliminary selects to symbols in a combined history window. A preliminary select may be generated for each of the output symbols using the information generated in block 924 in the current decompression cycle. In block 938, preliminary selects to symbols in the history window may be generated. For example, if the history window includes 64 entries indexed 0-63, with 0 being the most recent entry, then, for an output symbol to be copied from the eighth most recent entry in the history window, an index of 7 would be generated.

In block 940, preliminary selects to data bytes in the combined history window may be generated. For example, the history window includes 64 entries indexed 0-63, and the combined history window includes eight data bytes passed from eight decoders in stage one, the eight data bytes may be indexed as data bytes 64-71. For an output symbol to be copied from the third data byte, an index of 66 would be generated.

In block 942, preliminary selects to symbols being generated in the current decompression cycle may be generated. In other words, the symbols required to uncompress the output symbol are not in the history window yet, but are being generated by prior output symbols in this decompression cycle. For these preliminary selects, an overflow bit is set to indicate that the preliminary select needs to be resolved. The index generated for the preliminary select indicates which of the prior output symbols in this decompression cycle contains the symbol required by this output symbol. For example, if there are four output symbols 0-3, and this is the third output symbol (output symbol 2), then, if the overflow bit is set, the index may indicate that the data for this output symbol is being generated on output symbol 0 or 1, but not on output symbol 3.

Figure 18H:
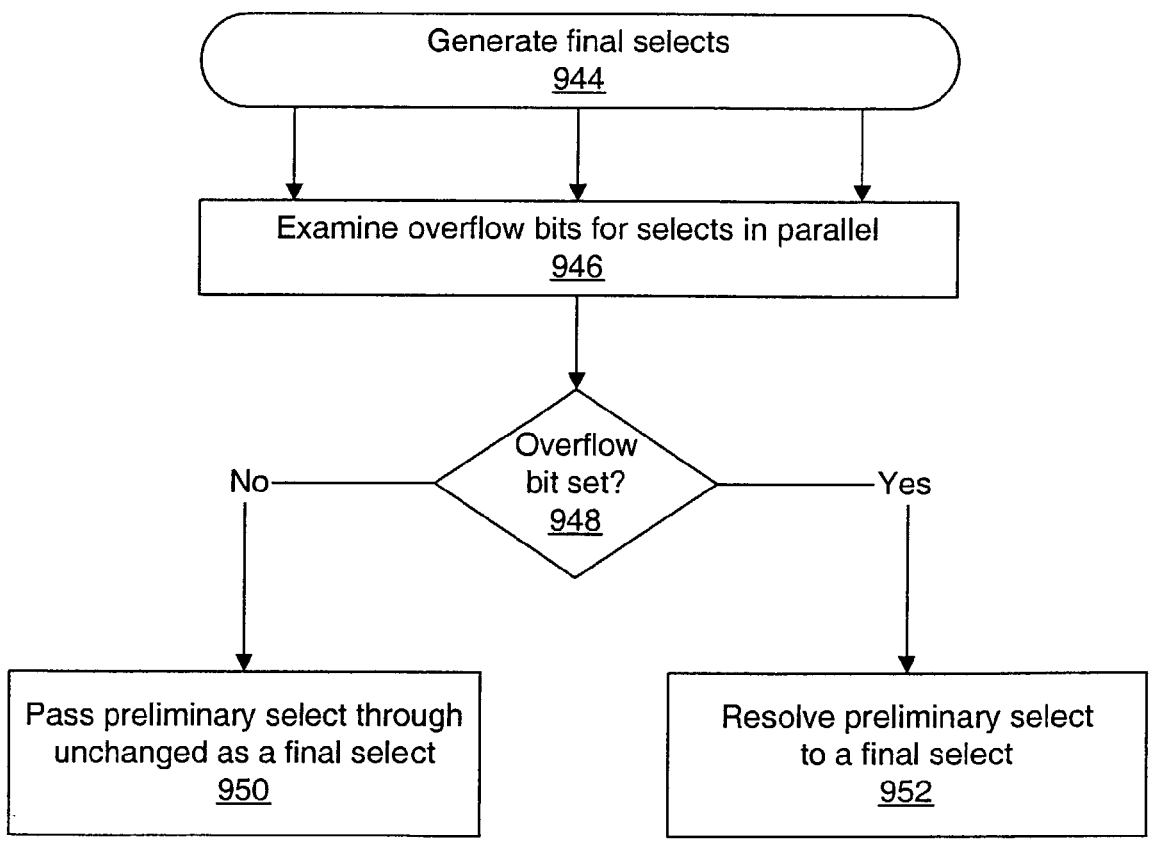
FIG. 18h is a flowchart illustrating a process for generating final selects according to one embodiment of the invention.

FIG. 18h—Generating Final Selects

FIG. 18h expands on block 944 of FIG. 18f, and illustrates one embodiment of a process for generating final selects to symbols in a combined history window. A final select may be generated for each of the output symbols using the information generated in block 924 in the current decompression cycle. In block 946, the overflow bit of each of the preliminary selects may be examined. If the overflow bit is not set, the preliminary select may be passed through unmodified as the final select for the output symbol. If the overflow bit is set, then the preliminary select is resolved. In one embodiment, the preliminary select for this symbol and the final select from each prior output symbol is passed as input to the preliminary select resolution logic for each output symbol. If the preliminary select for an output symbol needs to be resolved, then the index passed in the preliminary select for the output symbol is used to generate the number of the prior output symbol which will contain the data for this output symbol. The final select for the prior output symbol is then passed through as the final select for this output symbol. For example, if there are four output symbols 0-3, and the overflow bit is set for the third output symbol (output symbol 2), then, if the index indicates that the data for this output symbol is being generated on output symbol 1, the final select from output symbol 1 is copied and passed through as the final select for output symbol 2. The final select from output symbol 1 may be an index to either a symbol in the history window or to a data byte.

Figure 18I:
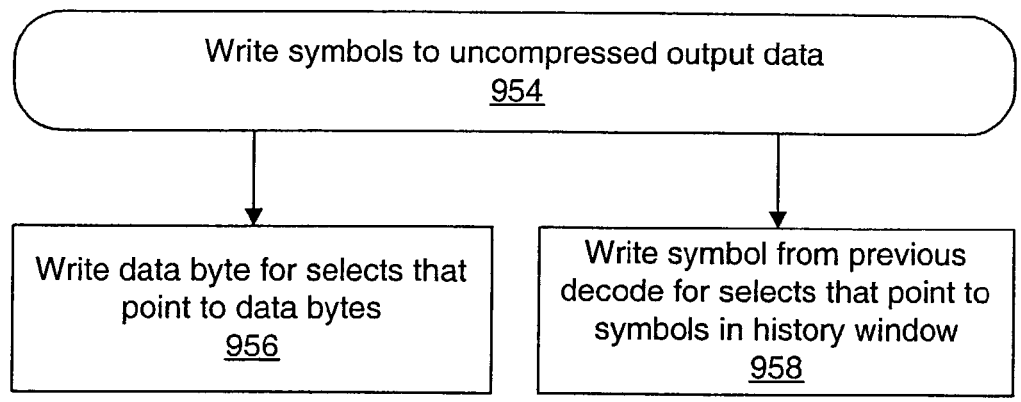
FIG. 18i is a flowchart illustrating a process for writing uncompressed symbols from the combined history window to the output data according to one embodiment of the invention.

FIG. 18i—Writing Uncompressed Symbols to the Output Data

FIG. 18i expands on block 954 of FIG. 18b, and illustrates one embodiment of a process for writing the symbols for the output bytes to the uncompressed output data. In block 956, the final selects indexing data bytes passed from the decoders may be used to locate the data bytes and copy the uncompressed data bytes into the output data. In block 958, the final selects indexing symbols in the history window may be used to locate the uncompressed symbols and copy the symbols into the output data. The output symbols may be assembled in the output data in the order of the output symbols in the decompression engine. For example, if there are 16 output symbols (0-15) being generated in a decompression cycle, output symbol 0 may be the first in the output data, and output symbol 15 may be the last. A decompression cycle may not generate a full set of output symbols. For example, with the 16 maximum output symbols in the previous example, a decompression cycle may generate only nine output symbols (output symbols 0-8). Preferably, every decompression cycle decompresses as close to the maximum number of output symbols as possible. Some decompression cycles, for example, the last decompression cycle, may not generate the maximum number of output symbols.

Figure 18J:
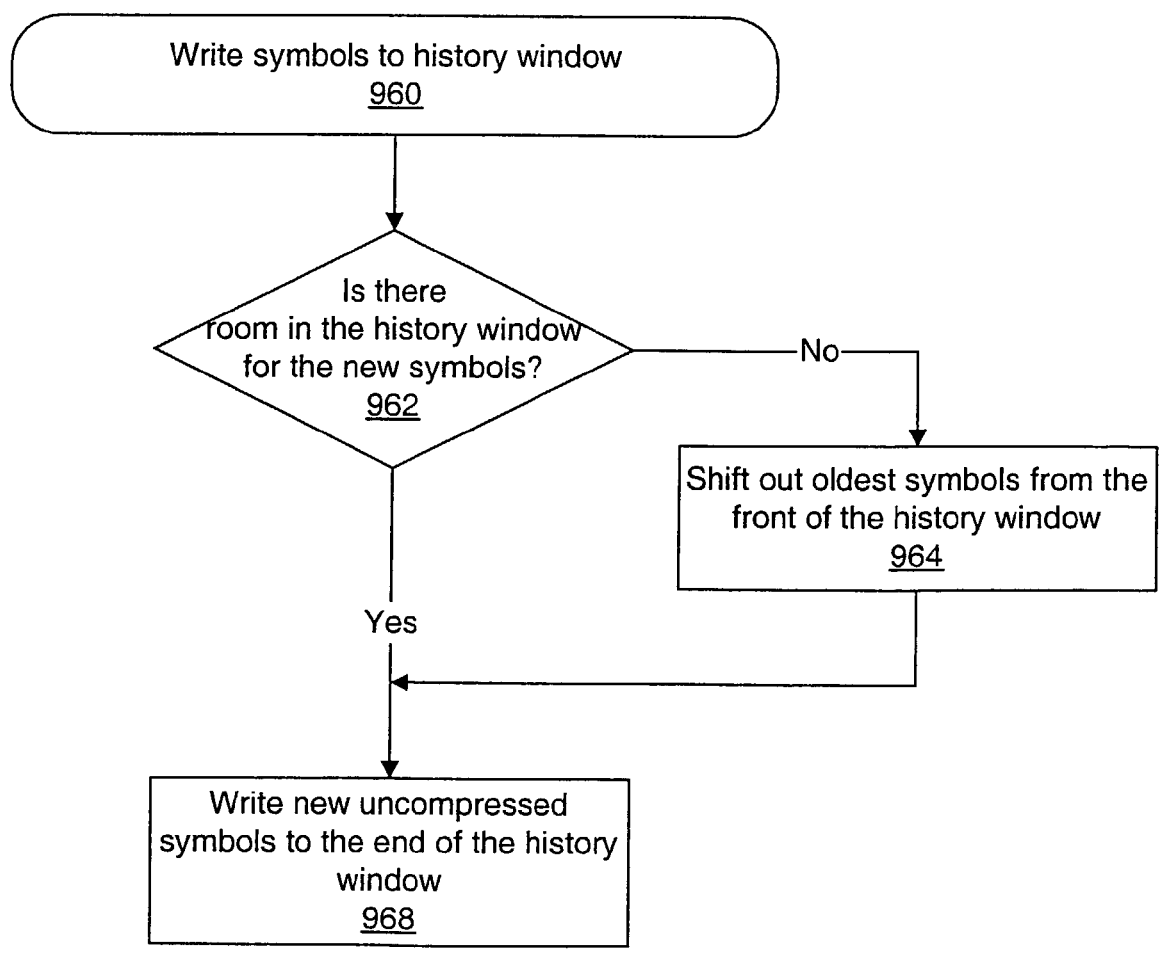
FIG. 18j is a flowchart illustrating a process for writing symbols uncompressed by the current decompression cycle to the history window according to one embodiment of the invention.

FIG. 18j—Writing Symbols to the History Window

FIG. 18j expands on block 960 of FIG. 18b, and illustrates one embodiment of a process for writing the symbols uncompressed in a decompression cycle to the history window. In one embodiment, the history window may be set up as a buffer, and the oldest data may be shifted out to make room for the newest data. In another embodiment, the history window may be set up as a ring buffer, and the oldest data may be overwritten by the newest data. Blocks 962 and 964 assume the oldest data may be shifted out of the history window, and may not be necessary in embodiments using a ring buffer for the history window.

In block 962, the history window is examined, and if there is not enough room for the symbols decompressed in this cycle, in block 964 the data in the history window is shifted to make room for the new data. In one embodiment, the history window may be shifted after every decompression cycle to make room for the new data.

In block 966, the newly uncompressed symbols are written to the end of the history window. In one embodiment, the symbols may be written to the history window using the method described for writing the symbols to the output data described for blocks 956 and 958 of FIG. 18i.

Figure 18K:
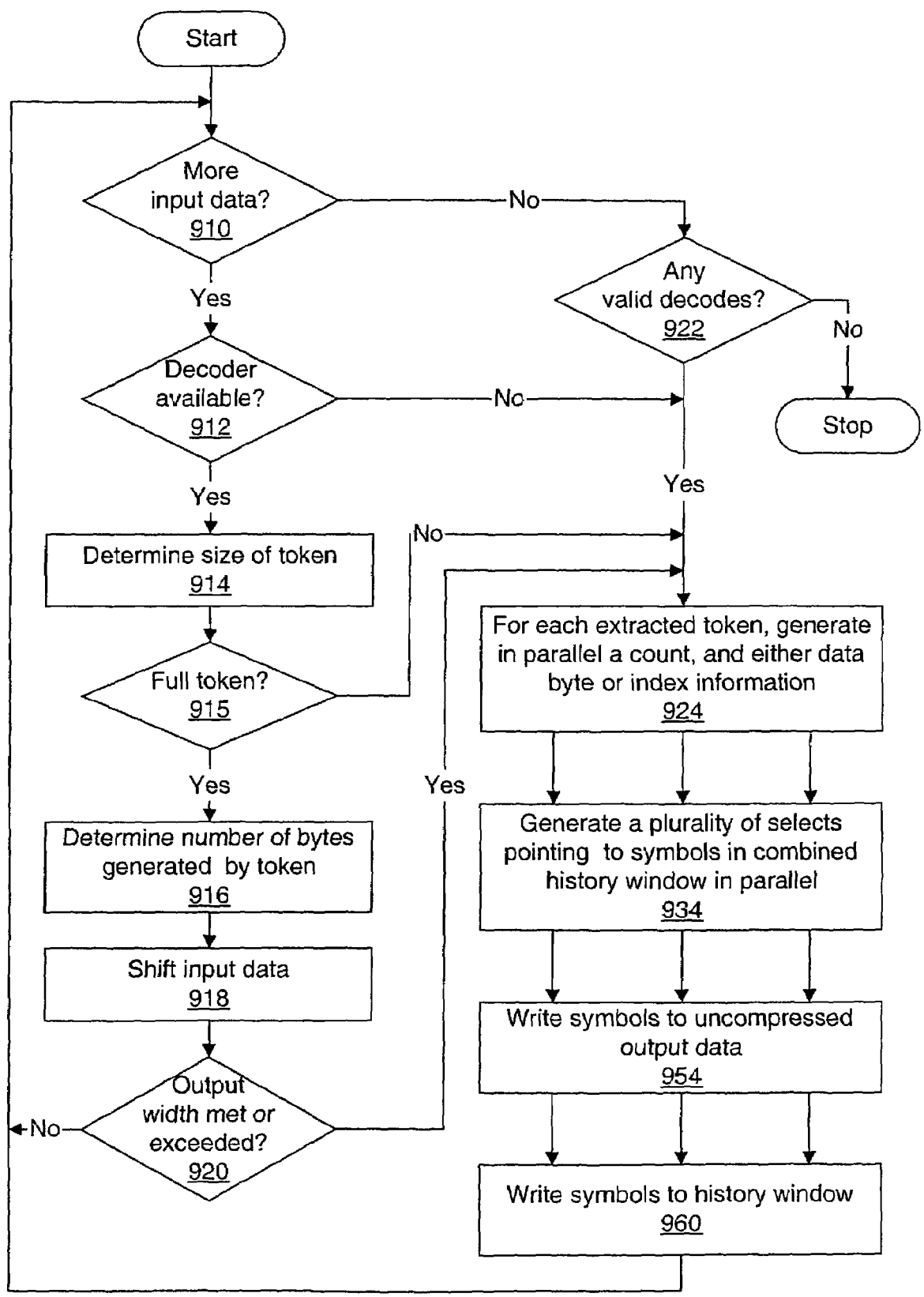
FIG. 18k is a flowchart illustrating a decompression process combining FIGS. 18b, 18c and 18d according to one embodiment of the invention.

FIG. 18k—A Decompression Process Combining FIGS. 18b, 18c and 18d

In FIG. 18k, several of the blocks from FIGS. 18a-18j are combined to further illustrate one embodiment of a decompression cycle. Blocks 910-922 are from FIG. 18d and expand on block 908 of FIG. 18c, illustrating one embodiment of a method for extracting one or more tokens to be decompressed in parallel from the input compressed data as described for FIG. 18d. In block 924, the tokens extracted for this decompression cycle may be examined in parallel, and information about the tokens may be generated for use in the decompression cycle. The operation of block 924 is described in FIGS. 18c and 18e. In block 934, the information extracted from the tokens may be used to generate a plurality of selects, or pointers, that point to symbols in a combined history window. The operation of block 934 is described in FIGS. 18b, 43f, 18g, and 18h. In block 954, the decompression engine uses the selects generated in block 934 to extract the one or more uncompressed symbols pointed to by the selects from the history window, and copies the extracted uncompressed symbols to uncompressed output data. The operation of block 954 is described in FIGS. 18b and 18i. In block 960, the uncompressed symbols from the current decompression cycle may be written to the history window. The operation of block 954 is described in FIGS. 18b and 18j.

After writing the uncompressed symbols to the history window, operation may return to block 910 to determine if there is more input data available. If there is no more input data available as determined in block 910 and there are no valid decodes as determined in block 922, then operation completes. Otherwise, the next parallel decompression cycle begins.

Decompression Timing

Referring again to FIG. 8, each stage in this design has been timed to achieve 133 MHz with 0.25μ technology and low power standard cell design library. Alternate embodiments may use custom data-paths or custom cells to achieve higher clock rates or fewer stages. Stage one 25501 may be the most critical for timing in standard cell design. Stages two 25505, three 25509 and four 25513 may also be important for timing. There may be some additional powering logic delays in stage four, which may not be a problem due to the timing margin of stage four 25513.

Scalable Compression/Decompression

The network device also includes scalable compression/decompression, wherein one or more of the parallel compression/decompression slices can be selectively applied for different data streams, depending on the desired priorities of the data streams.

In summary, embodiments of a network device with improved storage density and access speed using compression techniques have been disclosed. It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

We claim:

1. A network device, comprising:
    a port for coupling to a network;
    network logic coupled to the port, wherein the network logic is operable to perform processing on packets received from and/or provided to the port;
    a parallel compression/decompression engine coupled to at least one of the port and the network logic, wherein the parallel compression/decompression engine is operable to compress and/or decompress data comprised in at least a portion of the packets;
    wherein the parallel compression/decompression engine comprises a parallel compression engine for compressing uncompressed data, wherein the parallel compression engine comprises:
        an input for receiving uncompressed data, wherein the uncompressed data comprises a plurality of symbols;
        a history table comprising entries, wherein each entry comprises at least one symbol;
        a plurality of comparators for comparing the plurality of symbols with entries in the history table in a parallel fashion, wherein the plurality of comparators produce compare results;
        match information logic coupled to the plurality of comparators for determining match information for each of said plurality of symbols based on the compare results; and
        an output coupled to the match information logic for outputting compressed data in response to the match information, wherein said compressed data includes a count value and an entry pointer for a contiguous match, wherein the entry pointer points to the entry in the history table which produced the contiguous match, wherein the count value indicates a number of matching symbols in the contiguous match.

2. The network device of claim 1, wherein the parallel compression/decompression engine comprises a parallel decompression engine for decompressing compressed data received at the port from the network, wherein the compressed data comprises a compressed representation of uncompressed data, the uncompressed data having a plurality of symbols;
    wherein the parallel decompression engine is operable to:
        receive the compressed data, wherein the compressed data comprises tokens each describing one or more uncompressed symbols; examine a plurality of tokens from the compressed data in parallel in a current decompression cycle; generate a plurality of selects in parallel in response to examining the plurality of tokens in parallel, wherein each of the plurality of selects points to a symbol in a combined history window; and generate the uncompressed data comprising the plurality of symbols using the plurality of selects.

3. The network device of claim 1, wherein the parallel compression/decompression engine is configurable to operate in one of a plurality of possible compression modes, including lossy, lossless, and no compression.

4. The network device of claim 1, further comprising:
    a memory coupled to the network logic; and
    a memory controller coupled to the network logic and to the memory, wherein the memory controller controls access to the memory;
    wherein the parallel compression/decompression engine is comprised in the memory controller, wherein the parallel compression/decompression engine is operable to compress and/or decompress data transferred to/from the memory.

5. The network device of claim 1, further comprising:
    a memory coupled to the network logic, wherein the parallel compression/decompression engine is operable to compress and/or decompress data transferred to/from the memory.

6. The network device of claim 5, wherein the memory operates as a data cache useable by the network logic.

7. The network device of claim 5, wherein the memory stores both compressed data and uncompressed data.

8. The network device of claim 1, wherein the packets comprise header data and payload data;
wherein the parallel compression/decompression engine is operable to compress the payload data of received packets;
wherein header data is not compressed by the parallel compression/decompression engine.

9. The network device of claim 1, wherein the packets comprise header data and payload data;
wherein the parallel compression/decompression engine is operable to decompress the payload data of received packets;
wherein header data comprises uncompressed data that is not decompressed by the parallel compression/decompression engine.

10. The network device of claim 1, wherein the network logic comprises a network processor.

11. A network device, comprising:
a port for coupling to a network;
network logic coupled to the port, wherein the network logic is operable to perform processing on packets received from and/or provided to the port; and
a parallel compression engine coupled to at least one of the port and network logic, wherein the parallel compression engine is operable to compress data comprised in at least a portion of the packets, and comprises:
an input for receiving uncompressed data, wherein the uncompressed data comprises a plurality of symbols;
a history table comprising entries, wherein each entry comprises at least one symbol;
a plurality of comparators for comparing the plurality of symbols with entries in the history table in a parallel fashion, wherein the plurality of comparators produce compare results;
match information logic coupled to the plurality of comparators for determining match information for each of said plurality of symbols based on the compare results; and
an output coupled to the match information logic for outputting compressed data in response to the match information, wherein said compressed data includes a count value and an entry pointer for a contiguous match, wherein the entry pointer points to the entry in the history table which produced the contiguous match, wherein the count value indicates a number of matching symbols in the contiguous match.

12. The network device of claim 11, wherein the compression engine is configurable to operate in one of a plurality of possible compression modes, including lossy, lossless, and no compression.

13. The network device of claim 11, wherein the packets comprise header data and payload data;
wherein the compression engine is operable to compress the payload data of received packets;
wherein header data is not compressed by the compression/decompression engine.

14. A network device, comprising:
network logic for performing network operations;
an input for receiving uncompressed data, wherein the uncompressed data comprises a plurality of symbols, wherein the plurality of symbols includes a first symbol, a last symbol, and one or more middle symbols;
a history table comprising entries, wherein each entry comprises at least one symbol;
a plurality of comparators for comparing the plurality of symbols with each entry in the history table in a parallel fashion, wherein said plurality of comparators produce compare results;
a memory which maintains a current count of prior matches which occurred when previous symbols were compared with entries in the history table;
match information logic coupled to the plurality of comparators and the memory for determining match information for each of said plurality of symbols based on the current count and the compare results;
wherein, if at least one contiguous match occurs with one or more respective contiguous middle symbols, and the one or more respective contiguous middle symbols are not involved in a match with either the symbol before or after the respective contiguous middle symbols, then the match information logic is operable to select the one or more largest non-overlapping contiguous matches involving the middle symbols; and
an output coupled to the match information logic for outputting compressed data in response to the match information, wherein the output is operable to output compressed data for each of the selected matches involving the middle symbols.

15. The network device of claim 14, wherein the plurality of symbols comprise a power of 2 number of symbols.

16. The network device of claim 14,
wherein the memory further maintains a count flag for each entry in the history table;
wherein the match information logic determines match information for each of said plurality of symbols based on the current count, the count flags, and the compare results;
wherein the match information logic and the output are operable to:
determine matches of said plurality of symbols with entries in the history table;
examine the compare results for each entry;
for non-matching symbols which do not match any entry in the history table, output the non-matching symbols;
if any entry stopped matching, examine the current count, the count flags and the compare results for every entry;
determine the contiguous match based on the current count and the compare results;
determine if the contiguous match has stopped matching;
if the contiguous match has stopped matching, then:
output a count value and an entry pointer, wherein the entry pointer points to the entry in the history table which produced the contiguous match, wherein the count value indicates a number of matching symbols in the contiguous match; and
update the current count according to the compare results;
wherein the system operates one or more times until no more data is available; and
when no more data is available, if the current count is non-zero, output a count value and an entry pointer for the remaining match in the history table.

17. The network device of claim 14, wherein the plurality of symbols includes a first symbol, a last symbol, and a plurality of middle symbols;
wherein, if at least one contiguous match occurs with two or more respective contiguous middle symbols, and the two or more respective contiguous middle symbols are not involved in a match with either the symbol before or after the respective contiguous middle symbols, then the match information logic is operable to select the one or more largest non-overlapping contiguous matches involving the middle symbols;

wherein the output is operable to output compressed data for each of the selected matches involving the middle symbols.

18. The network device of claim 14, wherein the match information logic is operable to:

determine a contiguous match based on the current count and the compare results;

determine if the contiguous match has stopped matching;

if the contiguous match has stopped matching, then:

update the current count according to the compare results; and wherein the output is operable to output compressed data corresponding to the contiguous match.

19. The network device of claim 18, wherein, in outputting compressed data corresponding to the contiguous match, the output is operable to output a count value and an entry pointer, wherein the entry pointer points to the entry in the history table which produced the contiguous match, wherein the count value indicates a number of matching symbols in the contiguous match.

20. The network device of claim 14, wherein the match information logic is operable to update the current count according to the compare results.

21. The network device of claim 14, wherein the memory further maintains a count flag for each entry in the history table;

wherein the match information logic determines match information for each of said plurality of symbols based on the current count, the count flags, and the compare results.

22. The network device of claim 21, wherein the match information logic is operable to reset the current count and the count flags for all entries if the compare results indicate a contiguous match did not match one of the plurality of symbols.

23. The network device of claim 21, wherein the current count and the count flags for all entries are reset based on the number of the plurality of symbols that did not match in the contiguous match.

24. The network device of claim 14, wherein the match information logic is operable to determine matches of said plurality of symbols with entries in the history table.

25. The network device of claim 14, wherein said compressed data includes a count value and an entry pointer for a contiguous match, wherein the entry pointer points to the entry in the history table which produced the contiguous match, wherein the count value indicates a number of matching symbols in the contiguous match.

26. The network device of claim 14, wherein the count value comprises an encoded value representing the count value; wherein more often occurring counts are encoded with fewer bits than less often occurring counts.

27. The network device of claim 14, wherein, for non-matching symbols which do not match any entry in the history table, the output outputs the non-matching symbols.

28. The network device of claim 14, further comprising:

wherein the system operates one or more times until no more data is available; and wherein, when no more data is available, if the current count is non-zero, the output outputs compressed data for the remaining match in the history table.

* * * * *